(12) United States Patent
Hopkins et al.

(10) Patent No.: US 11,692,067 B2
(45) Date of Patent: Jul. 4, 2023

(54) POLYSILOCARB MATERIALS, METHODS AND USES

(71) Applicant: Melior Innovations, Inc., Houston, TX (US)

(72) Inventors: Andrew R. Hopkins, Sylvania, OH (US); Mark S. Land, Houston, TX (US); Walter J. Sherwood, Glenville, NY (US); Tim C. Moeller, Magnolia, TX (US); Bruce A. Bricco, The Woodlands, TX (US); Douglas M. Dukes, Troy, NY (US); Brian L. Benac, Hadley, NY (US); Michael J. Mueller, Katy, TX (US)

(73) Assignee: Melior Innovations, Inc., Houston, TX (US)

( * ) Notice: Subject to any disclaimer, the term of this patent is extended or adjusted under 35 U.S.C. 154(b) by 0 days.

(21) Appl. No.: 16/213,656

(22) Filed: Dec. 7, 2018

(65) Prior Publication Data
US 2019/0352464 A1  Nov. 21, 2019

Related U.S. Application Data

(60) Division of application No. 14/634,814, filed on Feb. 28, 2015, now Pat. No. 10,167,366, which is a continuation-in-part of application No. 14/268,150, filed on May 2, 2014, now Pat. No. 9,815,943, and a continuation-in-part of application No. 14/212,896, filed on Mar. 14, 2014, now Pat. No. 9,815,952.

(60) Provisional application No. 62/106,094, filed on Jan. 21, 2015, provisional application No. 61/946,598, filed on Feb. 28, 2014, provisional application No. 61/818,981, filed on May 3, 2013, provisional application No. 61/818,906, filed on May 2, 2013.

(51) Int. Cl.
| | |
|---|---|
| C08K 3/04 | (2006.01) |
| C08G 77/12 | (2006.01) |
| C04B 35/571 | (2006.01) |
| B24D 3/28 | (2006.01) |
| C08L 83/04 | (2006.01) |
| C09K 8/80 | (2006.01) |
| C04B 35/56 | (2006.01) |
| C08K 5/56 | (2006.01) |
| C08K 3/14 | (2006.01) |
| C08L 83/00 | (2006.01) |
| C04B 35/80 | (2006.01) |
| C08G 77/20 | (2006.01) |
| C08G 77/00 | (2006.01) |

(52) U.S. Cl.
CPC ............ *C08G 77/12* (2013.01); *B24D 3/28* (2013.01); *C04B 35/56* (2013.01); *C04B 35/5603* (2013.01); *C04B 35/571* (2013.01); *C04B 35/80* (2013.01); *C08K 3/14* (2013.01); *C08K 5/56* (2013.01); *C08L 83/00* (2013.01); *C08L 83/04* (2013.01); *C09K 8/80* (2013.01); *C09K 8/805* (2013.01); *C04B 2235/3418* (2013.01); *C04B 2235/3826* (2013.01); *C04B 2235/44* (2013.01); *C04B 2235/48* (2013.01); *C04B 2235/483* (2013.01); *C04B 2235/528* (2013.01); *C04B 2235/5427* (2013.01); *C04B 2235/5436* (2013.01); *C04B 2235/6581* (2013.01); *C04B 2235/77* (2013.01); *C04B 2235/96* (2013.01); *C08G 77/20* (2013.01); *C08G 77/80* (2013.01); *Y10T 428/131* (2015.01)

(58) Field of Classification Search
CPC ........................................................ B24D 3/28
See application file for complete search history.

(56) References Cited

U.S. PATENT DOCUMENTS

| | | | | |
|---|---|---|---|---|
| 4,134,759 | A * | 1/1979 | Yajima | C04B 35/62849 419/24 |
| 4,159,259 | A * | 6/1979 | Yajima | C01B 32/977 525/14 |
| 5,180,694 | A * | 1/1993 | Renlund | C03C 13/00 501/12 |
| 2002/0065032 | A1 * | 5/2002 | Tominaga | B24B 37/24 51/300 |
| 2011/0127461 | A1 * | 6/2011 | Fukuoka | C08K 3/20 252/74 |

OTHER PUBLICATIONS

Journal of the American Ceramic Society, "SiOH Glass-Diamond Composites", Sellappan et al. (Year: 2012).*

* cited by examiner

*Primary Examiner* — Margaret G Moore
(74) *Attorney, Agent, or Firm* — C. Tumey Law Group PLLC

(57) ABSTRACT

Polysilocarb formulations, cured and pyrolized materials, was well as articles and use for this material. In particular pyrolized polysilocarb ceramic materials and articles contain these materials where, the ceramic has from about 30 weight % to about 60 weight % silicon, from about 5 weight % to about 40 weight % oxygen, and from about 3 weight % to about 35 weight % carbon, and wherein 20 weight % to 80 weight % of the carbon is silicon-bound-carbon and 80 weight % to about 20 weight % of the carbon is free carbon.

20 Claims, 10 Drawing Sheets

POLYSILOCARB MATERIALS, METHODS AND USES

This application is a divisional of U.S. patent application Ser. No. 14/634,814 now U.S. Pat. No. 10,167,814, filed Feb. 28, 2015, which: (i) claims under 35 U.S.C. § 119(e)(1) the benefit of the filing date of Feb. 28, 2014 of U.S. provisional application Ser. No. 61/946,598; (ii) claims under 35 U.S.C. § 119(e)(1) the benefit of the filing date of Jan. 21, 2015 of U.S. provisional application Ser. No. 62/106,094; (iii) is a continuation-in-part of U.S. patent application Ser. No. 14/268,150 now U.S. Pat. No. 9,815,943, filed May 2, 2014, which claims, under 35 U.S.C. § 119(e)(1), the benefit of the filing date of May 2, 2013 of U.S. provisional application Ser. No. 61/818,906 and the benefit of the filing date of May 3, 2013 of U.S. provisional application Ser. No. 61/818,981; and (iv) is a continuation-in-part of U.S. patent application Ser. No. 14/212,896 now U.S. Pat. No. 9,815,852 filed Mar. 14, 2014, the entire disclosures of each of which are incorporated herein by reference.

BACKGROUND OF THE INVENTION

Field of the Invention

The present inventions relate to polyorganic compositions, structures and materials; polymer derived preceramic and ceramic materials; and in particular polysilocarb compositions, structures and materials. The present inventions further relate to methods for making these compositions, structures and materials. Polymeric derived ceramic materials are disclosed and taught in U.S. Patent Application Ser. No. 61/818,981, 61/818,906, 61/788,632, 61/843,014, and 61/890,808, the entire disclosures of each of which are incorporated herein by reference.

Materials made of, or derived from, carbosilane or polycarbosilane (Si—C), silane or polysilane (Si—Si), silazane or polysilazane (Si—N—Si), silicon carbide (SiC), carbosilazane or polycarbosilazane (Si—N—Si—C—Si), siloxane or polysiloxanes (Si—O) are known. These general types of materials have great, but unrealized promise; and have failed to find large-scale applications or market acceptance. Instead, their use has been relegated to very narrow, limited, low volume, high priced and highly specific applications, such as a ceramic component in a rocket nozzle, or a patch for the space shuttle. Thus, they have failed to obtain wide spread use ceramics, and it is believed they have obtained even less acceptance and use, if any, as a plastic material, e.g., cured but not pyrolized.

To a greater or lesser extent all of these materials and the process used to make them suffer from one or more failings, including for example: they are exceptionally expensive and difficult to make, having costs in the thousands and tens-of-thousands of dollars per pound; they require high and very high purity starting materials; the process requires hazardous organic solvents such as toluene, tetrahydrofuran (THF), and hexane; the materials are incapable of making non-reinforced structures having any usable strength; the process produces undesirable and hazardous byproducts, such as hydrochloric acid and sludge, which may contain magnesium; the process requires multiple solvent and reagent based reaction steps coupled with curing and pyrolizing steps; the materials are incapable of forming a useful prepreg; and their overall physical properties are mixed, e.g., good temperature properties but highly brittle.

As a result, although believed to have great promise, these types of materials have failed to find large-scale applications or market acceptance and have remained essentially scientific curiosities.

SUMMARY

Accordingly, there has been a long-standing and unfulfilled need for new materials that have the performance characteristic and features of high priced ceramics but with lower costs and greater flexibility in manufacturing and using the material. The present inventions, among other things, solve these needs by providing the articles of manufacture, devices and processes taught, disclosed and claimed herein.

There is provided a polysilocarb derived reinforced composite grinding or cutting member; having: a bulk phase and a cutting material; wherein the bulk phase is derived from a polysilocarb formulation.

There is provided the materials, methods, articles that have one or more of the following features: wherein the polysilocarb formulation is a reaction type formulation; wherein the polysilocarb formulation is a reaction type formulation, wherein the formulation has at least one precursor selected from the group consisting of Phenyltriethoxysilane, Phenylmethyldiethoxysilane, Methyldiethoxysilane, Vinylmethyldiethoxysilane, Trimethyethoxysilane Triethoxysilane, and TES 40; wherein the polysilocarb formulation is a reaction type formulation, whereby the formulation has at least two precursors selected from the group consisting of Phenyltriethoxysilane, Phenylmethyldiethoxysilane, Methyldiethoxysilane, Vinylmethyldiethoxysilane, Trimethyethoxysilane Triethoxysilane, and TES 40; wherein the cutting material is selected from the group consisting of polycrystalline diamond compact, SiC, Aluminum oxide and diamond; wherein the cutting material is evening distributed through the entirety of the member; wherein the cutting material is evening distributed through a majority of a outer volume of the member, wherein the outer volume defines at least about 50% of the total volume of the member; wherein the polysilocarb formulation is a mixing type formulation; wherein the polysilocarb formulation is a mixing type formulation, wherein the formulation has at least one precursor selected from the group consisting of methyl terminated vinyl polysiloxane, vinyl terminated vinyl polysiloxane, hydride terminated vinyl polysiloxane, vinyl terminated dimethyl polysiloxane, hydroxy terminated dimethyl polysiloxane, phenyl terminated dimethyl polysiloxane, methyl terminated phenylethyl polysiloxane, and tetravinyl cyclosiloxane; wherein the polysilocarb formulation is substantially solvent free.

Yet further there is provided a structural building member having a cured polysilocarb formulation.

There is provided the materials, methods, articles that have one or more of the following features: having a structural component and a cured polysiloxane formulation; wherein the structural component is selected from the group consisting of dry wall, sheet rock, gypsum board, MDF board, plywood, plastics and particleboard; having a second component selected from the group consisting of paints, glues and plastics; and wherein the second component has a cured polysiloxane formulation; wherein the cured polysiloxane formulation is a volumetric shape; wherein the polysilocarb formulation is a reaction type formulation; wherein the polysilocarb formulation is a mixing type formulation; wherein the polysilocarb formulation is a mixing type formulation, wherein the formulation has at least one precursor selected from the group consisting of methyl terminated vinyl polysiloxane, vinyl terminated vinyl polysiloxane, hydride terminated vinyl polysiloxane, vinyl terminated dimethyl polysiloxane, hydroxy terminated dimethyl polysiloxane, phenyl terminated dimethyl polysiloxane, methyl terminated phenylethyl polysiloxane, and tetravinyl cyclosiloxane; wherein the polysilocarb formulation is substantially solvent free.

Yet further there is provided a structural building member having a pyrolized polysilocarb ceramic, the ceramic having from about 30 weight % to about 60 weight % silicon, from about 5 weight % to about 40 weight % oxygen, and from about 3 weight % to about 35 weight % carbon, and wherein 20 weight % to 80 weight % of the carbon is silicon-bound-carbon and 80 weight % to about 20 weight % of the carbon is free carbon.

There is provided the materials, methods, articles that have one or more of the following features: wherein the ceramic material has about 40 weight % to about 50 weight % silicon, and wherein about 25 weight % to about 40 weight % of the carbon is silicon-bound-carbon; wherein the ceramic material has about 40 weight % to about 50 weight % silicon, and wherein about 55 weight % to about 75 weight % of the carbon is free carbon; wherein the ceramic material has about 20 weight % to about 30 weight % oxygen, and wherein about 25 weight % to about 40 weight % of the carbon is silicon-bound-carbon; wherein the ceramic material has about about 20 weight % to about 30 weight % oxygen, and wherein about 55 weight % to about 75 weight % of the carbon is free carbon; wherein the ceramic material has about 20 weight % to about 30 weight % carbon, and wherein about 25 weight % to about 40 weight % of the carbon is silicon-bound-carbon; wherein the ceramic material has about about 20 weight % to about 30 weight % carbon, and wherein about 55 weight % to about 75 weight % of the carbon is free carbon.

Still further there is provided a method of providing flame protection to a structural assembly, the method having selecting a structural assembly for treating with a polysiloxane formulation; applying the polysiloxane formulation to the structural assembly; the polysiloxane formulation capable of reacting to a hard cure in less than two days at 75 degrees F.; curing the polysiloxane formulation; whereby the structural assembly with the hard cured polysiloxane application has a standard fire test of at least about %-h under ASTM E-119.

There is provided the materials, methods, articles that have one or more of the following features: whereby the structural assembly with the hard cured polysiloxane application has a standard fire test of at least about 2-h under ASTM E-119; whereby the structural assembly with the hard cured polysiloxane application has a standard fire test of at least about 4-h under ASTM E-119; wherein the structural assembly is selected from the group consisting of bearing walls, masonry units, composite assemblies of structural materials for buildings, non-bearing walls, partitions, columns, girders, beams, slabs, and composite slab and beam assemblies for floors and roofs.

Moreover, there is provided a flame resistant structural assembly, having: a structural assembly and a hard cured polysiloxane formulation; the polysiloxane formulation being at least substantially free from halogens; wherein the flame resistant structural assembly exceeds a standard fire test of at least about %-h under ASTM E-119.

Furthermore there is provided a flame resistant outer wrap for structural assembly, having: a flame resistant outer wrap for structural assembly and a hard cured polysiloxane formulation impregnated into the outer wrap; the polysiloxane formulation being at least substantially free from halogens.

Still further there is provided a fire resistant plastic having a first plastic and a halogen free fire retardant, the fire retardant having a hard cured polysiloxane formulation; the plastic capable of meeting at least V0 rating under UL-94.

Yet further there is provided an end product having a polysilocarb formulation, the end product selected from the group consisting of fibers, proppants, silane coated proppants, silane and antistatic coated proppants, blast shield, a ballistic composite, structural member, trailer, mobile building, shipping container, friction member, grinding device, armored vehicle, body armor, insulation, paint, fire resistant coatings, counter tops, exhaust systems, tubular structures, wiring insulation, pipe insulation, pipe linings, concrete, and vapor barrier.

Additionally there is provided end products wherein the polysilocarb formulation has a pyrolized ceramic, the ceramic having from about 30 weight % to about 60 weight % silicon, from about 5 weight % to about 40 weight % oxygen, and from about 3 weight % to about 35 weight % carbon, and wherein 20 weight % to 80 weight % of the carbon is silicon-bound-carbon and 80 weight % to about 20 weight % of the carbon is free carbon.

Yet further there is provided a method of making an article, wherein in the article is selected from the group consisting of fibers, proppants, silane coated proppants, silane and antistatic coated proppants, blast shield, a ballistic composite, structural member, trailer, mobile building, shipping container, friction member, grinding device, armored vehicle, body armor, insulation, paint, fire resistant coatings, counter tops, exhaust systems, tubular structures, wiring insulation, pipe insulation, pipe linings, concrete, and vapor barrier; the method having selecting a polysilocarb formulation, making the polysilocarb formulation, making the article by processing the polysilocarb formulation as at least from 0.05% to 100% of the article.

Still additionally, there is provided an article product having a pyrolized polysilocarb ceramic, the ceramic having from about 30 weight % to about 60 weight % silicon, from about 5 weight % to about 40 weight % oxygen, and from about 3 weight % to about 35 weight % carbon, and wherein 20 weight % to 80 weight % of the carbon is silicon-bound-carbon and 80 weight % to about 20 weight % of the carbon is free carbon.

DESCRIPTION OF THE PREFERRED EMBODIMENTS

Figure 1B:
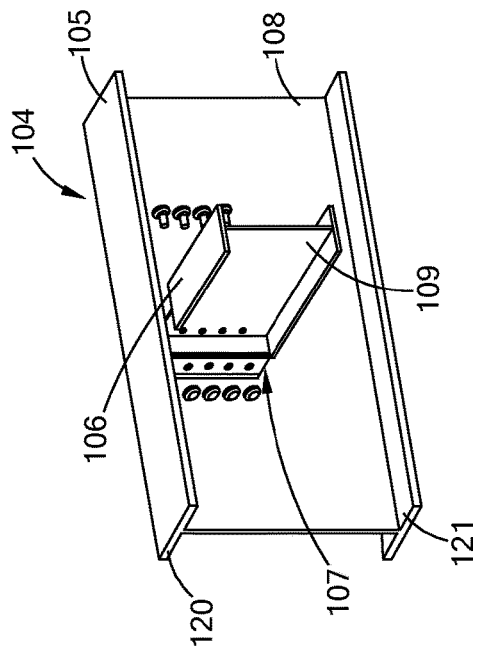
FIG. 1B is a perspective view of an embodiment of polysilocarb structural members in accordance with the present inventions.

In general, the present inventions relate to unique and novel silicon (Si) based materials that are easy to manufacture, handle and have surprising and unexpected properties and applications. These silicon based materials have applications and utilizations as a liquid material, a cured material, e.g., a plastic, a preceramic, and a pyrolized material, e.g., a ceramic.

The silicon based materials of the present inventions go against the general trends of the art of silicon chemistry and uses. Generally, the art of silicon chemistry, and in particular organosilicon chemistry, has moved toward greater and greater complexity in the functional groups that are appended to, and a part of, a silicon based polymeric backbone. Similarly, in general, the processes that are utilized to make these polymers have moved toward greater and greater complexity. The present inventions move away from this trend, by preferably functionalizing a silicon based polymeric backbone with simpler structures, such as phenyl, phenylethyl and smaller groups, and do so with processes that are simplified, e.g., solvent free, reduced solvent, lower cost starting materials, fewer steps, and reduction of reaction intermediates.

Further, and generally, the art views silicones as tacky, soft or liquid materials that are used with, on, or in conjunction with, other materials to enhance or provide a performance feature to those other materials. Silicon based materials generally are not viewed as stand alone products, primary products, or structural elements. The silicon based materials of the present inventions, however, move away from this trend and understanding in the art. The silicon based materials of the present inventions provide materials that, among other things, can function as stand alone products, primary products and structural elements. The silicon based materials of the present invention can also function as composites, coatings, components, additives, material performance enhancers, and other applications and utilizations.

Thus, the present inventions provide a new material systems and platform having many varied formulations, applications and uses, which could not generally have been obtained with prior silicon based products, and in particular, could not generally have been obtained with prior silicon based products at acceptable costs, volumes, manufacturing conditions, handling requirements, or processing conditions among other things.

Generally, the present inventions are directed toward "polysilocarb" materials, e.g., material containing silicon (Si), oxygen (O) and carbon (C), and materials that have been pyrolized from such materials. Polysilocarb materials may also contain other elements. Polysilocarb materials are made from one or more polysilocarb precursor formulation or precursor formulation. The polysilocarb precursor formulation contains one or more functionalized silicon polymers, or monomers, as well as, potentially other ingredients, such as for example, inhibitors, catalysts, pore formers, fillers, reinforcers, fibers, particles, colorants, pigments, dies, polymer derived ceramics ("PDC"), ceramics, metals, metal complexes, and combinations and variations of these and other materials and additives.

The polysilocarb precursor formulation is then cured to form a solid or semi-sold material, e.g., a plastic. The polysilocarb precursor formulation may be processed through an initial cure, to provide a partially cured material, which may also be referred to, for example, as a preform, green material, or green cure (not implying anything about the material's color). The green material may then be further cured. Thus, one or more curing steps may be used. The material may be "end cured," i.e., being cured to that point at which the material has the necessary physical strength and other properties for its intended purpose. The amount of curing may be to a final cure (or "hard cure"), i.e., that point at which all, or essentially all, of the chemical reaction has stopped (as measured, for example, by the absence of reactive groups in the material, or the leveling off of the decrease in reactive groups over time). Thus, the material may be cured to varying degrees, depending upon it's intended use and purpose. For example, in some situations the end cure and the hard cure may be the same.

The curing may be done at standard ambient temperature and pressure ("SATP", 1 atmosphere, 25° C.), at temperatures above or below that temperature, at pressures above or below that pressure, and over varying time periods (both continuous and cycled, e.g., heating followed by cooling and reheating), from less than a minute, to minutes, to hours, to days (or potentially longer), and in air, in liquid, or in a preselected atmosphere, e.g., Argon (Ar) or nitrogen ($N_2$).

The polysilocarb precursor formulations can be made into non-reinforced, non-filled, composite, reinforced, and filled structures, intermediates and end products, and combinations and variations of these and other types of materials. Further, these structures, intermediates and end products can be cured (e.g., green cured, end cured, or hard cured), uncured, pyrolized to a ceramic, and combinations and variations of these (e.g., a cured material may be filled with pyrolized beads derived from the same polysilocarb as the cured material).

The precursor formulations may be used to form a "neat" materials, (by "neat" material it is meant that all, and essentially all of the structure is made from the precursor material or unfilled formulation; and thus, there are no fillers or reinforcements). They may be used to form composite materials, e.g., reinforced products. They may be used to form non-reinforced materials, which are materials that are made of primarily, essentially, and preferably only from the precursor materials, for example a pigmented polysiloxane structure having only precursor material and a colorant would be considered non-reinforced material.

In making the polysilocarb precursor formulation into a structure, part, intermediate, or end product, the polysilocarb formulation can be, for example, sprayed, flowed, thermal sprayed, painted, molded, formed, extruded, spun, dropped, injected or otherwise manipulated into essentially any volumetric shape, including planer shape (which still has a volume, but is more akin to a coating, skin, film, or even a counter top, where the thickness is significantly smaller, if not orders of magnitude smaller, than the other dimensions), and combinations and variations of these. These volumetric shapes would include, for example, spheres, pellets, rings, lenses, disks, panels, cones, frustoconical shapes, squares, rectangles, trusses, angles, channels, hollow sealed chambers, hollow spheres, blocks, sheets, coatings, films, skins, particulates, beams, rods, angles, columns, fibers, staple fibers, tubes, cups, pipes, and combinations and various of these and other more complex shapes, both engineering and architectural. Additionally, they may be shaped into preforms, or preliminary shapes that correspond to, or with, a final product, such as for example use in or with, a break pad, a clutch plate, a break shoe, a motor, high temperature parts of a motor, a diesel motor, rocket components, turbine components, air plane components, space vehicle components, building materials, shipping container components, and other structures or components.

The polysilocarb precursor formulations may be used with reinforcing materials to form a composite material. Thus, for example, the formulation may be flowed into, impregnated into, absorbed by or otherwise combined with a reinforcing material, such as carbon fibers, glass fiber, woven fabric, non-woven fabric, copped fibers, fibers, rope, braided structures, ceramic powders, glass powders, carbon powders, graphite powders, ceramic fibers, metal powders, carbide pellets or components, staple fibers, tow, nanostructures of the above, PDCs, any other material that meets the temperature requirements of the process and end product, and combinations and variations of these. Thus, for example, the reinforcing materials may be any of the high temperature resistant reinforcing materials currently used, or capable of being used with, existing plastics and ceramic composite materials. Additionally, because the polysilocarb precursor formulation may be formulated for a lower temperature cure (e.g., SATP) or a cure temperature of for example about 100° F. to about 400° F., the reinforcing material may be polymers, organic polymers, such as nylons, polypropylene, and polyethylene, as well as aramid fibers, such as NOMEX or KEVLAR.

The reinforcing material may also be made from, or derived from the same material as the formulation that has been formed into a fiber and pyrolized into a ceramic, or it may be made from a different precursor formulation material, which has been formed into a fiber and pyrolized into a ceramic. In addition to ceramic fibers derived from the precursor formulation materials that may be used as reinforcing material, other porous, substantially porous, and non-porous ceramic structures derived from a precursor formulation material may be used.

The polysilocarb precursor formulation may be used to form a filled material. A filled material would be any material having other solid, or semi-solid, materials added to the polysilocarb precursor formulation. The filler material may be selected to provide certain features to the cured product, the ceramic product or both. These features may relate to or be aesthetic, tactile, thermal, density, radiation, chemical, magnetic, electric, and combinations and variations of these and other features. These features may be in addition to strength. Thus, the filler material may not affect the strength of the cured or ceramic material, it may add strength, or could even reduce strength in some situations. The filler material could impart color, magnetic capabilities, fire resistances, flame retardance, heat resistance, electrical conductivity, anti-static, optical properties (e.g., reflectivity, refractivity and iridescence), aesthetic properties (such as stone like appearance in building products), chemical resistivity, corrosion resistance, wear resistance, abrasions resistance, thermal insulation, UV stability, UV protective, and other features that may be desirable, necessary, and both, in the end product or material. Thus, filler materials could include copper lead wires, thermal conductive fillers, electrically conductive fillers, lead, optical fibers, ceramic colorants, pigments, oxides, dyes, powders, ceramic fines, PDC particles, pore-formers, carbosilanes, silanes, silazanes, silicon carbide, carbosilazanes, siloxane, powders, ceramic powders, metals, metal complexes, carbon, tow, fibers, staple fibers, boron containing materials, milled fibers, glass, glass fiber, fiber glass, and nanostructures (including nanostructures of the forgoing) to name a few. For example, crushed, PDC particles, e.g., fines or beads, can be added to a polysilocarb formulation and then cured to form a filled cured plastic material, which has significant fire resistant properties as a coating or structural material.

As used herein, unless specifically provided otherwise, the terms flame retardant, fire retardant, flame resistant, fire resistant, flame protection, fire protection, flame suppression, fire suppression, and similar such terms are to be given their broadest possible meanings, and would include all burning, fire, combustion or flame related meanings that are found, described or set forth in standards, codes, certifications, regulations, and guidelines, and would include the lessening, reduction, and avoidance of fire, combustion or smoke.

The fill material may also be made from, or derived from the same material as the formulation that has been formed into a cured or pyrolized solid, or it may be made from a different precursor formulation material, which has been formed into a cured solid or semi-solid, or pyrolized solid.

The polysilocarb formulation and products derived or made from that formulation may have metals and metal complexes. Thus, metals as oxides, carbides or silicides can be introduced into precursor formulations, and thus into a silica matrix in a controlled fashion. Thus, using organometallic, metal halide (chloride, bromide, iodide), metal alkoxide and metal amide compounds of transition metals and then copolymerizing in the silica matrix, through incorporation into a precursor formulation is contemplated.

For example, Cyclopentadienyl compounds of the transition metals can be utilized. Cyclopentadienyl compounds of the transition metals can be organized into two classes: Bis-cyclopentadienyl complexes; and Mono-cyclopentadienyl complexes. Cyclopentadienyl complexes can include $C_5H_5$, $C_5Me_5$, $C_5H_4Me$, $CH_5R_5$ (where R=Me, Et, Propyl, i-Propyl, butyl, Isobutyl, Sec-butyl). In either of these cases Si can be directly bonded to the Cyclopentadienyl ligand or the Si center can be attached to an alkyl chain, which in turn is attached to the Cyclopentadienyl ligand.

Cyclopentadienyl complexes, that can be utilized with precursor formulations and in products, can include: bis-cyclopentadienyl metal complexes of first row transition metals (Titanium, Vanadium, Chromium, Iron, Cobalt, Nickel); second row transition metals (Zirconium, Molybdenum, Ruthenium, Rhodium, Palladium); third row transition metals (Hafnium, Tantalum, Tungsten, Iridium, Osmium, Platinum); Lanthanide series (La, Ce, Pr, Nd, Pm, Sm, Eu, Gd, Tb, Dy, Ho); Actinide series (Ac, Th, Pa, U, Np).

Monocyclopentadienyl complexes may also be utilized to provide metal functionality to precursor formulations and would include monocyclopentadienyl complexes of: first row transition metals (Titanium, Vanadium, Chromium, Iron, Cobalt, Nickel); second row transition metals (Zirconium, Molybdenum, Ruthenium, Rhodium, Palladium); third row transition metals (Hafnium, Tantalum, Tungsten, Iridium, Osmium, Platinum) when preferably stabilized with proper ligands, (for instance Chloride or Carbonyl).

Alky complexes of metals may also be used to provide metal functionality to precursor formulations and products. In these alkyl complexes the Si center has an alkyl group (ethyl, propyl, butyl, vinyl, propenyl, butenyl) which can bond to transition metal direct through a sigma bond. Further, this would be more common with later transition metals such as Pd, Rh, Pt, Ir.

Coordination complexes of metals may also be used to provide metal functionality to precursor formulations and products. In these coordination complexes the Si center has an unsaturated alkyl group (vinyl, propenyl, butenyl, acetylene, butadienyl) which can bond to carbonyl complexes or ene complexes of Cr, Mo, W, Mn, Re, Fe, Ru, Os, Co, Rh, Ir, Ni. The Si center may also be attached to a phenyl, substituted phenyl or other aryl compound (pyridine, pyrimidine) and the phenyl or aryl group can displace carbonyls on the metal centers.

Metal alkoxides may also be used to provide metal functionality to precursor formulations and products. Metal alkoxide compounds can be mixed with the Silicon precursor compounds and then treated with water to form the oxides at the same time as the polymer, copolymerize. This can also be done with metal halides and metal amides. Preferably, this may be done using early transition metals along with Aluminum, Gallium and Indium, later transition metals: Fe, Mn, Cu, and alkaline earth metals: Ca, Sr, Ba, Mg.

Compounds where Si is directly bonded to a metal center which is stabilized by halide or organic groups may also be utilized to provide metal functionality to precursor formulations and products.

Additionally, it should be understood that the metal and metal complexes may be the continuous phase after pyrolysis, or subsequent heat treatment. Formulations can be specifically designed to react with selected metals to in situ form metal carbides, oxides and other metal compounds, generally known as cermets (e.g., ceramic metallic compounds). The formulations can be reacted with selected metals to form in situ compounds such as mullite, alumino silicate, and others. The amount of metal relative to the amount of silica in the formulation or end product can be from about 0.1 mole % to 99.9 mole %, about 1 mole % or greater, about 10 mole % or greater, about 20 mole percent or greater % and greater. The forgoing use of metals with the present precursor formulas can be used to control and provide predetermined stoichiometries.

Filled materials would include reinforced materials. In many cases, cured, as well as pyrolized polysilocarb filled materials can be viewed as composite materials. Generally, under this view, the polysilocarb would constitute the bulk or matrix phase, (e.g., a continuous, or substantially continuous phase), and the filler would constitute the dispersed (e.g., non-continuous), phase.

It should be noted, however, that by referring to a material as "filled" or "reinforced" it does not imply that the majority (either by weight, volume, or both) of that material is the polysilocarb. Thus, generally, the ratio (either weight or volume) of polysilocarb to filler material could be from about 0.1:99.9 to 99.9:0.1. Smaller amounts of filler material or polysilocarb could also be present or utilized, but would more typically be viewed as an additive or referred to in other manners. Thus, the terms composite, filled material, polysilocarb filled materials, reinforced materials, polysilocarb reinforced materials, polysilocarb filled materials, polysilocarb reinforced materials and similar such terms should be viewed as non-limiting as to amounts and ratios of the material's constitutes, and thus in this context, be given their broadest possible meaning.

The polysilocarb precursor formulation may be specifically formulated to cure under conditions (e.g., temperature, and perhaps time) that match, e.g., are predetermined to match, the properties of the reinforcing material, filler material or substrate. These materials may also be made from, or derived from, the same material as the polysilocarb precursor formulation that is used as the matrix, or it may be made from a different polysilocarb precursor formulation. In addition to ceramic fibers derived from the polysilocarb precursor formulation materials, porous, substantially porous, and non-porous ceramic structures derived from a polysilocarb precursor formulation material may be used as filler or reinforcing material.

The polysilocarb precursor formulations may be used to coat or impregnate a woven or non-woven fabric, made from for example carbon fiber, glass fibers or fibers made from a polysilocarb precursor formulation (the same or different formulation), to from a prepreg material. Further, a polysilocarb precursor formulation may be used as an interface coating on the reinforcing material, for use either with a polysilocarb precursor formulation as the matrix material. Further, carbon fiber may be heat treated to about 1,400° to about 1,800° or higher, which creates a surface feature that eliminates the need for a separate interface coating, for use with polysilocarb precursor formulations.

Fillers can reduce the amount of shrinkage that occurs during the processing of the formulation into a ceramic, they can be used to provide a predetermined density of the product, either reducing or increasing density, and can be used to provide other customized and predetermined product and processing features. Fillers, at larger amounts, e.g., greater than 10%, can have the effect of reducing shrinkage during cure.

Depending upon the particular application, product or end use, the filler can be evenly distributed in the precursor formulation, unevenly distributed, a predetermined rate of settling, and can have different amounts in different formulations, which can then be formed into a product having a predetermined amounts of filler in predetermined areas, e.g., striated layers having different filler concentration.

Preferably, for a typical filled product, the filler is substantially evenly distributed and more preferably evenly distributed within the end product. In this manner localize stresses or weak points can be avoided. Generally, for a non-reinforced material each filler particle may have a volume that is less than about 0.3%, less than about 0.2%, less than about 0.1%, and less than about 0.05% of the volume of a product, intermediate or part. For example if the product is spherical in shape and the filler is spherical in shape the diameter of the filler should preferable be about 1/10 to about 1/20 of the diameter of the proppant particle, and more preferably the filler diameter should be less than about ¹⁄₂₀ of the diameter of the proppant particle. Generally, the relative amount of filler used in a material should preferable be about 30% to about 65% of the volume of the sphere, e.g., volume %.

Generally, when a small particulate filler, e.g., fines, beads, pellets, is used for the purposes of increasing strength, without the presence of fibers, fabric, etc., generally at least about 2% to at least about 5 volume %, can show an increase in the strength, although this may be greater or smaller depending upon other factors, such as the shape and volume of the product, later processing conditions, e.g., cure time, temperature, number of pyrolysis reinfiltrations. Generally, as the filler level increases from about above 5 volume % no further strength benefits may be realized. Such small particulate filled products, in which appreciable strength benefits are obtained from the filler, and in particular an increase in strength of at least about 5%, at last about 10% and preferably at least about 20% would be considered to be reinforced products and materials.

As used herein, unless specified otherwise the terms %, weight % and mass % are used interchangeably and refer to the weight of a first component as a percentage of the weight of the total, e.g., formulation, mixture, material or product. As used herein, unless specified otherwise "volume %" and "% volume" and similar such terms refer to the volume of a first component as a percentage of the volume of the total, e.g., formulation, material or product.

At various points during the manufacturing process, the polysilocarb structures, intermediates and end products, and combinations and variations of these, may be machined, milled, molded, shaped, drilled or otherwise mechanically processed and shaped.

Generally, the term "about" is meant to encompass a variance or range of ±10%, the experimental or instrument error associated with obtaining the stated value, and preferably the larger of these.

The precursor formulations are preferably clear or are essentially colorless and generally transmissive to light in the visible wavelengths. They may, depending upon the formulation have a turbid, milky or clouding appearance. They may also have color bodies, pigments or colorants, as well as color filler (which can survive pyrolysis, for ceramic end products, such as those used in ceramic pottery glazes). The precursor may also have a yellow or amber color or tint, without the need of the addition of a colorant.

The precursor formulations may be packaged, shipped and stored for later use in forming products, e.g., structures or parts, or they may be used directly in these processes, e.g., continuous process to make a product. Thus, a precursor formulation may be stored in 55 gallon drums, tank trucks, rail tack cars, onsite storage tanks having the capable of holding hundreds of gals, and shipping totes holding 1,000 liters, by way of example. Additionally, in manufacturing process the formulations may be made and used in a continuous, and semi-continuous processes.

The present inventions, among other things, provide substantial flexibility in designing processes, systems, ceramics, having processing properties and end product performance features to meet predetermined and specific performance criteria. Thus, for example the viscosity of the precursor formulation may me predetermined by the formulation to match a particular morphology of the reinforcing material, the cure temperature of the precursor formulation may be predetermined by the formulation to enable a prepreg to have an extended shelf life. The viscosity of the of the precursor formulation may be established so that the precursor readily flows into the reinforcing material of the prepreg while at the same time being thick enough to prevent the precursor formulation from draining or running off of the reinforcing material. The formulation of the precursor formulation may also, for example, be such that the strength of a cured preform is sufficient to allow rough or initial machining of the preform, prior to pyrolysis.

Custom and predetermined control of when chemical reactions occur in the various stages of the process from raw material to final end product can provide for reduced costs, increased process control, increased reliability, increased efficiency, enhanced product features, and combinations and variation of these and other benefits. The sequencing of when chemical reactions take place can be based primarily upon the processing or making of precursors, and the processing or making of precursor formulations; and may also be based upon cure and pyrolysis conditions. Further, the custom and predetermined selection of these steps, formulations and conditions, can provide enhanced product and processing features through chemical reactions, molecular arrangements and rearrangements, and microstructure arrangements and rearrangements, that preferably have been predetermined and controlled.

Generally, the process form making the present polysilocarb materials involves one or more steps. The starting materials are obtained, made or derived. Precursors are obtained or can be made from starting materials. The precursors are combined to form a precursor formulation. The precursor formulation is then shaped, formed, molded, etc. into a desired form, which form is then cured, which among other things transforms the precursor formulation into a plastic like material. This cured plastic like material can then be pyrolyzed into a ceramic. It being understood, that these steps may not all be used, that some of these steps may be repeated, once, twice or several times, and that combinations and variations of these general steps may be utilized to obtain a desired product or result.

Depending upon the specific process and desired features of the product the precursors and starting materials, the process type and conditions and the precursors can be predetermined and preselected. This regime of precursors and processes provides great flexibility to create custom features for intermediate, end and final products, and thus, typically, combinations and variations of them, can provide a specific predetermined product. Factors such as cost, controllability, shelf life, scale up, manufacturing ease, etc., can also be considered.

In embodiments, precursor materials may be methyl hydrogen, and substituted and modified methyl hydrogens, siloxane backbone additives, reactive monomers, hydrocarbons, reaction products of a siloxane backbone additive with a silane modifier or an organic modifier, and other similar types of materials, such as silane based materials, silazane based materials, carbosilane based materials, phenol/formaldehyde based materials, and combinations and variations of these and others.

Additionally, inhibitors such as cyclohexane, 1-Ethynyl-1-cyclohexanol (which may be obtained from ALDRICH), Octamethylcyclotetrasiloxane, tetramethyltetravinylcyclotetrasiloxane (which may act, depending upon amount and temperature as a reactant or a reactant retardant (i.e., slows down a reaction to increase pot life), e.g., at room temperature it is a retardant and at elevated temperatures it is a reactant), may be added to the polysilocarb precursor formulation, e.g., an inhibited polysilocarb precursor formulation. Other materials, as well, may be added to the polysilocarb precursor formulation, e.g., a filled polysilocarb precursor formulation, at this point in processing, including fillers such as SiC powder, carbon black, PDC particles, pigments, particles, nano-tubes, whiskers, or other materials, discussed in this specification or otherwise known to the arts. Further, a formulation with both inhibitors and fillers would be considered an inhibited, filled polysilocarb precursor formulation.

Precursors and precursor formulations are preferably non-hazardous materials. Generally they have flash points that are preferably above room and typical storage temperatures, are preferably noncorrosive, preferably have low vapor pressure, low or no odor, and may be non- or mildly irritating to the skin. A catalyst may be used, and can be added at the time of, prior to, shortly before, or at an earlier time before the precursor formulation is formed or made into a structure, prior to curing. Precursor formulations can have pot lives, that meet the needs of the manufacturing process. Generally, catalysts can be used and can be balance with, or used in conjunction with the inhibitor to have a predetermined and predictable shelf life, cure time, cure temperature profiles. These profiles can be tailored to the specific manufacturing processes, e.g., ship and hold for a month before curing, or ship hold and process directly from liquid to ceramic, or make and cure with minimal shipping or hold times.

In this mixing type process for making a precursor formulation, preferably chemical reactions or molecular rearrangements only take place during the making of the precursors, the curing process of the preform, and in the pyrolizing process. Thus, chemical reactions, e.g., polymerizations, reductions, condensations, substitutions, take place or are utilized in the making of a precursor. In making a polysilocarb precursor formulation preferably no and essentially no, chemical reactions and molecular rearrangements take place. These embodiments of the present mixing type process, which avoid the need to, and do not, utilize a polymerization or other reaction during the making of a precursor formulation, provides significant advantages over prior methods of making polymer derived ceramics. Preferably, in the embodiments of these mixing type of formulations and processes, polymerization, crosslinking or other chemical reactions take place primarily, preferably essentially, and more preferably solely in the preform during the curing process.

The precursors may also be selected from the following:

| SiSiB® HF2020 | TRIMETHYLSILYL TERMINATED METHYL HYDROGEN SILICONE FLUID | 63148-57-2 |
|---|---|---|

This is a type of material commonly called methylhydrogen fluid, and has the formula below:

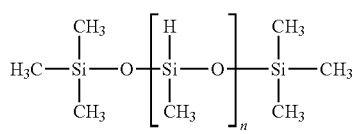

| SiSiB® HF2050 | TRIMETHYLSILYL TERMINATED METHYLHYDROSILOXANE DIMETHYLSILOXANE COPOLYMER | 68037-59-2 |
|---|---|---|

This may be called methyl terminated with dimethyl groups and has the formula below.

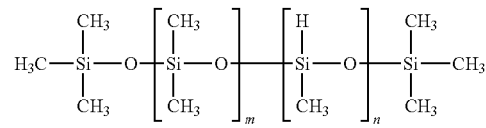

In some embodiments this precursor can decrease the exotherm and decrease shrinkage

| SiSiB® HF2060 | HYDRIDE TERMINATED METHYLHYDROSILOXANE DIMETHYLSILOXANE COPOLYMER | 69013-23-6 |
|---|---|---|

This may be called hydride terminated with dimethyl groups and has the formula below.

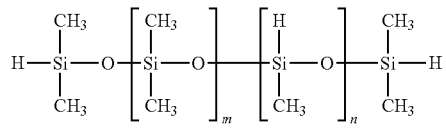

In some embodiments this precursor can decrease the exotherm and decrease shrinkage and provide branch points

| SiSiB® HF2038 | HYDROGEN TERMINATED POLYDIPHENYL SILOXANE | |
|---|---|---|

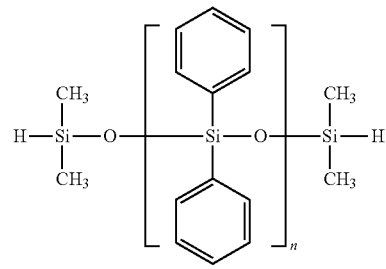

In some embodiments this precursor can improve as-cured toughness and decrease shrinkage and improve thermal stability of as-cured material

| SiSiB® HF2068 | HYDRIDE TERMINATED METHYLHYDROSILOXANE DIMETHYLSILOXANE COPOLYMER | 115487-49-5 |
|---|---|---|

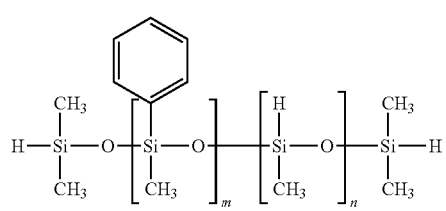

In some embodiments this precursor can improve as-cured toughness and decrease shrinkage and improve thermal stability of as-cured material; but, may allow for higher cross-link density

| iSiB® HF2078 | HYDRIDE TERMINATED POLY(PHENYL-DIMETHYLSILOXY) SILOXANE PHENYL SILSESQUIOXANE, HYDROGEN-TERMINATED | 68952-30-7 |
|---|---|---|

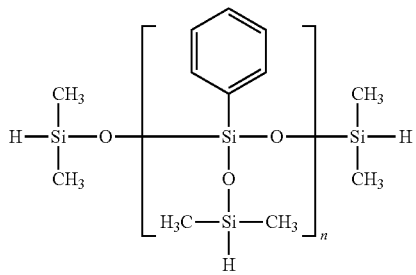

In some embodiments this precursor's tri-functionality can be used for controlled branching, as well as in some embodiments to reduced shrinkage.

| SiSiB® VF6060 | VINYLDIMETHYL TERMINATED VINYLMETHYL-DIMETHYL POLYSILOXANE COPOLYMERS | 68083-18-1 |
|---|---|---|

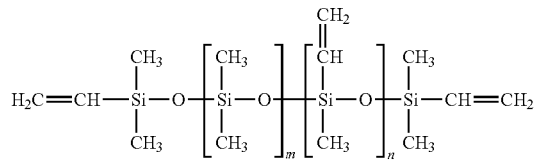

In some embodiments this precursor's tri-functionality can be used for controlled branching, as well as in some embodiments to reduced shrinkage.

| SiSiB® VF6862 | VINYLDIMETHYL TERMINATED DIMETHYL-DIPHENYL POLYSILOXANE COPOLYMER | 68951-96-2 |
|---|---|---|

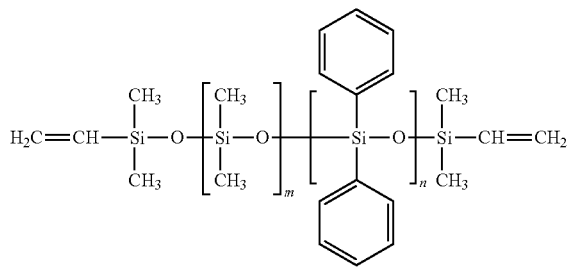

In some embodiments this precursor can be used to improve as cured toughness and decreased shrinkage

| SiSiB® VF6872 | VINYLDIMETHYL TERMINATED DIMETHYL-METHYLVINYL-DIPHENYL POLYSILOXANE COPOLYMER | — |
|---|---|---|

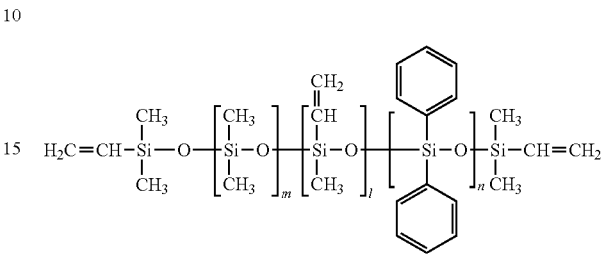

In some embodiments this precursor can be used to improve as cured toughness and decreased shrinkage; as well as providing the ability to improve crosslink density through branching if needed.

| SiSiB® PC9401 | 1,1,3,3-TETRAMETHYL-1,3-DIVINYLDISILOXANE | 2627-95-4 |
|---|---|---|

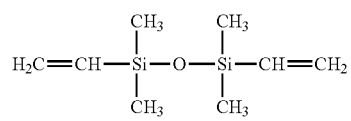

In some embodiments this precursor may provided for less shrinkage than the tetravinyl; but still can provide for high crosslink density due to high vinyl percentage, but primarily through 2-dimensional crosslinking, without any branching

| SiSiB® PF1070 | SILANOL TERMINATED POLYDIMETHYLSILOXANE (OF1070) | 70131-67-8 |
|---|---|---|

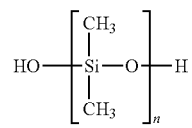

In some embodiments this precursor may assist in decreasing the density by in-situ nano/micro pore formation.

| SiSiB® OF1070 | SILANOL TERMINATED POLYDIMETHYSILOXANE OH-ENDCAPPED POLYDIMETHYLSILOXANE HYDROXY TERMINATED POLYDIMETHYLSILOXANE | 70131-67-8 73138-87-1 |
|---|---|---|

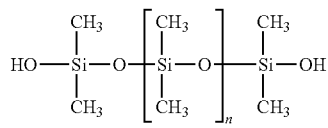

In some embodiments this precursor may assist in decreasing the density by in-situ nano/micro pore formation.

| SiSiB® VF6030 | VINYL TERMINATED POLYDIMETHYL SILOXANE | 68083-19-2 |
|---|---|---|

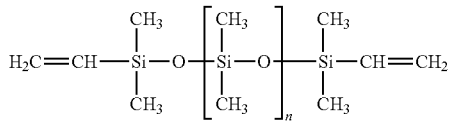

In some embodiments this precursor can increase cure speed, decrease shrinkage slightly, and improves thermal/structural stability of cured and pyrolyzed material

| SiSiB® HF2030 | HYDROGEN TERMINATED POLYDIMETHYLSILOXANE FLUID | 70900-21-9 |
|---|---|---|

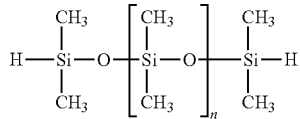

In general, embodiments of formulations for polysilocarb formulations may for example have from about 20% to about 99% MH, about 0% to about 30% siloxane backbone additives, about 1% to about 60% reactive monomers, and, about 0% to about 90% reaction products of a siloxane backbone additives with a silane modifier or an organic modifier reaction products.

In mixing the formulations a sufficient time to permit the precursors to become effectively mixed and dispersed. Typically, the precursor formulations are relatively, and essentially, shear insensitive, and thus the type of pumps or mixing are not critical. It is further noted that in higher viscosity formulations additional mixing time may be required. Embodiments of processes can provide the ability to build custom precursor formulations that when cured can provide plastics having unique and desirable features such as high temperature, flame resistance and retardation, strength and other features. The cured materials can also be pyrolyzed to form ceramics having unique features. This allows for the predetermined balancing of different types of functionality in the end product by selecting function groups for incorporation into the polymer that makes up the precursor formulation.

Embodiments of a preform can be cured in a controlled atmosphere, such as an inert gas, or it can be cured in the atmosphere. The cure conditions, e.g., temperature, time, rate, etc., can be predetermined by the formulation and other processing conditions. For example, such conditions can be selected to match, the size of the preform, the shape of the preform, or the mold holding the preform to prevent stress cracking, off gassing, or other problems associated with the curing process. Further, the curing conditions may be such as to take advantage of, in a controlled manner, what may have been previously perceived as problems associated with the curing process. Thus, for example, off gassing may be used to create a foam material having either open or closed structure. Further, the porosity of the material may be predetermined such that, for example, a particular pore size may be obtained, and in this manner a filter or ceramic screen having predetermined pore sizes, flow characteristic may be made.

The preforms, either unreinforced, neat, or reinforced, may be used as a stand alone product, an end product, a final product, or a preliminary product for which later machining or processing may be performed on. The preforms may also be subject to pyrolysis, which converts the preform material into a ceramic.

In pyrolizing the preform, or cured structure or cured material, in some embodiments it is heated to above about 650° C. to about 1,200° C. At these temperatures typically all organic structures are either removed or combined with the inorganic constituents to form a ceramic. Typically at temperatures in the 650° C. to 1,200° C. range the material is an amorphous glassy ceramic. When heated above 1,200° C. the material may from nano crystalline structures, or micro crystalline structures, such as SiC, $Si_3N_4$, SiCN, β SiC, and above 1,900° C. an α SiC structure may form.

During pyrolysis material is loss through off gassing. The amount of material remaining at the end of a pyrolysis set is referred to as char yield (or pyrolysis yield). Embodiments of formulations are capable of being air pyrolized to form a ceramic and to preferably do so at char yield in excess of at least about 80% and above 88%. The initial or first pyrolysis step generally yields a structure that is not very dense. However, in some examples, such as the use of light weight spheres, the first pyrolysis may be sufficient. Thus, there can be in some embodiments a reinfiltration process that may be performed on the pyrolized material, to add in additional polysilocarb precursor formulation material, to fill in, or fill the voids and spaces in the structure. This reinfiltrated material is they repyrolized. This process of pyrolization, reinfiltration may be repeated, through one, two, three, and up to 10 or more times to obtain the desired density of the final product. Additionally, with formulations of embodiments of the present inventions, the viscosity of the formulation may be tailored to provide more efficient reinfiltrations, and thus, a different formulation may be used at later reinfiltration steps, as the voids or pores become smaller and more difficult to get the formulation material into it. The high char yields, and other features of embodiments of the present invention, enable the manufacture of completely closed structures, e.g., "helium tight" materials, with less than twelve reinfiltration steps, less than about 10 reinfiltrations steps and less than five reinfiltrations steps. Thus, by way of example, an initial inert gas pyrolysis may be performed with a high char yield formulation followed by four reinfiltration air pyrolysis steps.

Embodiments of the present inventions have the ability to utilize precursors that have impurities, high-level impurities and significant impurities. Thus, the precursors may have more than about 0.1% impurities, more than about 0.5%, more than about 1% impurities, more than about 5% impurities, more than about 10% impurities, and more than about 50% impurities. In using materials with impurities, the amounts of these impurities, or at least the relative amounts, so that the amount of actual precursor is known, should preferably be determined by for example GPC (Gel Permeation Chromatography) or other methods of analysis. In this manner the formulation of the polysilocarb precursor formulation may be adjusted for the amount of impurities present. The ability of embodiments of the present invention to utilize lower level impurity materials, and essentially impure materials, and highly impure materials, provides significant advantages over other method of making polymer derived ceramics. This provides two significant advantages, among other things. First, the ability to use impure, lower purity, materials in embodiments of the present inventions, provides the ability to greatly reduce the cost of the formulations and end products, e.g., cured preforms, cured parts, and ceramic parts or structures. Second, the ability to use impure, lower purity, materials in embodiments of the present inventions, provides the ability to have end products, e.g., cured preforms, cured parts, and ceramic parts or structures, that have a substantially greater consistence from part to part, because variations in starting materials can be adjusted for during the formulation of each polysilocarb precursor formulation.

The equipment, processes and techniques to make the present inventions can be any of the systems, processes and techniques disclosed and taught in this specification, know to the art for molding, forming, extruding, coating, and assembling components, as well as, those disclosed and taught in U.S. patent application Ser. Nos. 14/212,986, 14/268,150, 14/324,056, 14/514,257, 61/946,598 and 62/055,397 and 62/106,094, the entire disclosure of each of which are incorporated herein by reference.

It should be understood that the use of headings in this specification is for the purpose of clarity, reference, and is not limiting in any way. Thus, the processes compositions, and disclosures described under a heading should be read in context with the entirely of this specification, including the various examples. The use of headings in this specification should not limit the scope of protection afford the present inventions.

General Processes for Obtaining a Polysilocarb Precursor

Typically polymer derived ceramic precursor formulations, and in particular polysilocarb precursor formulations can generally be made by three types of processes, although other processes, and variations and combinations of these processes may be utilized. These processes generally involve combining precursors to form a precursor formulation. One type of process generally involves the mixing together of precursor materials in preferably a solvent free process with essentially no chemical reactions taking place, e.g., "the mixing process." The other type of process generally involves chemical reactions, e.g., "the reaction type process," to form specific, e.g., custom, precursor formulations, which could be monomers, dimers, trimers and polymers. A third type of process has a chemical reaction of two or more components in a solvent free environment, e.g., "the reaction blending type process." Generally, in the mixing process essentially all, and preferably all, of the chemical reactions take place during subsequent processing, such as during curing, pyrolysis and both.

It should be understood that these terms—reaction type process, reaction blending type process, and the mixing type process—are used for convenience and as a short hand reference. These terms are not, and should not be viewed as, limiting. For example, the reaction process can be used to create a precursor material that is then used in the mixing process with another precursor material.

These process types are described in this specification, among other places, under their respective headings. It should be understood that the teachings for one process, under one heading, and the teachings for the other processes, under the other headings, can be applicable to each other, as well as, being applicable to other sections, embodiments and teachings in this specification, and vice versa. The starting or precursor materials for one type of process may be used in the other type of processes. Further, it should be understood that the processes described under these headings should be read in context with the entirely of this specification, including the various examples and embodiments.

It should be understood that combinations and variations of these processes may be used in reaching a precursor formulation, and in reaching intermediate, end and final products. Depending upon the specific process and desired features of the product the precursors and starting materials for one process type can be used in the other. A formulation from the mixing type process may be used as a precursor, or component in the reaction type process, or the reaction blending type process. Similarly, a formulation from the reaction type process may be used in the mixing type process and the reaction blending process. Similarly, a formulation from the reaction blending type process may be used in the mixing type process and the reaction type process. Thus, and preferably, the optimum performance and features from the other processes can be combined and utilized to provide a cost effective and efficient process and end product. These processes provide great flexibility to create custom features for intermediate, end, and final products, and thus, any of these processes, and combinations of them, can provide a specific predetermined product. In selecting which type of process is preferable, factors such as cost, controllability, shelf life, scale up, manufacturing ease, etc., can be considered.

In addition to being commercially available the precursors may be made by way of an alkoxylation type process, e.g., an ethoxylation process. In this process chlorosilanes are reacted with ethanol in the presences of a catalysis, e.g., HCl, to provide the precursor materials, which materials may further be reacted to provide longer chain precursors. Other alcohols, e.g., methanol may also be used. Thus, for example $SiCl_4$, $SiCl_3H$, $SiCl_2(CH_3)_2$, $SiCl_2(CH_3)H$, $Si(CH_3)3Cl$, $Si(CH_3)ClH$, are reacted with ethanol $CH_3CH_2OH$ to form precursors. In some of these reactions phenols may be the source of the phenoxy group, which is substituted for a hydride group that has been placed on the silicon. One, two or more step reactions may need to take place.

Precursor materials may also be obtained byway of an acetylene reaction route. In general there are several known paths for adding acetylene to Si—H. Thus, for example, tetramethylcyclotetrasiloxane can be reacted with acetylene in the presence of a catalyst to produce tetramethyltetravinylcyclotetrasiloxane. This product can then be ring opened and polymerized in order to form linear vinyl,methylsiloxanes. Alternatively, typical vinyl silanes can be produced by reacting methyl,dichlorosilane (obtained from the direct process or Rochow process) with acetylene. These monomers can then be purified (because there may be some scrambling) to form vinyl, methyl, dichlorosilane. Then the vinyl monomer can be polymerized via hydrolysis to form many cyclic, and linear siloxanes, having various chain lengths, including for example various cyclotetrasiloxanes (e.g., $D_4'$) and various cyclopentasiloxanes (e.g., $D_5$). These paths, however, are costly, and there has been a long standing and increasing need for a lower cost raw material source to produce vinyl silanes. Prior to the present inventions, it was not believed that MHF could be used in an acetylene addition process to obtain vinyl silanes. MHF is less expensive than vinyl,methyl (either linear or cyclic), and adding acetylene to MHF to make vinyl meets, among other things, the long standing need to provide a more cost effective material and at relatively inexpensive costs. In making this addition the following variables, among others, should be considered and controlled: feed ($D_4'$, linear methyl, hydrogen siloxane fluids); temperature; ratio of acetylene to Si—H; homogeneous catalysts (Karstedt's, DBT Laureate, no catalyst, Karstedt's with inhibitor); supported catalysts (Pt on carbon, Pt on alumina, Pd on alumina); flow rates (liquid feed, acetylene feed); pressure; and, catalyst concentration. Examples of embodiments of reactions providing for the addition of acetylene to MHF (cyclic and linear) are provided in Tables A and B. Table A are batch acetylene reactions. Table B are continuous acetylene reactions. It should be understood that batch, continuous, counter current flow of MHF and acetylene feeds, continuous recycle of single pass material to achieve higher conversions, and combinations and variations of these and other processes can be utilized.

TABLE A

Batch Acetylene Reactions

| Run | Si—H | Methyl Hydride (grams) | Catalyst % (rel to MeH) | Inhibitor | Solvent | Amount of Solvent (grams) | Temp (° C.) | Acetylene Flow (ccm) | Reaction Time (hrs) | Acetyl Mol % (rel to Total Hydride) |
|---|---|---|---|---|---|---|---|---|---|---|
| 1 | MHF | 400 | 0.48% | 0.00% | — | — | 80-100 | — | 0.20 | — |
| 2 | MHF | 1000 | 0.27% | 0.00% | — | — | 65-75 | 276-328 | 0.75 | 3.4% |
| 3 | MHF | 1000 | 0.00% | 0.00% | — | — | 80 100 120 | 378-729 | 6.33 | 49.4% |
| 4 | MHF | 117 | 0.20% | 0.00% | Hexane | 1000 | 60-66 | 155-242 | 4.50 | 188.0% |
| 5 | MHF | 1000 | 0.40% | 0.40% | — | — | 55-90 | 102 | 7.5 | 15.7% |
| 6 | MHF | 360 | 1.00% | 0.00% | Hexane | 392 | 65 | 102 | 6.4 | 40.3% |
| 7a | MHF | 360 | 0.40% | 0.00% | Hexane | 400 | 65 | — | 2.0 | 23.4% |
| 7b | MHF | 280 | 0.40% | 0.00% | Hexane | 454 | 68 | — | 137.0 | 23.4% |
| 8 | D4' | 1000 | 0.27% | 0.00% | — | — | 79 | 327-745 | 6.5 | 61.3% |
| 9 | MHF | 370 | 0.40% | 0.00% | Hexane | 402 | 65 | 155-412 | 8.0 | 140.3% |

TABLE B

Continuous Acetylene Reactions

| Run | Si—H | Catalyst % (rel to MeH) | Inhibitor | Silane Conc (wt %) | Solvent | Reactor Temp (° C.) | Reactor Pressure (psig) | Acetyl Mol % (rel to Total Hydride) |
|---|---|---|---|---|---|---|---|---|
| 10 | D4' | 5% Pt on Carbon | 0.00% | 100.0% | — | 60-100 | 50 | 40.0% |
| 11 | D4' | 5% Pt on Carbon | 0.00% | 100.0% | — | 50-90 | 100 | 20.0% |
| 12 | D4' | 1% Pt on Alumina | 0.00% | 100.0% | — | 40-50 | 50 | 23.8% |
| 13 | MHF | 5% Pt on Carbon | 0.00% | 100.0% | — | 55-60 | 55-60 | 13.6% |
| 14 | MHF | 0.01% Pt on Alumina | 0.00% | 20.0% | Hexane | 20-25 | 50 | 108.5% |
| 15 | MHF | 0.01% Pt on Alumina | 0.00% | 20.0% | Hexane | 60 | 50-55 | 117.1% |
| 16 | MHF | 0.01% Pt on Alumina | 0.00% | 20.0% | Hexane | 70 | 50 | 125.1% |
| 17 | MHF | 0.12% Pt on Alumina | 0.00% | 20.0% | Hexane | 60 | 50 | 133.8% |
| 18 | MHF | 0.12% Pt on Alumina | 0.00% | 4.0% | Hexane | 60 | 50 | 456.0% |

(D4' is tetramethyl tetrahydride cyclotetrasiloxane)

Continuous High Pressure Reactor ("CHPR") embodiments may be advantageous for, among other reasons: reaction conversion saving more acetylene needed in liquid phase; tube reactors providing pressures which in turn increases solubility of acetylene; reaction with hexyne saving concentration and time (e.g., 100 hours); can eliminate homogeneous catalyst and thus eliminate hydrosilylation reaction with resultant vinyls once complete; and, using a heterogeneous (Solid) catalyst to maintain product integrity, increased shelf-life, increase pot-life and combinations and variations of these.

In addressing the various conditions in the acetylene addition reactions, some factors may be: crosslinking retardation by dilution, acetylene and lower catalyst concentration; and conversion (using heterogeneous catalyst) may be lower for larger linear molecules compared to smaller molecules.

The presence and quality of vinyl and vinyl conversions can be determined by, among other things: FT-IR for presence of vinyl absorptions, decrease in SiH absorption; $^1$H NMR for presence of vinyls and decrease in SiH; $^{13}$C NMR for presence of vinyls.

As used herein, unless specified otherwise the terms %, weight % and mass % are used interchangeably and refer to the weight of a first component as a percentage of the weight of the total, e.g., formulation, mixture, material or product. As used herein, unless specified otherwise "volume %" and "% volume" and similar such terms refer to the volume of a first component as a percentage of the volume of the total, e.g., formulation, material or product.

The Mixing Type Process

Precursor materials may be methyl hydrogen, and substituted and modified methyl hydrogens, siloxane backbone additives, reactive monomers, reaction products of a siloxane backbone additive with a silane modifier or an organic modifier, and other similar types of materials, such as silane based materials, silazane based materials, carbosilane based materials, phenol/formaldehyde based materials, and combinations and variations of these. The precursors are preferably liquids at room temperature, although they may be solids that are melted, or that are soluble in one of the other precursors. (In this situation, however, it should be understood that when one precursor dissolves another, it is nevertheless not considered to be a "solvent" as that term is used with respect to the prior art processes that employ non-constituent solvents, e.g., solvents that do not form a part or component of the end product, are treated as waste products, and both.)

The precursors are mixed together in a vessel, preferably at room temperature. Preferably, little, and more preferably no solvents, e.g., water, organic solvents, polar solvents, non-polar solvents, hexane, THF, toluene, are added to this mixture of precursor materials. Preferably, each precursor material is miscible with the others, e.g., they can be mixed at any relative amounts, or in any proportions, and will not separate or precipitate. At this point the "precursor mixture" or "polysilocarb precursor formulation" is compete (noting that if only a single precursor is used the material would simply be a "polysilocarb precursor" or a "polysilocarb precursor formulation" or a "formulation"). Although complete, fillers and reinforcers may be added to the formulation. In preferred embodiments of the formulation, essentially no, and more preferably no chemical reactions, e.g., crosslinking or polymerization, takes place within the formulation, when the formulation is mixed, or when the formulation is being held in a vessel, on a prepreg, or over a time period, prior to being cured.

The precursors can be mixed under numerous types of atmospheres and conditions, e.g., air, inert, $N_2$, Argon, flowing gas, static gas, reduced pressure, elevated pressure, ambient pressure, and combinations and variations of these.

Additionally, inhibitors such as cyclohexane, 1-Ethynyl-1-cyclohexanol (which may be obtained from ALDRICH), Octamethylcyclotetrasiloxane, and tetramethyltetravinylcyclotetrasiloxane, may be added to the polysilocarb precursor formulation, e.g., an inhibited polysilocarb precursor formulation. It should be noted that tetramethyltetravinylcyclotetrasiloxane may act as both a reactant and a reaction retardant (e.g., an inhibitor), depending upon the amount present and temperature, e.g., at room temperature it is a retardant and at elevated temperatures it is a reactant. Other materials, as well, may be added to the polysilocarb precursor formulation, e.g., a filled polysilocarb precursor formulation, at this point in processing, including fillers such as SiC powder, carbon black, sand, polymer derived ceramic particles, pigments, particles, nano-tubes, whiskers, or other materials, discussed in this specification or otherwise known to the arts. Further, a formulation with both inhibitors and fillers would be considered an inhibited, filled polysilocarb precursor formulation.

Depending upon the particular precursors and their relative amounts in the polysilocarb precursor formulation, polysilocarb precursor formulations may have shelf lives at room temperature of greater than 12 hours, greater than 1 day, greater than 1 week, greater than 1 month, and for years or more. These precursor formulations may have shelf lives at high temperatures, for example, at about 90° F., of greater than 12 hours, greater than 1 day, greater than 1 week, greater than 1 month, and for years or more. The use of inhibitors may further extend the shelf life in time, for higher temperatures, and combinations and variations of these. The use of inhibitors, may also have benefits in the development of manufacturing and commercial processes, by controlling the rate of reaction, so that it takes place in the desired and intended parts of the process or manufacturing system.

As used herein the term "shelf life" should be given its broadest possible meaning, unless specified otherwise, and would include, for example, the formulation being capable of being used for its intended purpose, or performing, e.g., functioning, for its intended use, at 100% percent as well as a freshly made formulation, at least about 90% as well as a freshly made formulation, at least about 80% as well as a freshly made formulation, and at at least about 70% as well as a freshly made formulation.

Precursors and precursor formulations are preferably non-hazardous materials. They have flash points that are preferably above about 70° C., above about 80° C., above about 100° C. and above about 300° C., and above. Preferably, they may be noncorrosive. Preferably, they may have a low vapor pressure, may have low or no odor, and may be non- or mildly irritating to the skin.

A catalyst or initiator may be used, and can be added at the time of, prior to, shortly before, or at an earlier time before the precursor formulation is formed or made into a structure, prior to curing. The catalysis assists in, advances, and promotes the curing of the precursor formulation to form a preform.

The time period where the precursor formulation remains useful for curing after the catalysis is added is referred to as "pot life", e.g., how long can the catalyzed formulation remain in its holding vessel before it should be used. Depending upon the particular formulation, whether an inhibitor is being used, and if so the amount being used, storage conditions, e.g., temperature, low $O_2$ atmosphere, and potentially other factors, precursor formulations can have pot lives, for example, of from about 5 minutes to about 10 days, about 1 day to about 6 days, about 4 to 5 days, about 30 minutes, about 15 minutes, about 1 hour to about 24 hours, and about 12 hours to about 24 hours.

The catalyst can be any platinum (Pt) based catalyst, which can, for example, be diluted to a ranges of: about 0.01 parts per million (ppm) Pt to about 250 ppm Pt, about 0.03 ppm Pt, about 0.1 ppm Pt, about 0.2 ppm Pt, about 0.5 ppm Pt, about 0.02 to 0.5 ppm Pt, about 1 ppm to 200 ppm Pt and preferably, for some applications and embodiments, about 5 ppm to 50 ppm Pt. The catalyst can be a peroxide based catalyst with, for example, a 10 hour half life above 90 C at a concentration of between 0.1% to 3% peroxide, and about 0.5% and 2% peroxide. It can be an organic based peroxide. It can be any organometallic catalyst capable of reacting with Si—H bonds, Si—OH bonds, or unsaturated carbon bonds, these catalysts may include: dibutyltin dilaurate, zinc octoate, peroxides, organometallic compounds of for example titanium, zirconium, rhodium, iridium, palladium, cobalt or nickel. Catalysts may also be any other rhodium, rhenium, iridium, palladium, nickel, and ruthenium type or based catalysts. Combinations and variations of these and other catalysts may be used. Catalysts may be obtained from ARKEMA under the trade name LUPEROX, e.g., LUPEROX 231; and from Johnson Matthey under the trade names: Karstedt's catalyst, Ashby's catalyst, Speier's catalyst.

Further, custom and specific combinations of these and other catalysts may be used, such that they are matched to specific formulations, and in this way selectively and specifically catalyze the reaction of specific constituents. Moreover, the use of these types of matched catalyst-formulations systems may be used to provide predetermined product features, such as for example, pore structures, porosity, densities, density profiles, high purity, ultra high purity, and other morphologies or features of cured structures and ceramics.

In this mixing type process for making a precursor formulation, preferably chemical reactions or molecular rearrangements only take place during the making of the starting materials, the curing process, and in the pyrolizing process. Chemical reactions, e.g., polymerizations, reductions, condensations, substitutions, take place or are utilized in the making of a starting material or precursor. In making a polysilocarb precursor formulation by the mixing type process, preferably no and essentially no, chemical reactions and molecular rearrangements take place. These embodiments of the present mixing type process, which avoid the need to, and do not, utilize a polymerization or other reaction during the making of a precursor formulation, provides significant advantages over prior methods of making polymer derived ceramics. Preferably, in the embodiments of these mixing type of formulations and processes, polymerization, crosslinking or other chemical reactions take place primarily, preferably essentially, and more preferably solely during the curing process.

The precursor may be a siloxane backbone additive, such as, methyl hydrogen (MH), which formula is shown below.

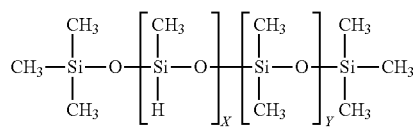

The MH may have a molecular weight ("mw" which can be measured as weight averaged molecular weight in amu or as g/mol) from about 400 mw to about 10,000 mw, from about 600 mw to about 3,000 mw, and may have a viscosity preferably from about 20 cps to about 60 cps. The percentage of methylsiloxane units "X" may be from 1% to 100%. The percentage of the dimethylsiloxane units "Y" may be from 0% to 99%. This precursor may be used to provide the backbone of the cross-linked structures, as well as, other features and characteristics to the cured preform and ceramic material. This precursor may also, among other things, be modified by reacting with unsaturated carbon compounds to produce new, or additional, precursors. Typically, methyl hydrogen fluid (MHF) has minimal amounts of "Y", and more preferably "Y" is for all practical purposes zero.

The precursor may be a siloxane backbone additive, such as vinyl substituted polydimethyl siloxane, which formula is shown below.

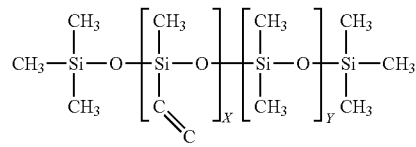

This precursor may have a molecular weight (mw) from about 400 mw to about 10,000 mw, and may have a viscosity preferably from about 50 cps to about 2,000 cps. The percentage of methylvinylsiloxane units "X" may be from 1% to 100%. The percentage of the dimethylsiloxane units "Y" may be from 0% to 99%. Preferably, X is about 100%. This precursor may be used to decrease cross-link density and improve toughness, as well as, other features and characteristics to the cured preform and ceramic material.

The precursor may be a siloxane backbone additive, such as vinyl substituted and vinyl terminated polydimethyl siloxane, which formula is shown below.

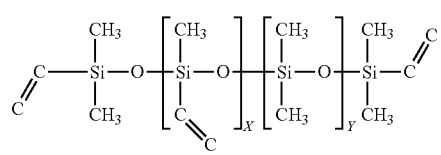

This precursor may have a molecular weight (mw) from about 500 mw to about 15,000 mw, and may preferably have a molecular weight from about 500 mw to 1,000 mw, and may have a viscosity preferably from about 10 cps to about 200 cps. The percentage of methylvinylsiloxane units "X" may be from 1% to 100%. The percentage of the dimethylsiloxane units "Y" may be from 0% to 99%. This precursor may be used to provide branching and decrease the cure temperature, as well as, other features and characteristics to the cured preform and ceramic material.

The precursor may be a siloxane backbone additive, such as vinyl substituted and hydrogen terminated polydimethyl siloxane, which formula is shown below.

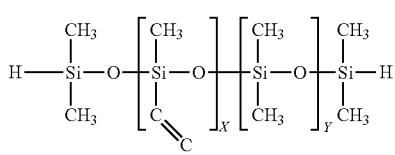

This precursor may have a molecular weight (mw) from about 300 mw to about 10,000 mw, and may preferably have a molecular weight from about 400 mw to 800 mw, and may have a viscosity preferably from about 20 cps to about 300 cps. The percentage of methylvinylsiloxane units "X" may be from 1% to 100%. The percentage of the dimethylsiloxane units "Y" may be from 0% to 99%. This precursor may be used to provide branching and decrease the cure temperature, as well as, other features and characteristics to the cured preform and ceramic material.

The precursor may be a siloxane backbone additive, such as allyl terminated polydimethyl siloxane, which formula is shown below.

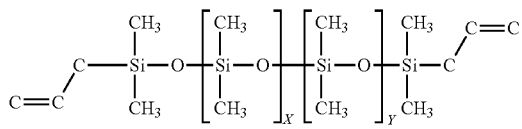

This precursor may have a molecular weight (mw) from about 400 mw to about 10,000 mw, and may have a viscosity preferably from about 40 cps to about 400 cps. The repeating units are the same. This precursor may be used to provide UV curability and to extend the polymeric chain, as well as, other features and characteristics to the cured preform and ceramic material.

The precursor may be a siloxane backbone additive, such as vinyl terminated polydimethyl siloxane, which formula is shown below.

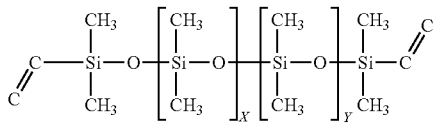

This precursor may have a molecular weight (mw) from about 200 mw to about 5,000 mw, and may preferably have a molecular weight from about 400 mw to 1,500 mw, and may have a viscosity preferably from about 10 cps to about 400 cps. The repeating units are the same. This precursor may be used to provide a polymeric chain extender, improve toughness and to lower cure temperature down to for example room temperature curing, as well as, other features and characteristics to the cured preform and ceramic material.

The precursor may be a siloxane backbone additive, such as silanol (hydroxy) terminated polydimethyl siloxane, which formula is shown below.

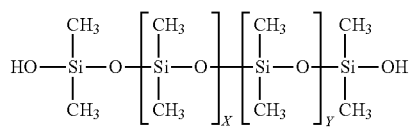

This precursor may have a molecular weight (mw) from about 400 mw to about 10,000 mw, and may preferably have a molecular weight from about 600 mw to 1,000 mw, and may have a viscosity preferably from about 30 cps to about 400 cps. The repeating units are the same. This precursor may be used to provide a polymeric chain extender, a toughening mechanism, can generate nano- and micro-scale porosity, and allows curing at room temperature, as well as other features and characteristics to the cured preform and ceramic material.

The precursor may be a siloxane backbone additive, such as silanol (hydroxy) terminated vinyl substituted dimethyl siloxane, which formula is shown below.

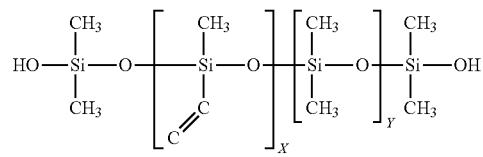

This precursor may have a molecular weight (mw) from about 400 mw to about 10,000 mw, and may preferably have a molecular weight from about 600 mw to 1,000 mw, and may have a viscosity preferably from about 30 cps to about 400 cps. The percentage of methylvinylsiloxane units "X" may be from 1% to 100%. The percentage of the dimethylsiloxane units "Y" may be from 0% to 99%. This precursor may be used, among other things, in a dual-cure system; in this manner the dual-cure can allow the use of multiple cure mechanisms in a single formulation. For example, both condensation type cure and addition type cure can be utilized. This, in turn, provides the ability to have complex cure profiles, which for example may provide for an initial cure via one type of curing and a final cure via a separate type of curing.

The precursor may be a siloxane backbone additive, such as hydrogen (hydride) terminated polydimethyl siloxane, which formula is shown below.

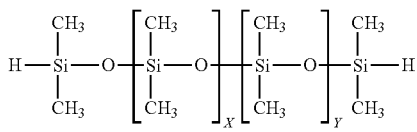

This precursor may have a molecular weight (mw) from about 200 mw to about 10,000 mw, and may preferably have a molecular weight from about 500 mw to 1,500 mw, and may have a viscosity preferably from about 20 cps to about 400 cps. The repeating units are the same. This precursor may be used to provide a polymeric chain extender, as a toughening agent, and it allows lower temperature curing, e.g., room temperature, as well as, other features and characteristics to the cured preform and ceramic material.

The precursor may be a siloxane backbone additive, such as diphenyl terminated siloxane, which formula is shown below.

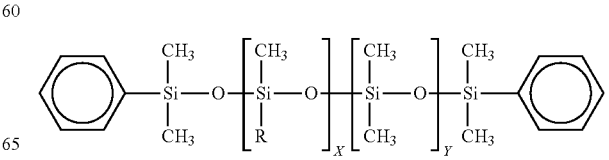

Where here R is a reactive group, such as vinyl, hydroxy, or hydride. This precursor may have a molecular weight (mw) from about 500 mw to about 2,000 mw, and may have a viscosity preferably from about 80 cps to about 300 cps. The percentage of methyl-R-siloxane units "X" may be from 1% to 100%. The percentage of the dimethylsiloxane units "Y" may be from 0% to 99%. This precursor may be used to provide a toughening agent, and to adjust the refractive index of the polymer to match the refractive index of various types of glass, to provide for example transparent fiberglass, as well as, other features and characteristics to the cured preform and ceramic material.

The precursor may be a siloxane backbone additive, such as a mono-phenyl terminated siloxane, which formulas are shown below.

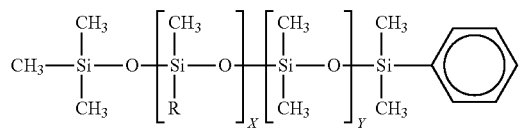

Where R is a reactive group, such as vinyl, hydroxy, or hydride. This precursor may have a molecular weight (mw) from about 500 mw to about 2,000 mw, and may have a viscosity preferably from about 80 cps to about 300 cps. The percentage of methyl-R-siloxane units "X" may be from 1% to 100%. The percentage of the dimethylsiloxane units "Y" may be from 0% to 99%. This precursor may be used to provide a toughening agent and to adjust the refractive index of the polymer to match the refractive index of various types of glass, to provide for example transparent fiberglass, as well as, other features and characteristics to the cured preform and ceramic material.

The precursor may be a siloxane backbone additive, such as diphenyl dimethyl polysiloxane, which formula is shown below.

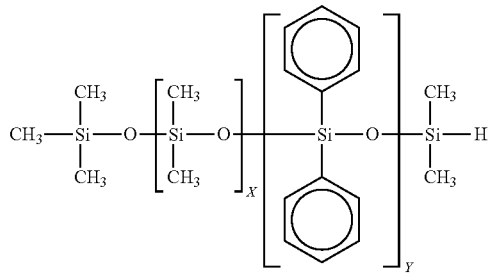

This precursor may have a molecular weight (mw) from about 500 mw to about 20,000 mw, and may have a molecular weight from about 800 to about 4,000, and may have a viscosity preferably from about 100 cps to about 800 cps. The percentage of dimethylsiloxane units "X" may be from 25% to 95%. The percentage of the diphenyl siloxane units "Y" may be from 5% to 75%. This precursor may be used to provide similar characteristics to the mono-phenyl terminated siloxane, as well as, other features and characteristics to the cured preform and ceramic material.

The precursor may be a siloxane backbone additive, such as vinyl terminated diphenyl dimethyl polysiloxane, which formula is shown below.

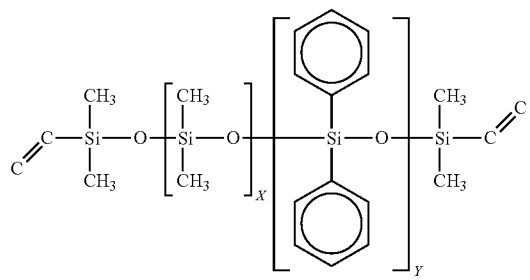

This precursor may have a molecular weight (mw) from about 400 mw to about 20,000 mw, and may have a molecular weight from about 800 to about 2,000, and may have a viscosity preferably from about 80 cps to about 600 cps. The percentage of dimethylsiloxane units "X" may be from 25% to 95%. The percentage of the diphenyl siloxane units "Y" may be from 5% to 75%. This precursor may be used to provide chain extension, toughening agent, changed or altered refractive index, and improvements to high temperature thermal stability of the cured material, as well as, other features and characteristics to the cured preform and ceramic material.

The precursor may be a siloxane backbone additive, such as hydroxy terminated diphenyl dimethyl polysiloxane, which formula is shown below.

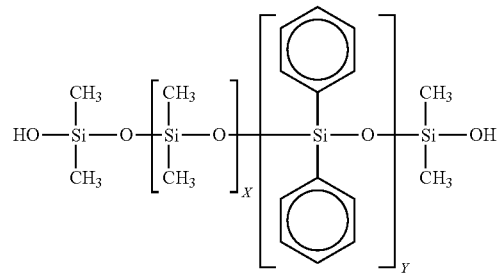

This precursor may have a molecular weight (mw) from about 400 mw to about 20,000 mw, and may have a molecular weight from about 800 to about 2,000, and may have a viscosity preferably from about 80 cps to about 400 cps. The percentage of dimethylsiloxane units "X" may be from 25% to 95%. The percentage of the diphenyl siloxane units "Y" may be from 5% to 75%. This precursor may be used to provide chain extension, toughening agent, changed or altered refractive index, and improvements to high temperature thermal stability of the cured material, can generate nano- and micro-scale porosity, as well as other features and characteristics to the cured preform and ceramic material.

A variety of cyclosiloxanes can be used as reactive molecules in the formulation. They can be described by the following nomenclature system or formula: $D_xD^*_y$, where "D" represents a dimethyl siloxy unit and "D*" represents a substituted methyl siloxy unit, where the "*" group could be vinyl, allyl, hydride, hydroxy, phenyl, styryl, alkyl, cyclopentadienyl, or other organic group, x is from 0-8, y is $>=1$, and x+y is from 3-8.

The precursor batch may also contain non-silicon based cross-linking agents, be the reaction product of a non-silicon based cross linking agent and a siloxane backbone additive, and combinations and variation of these. The non-silicon based cross-linking agents are intended to, and provide, the capability to cross-link during curing. For example, non-silicon based cross-linking agents that can be used include: cyclopentadiene (CP), methylcyclopentadiene (MeCP), dicyclopentadiene ("DCPD"), methyldicyclopentadiene (MeDCPD), tricyclopentadiene (TCPD), piperylene, divnyl-benzene, isoprene, norbornadiene, vinylnorbornene, propenylnorbornene, isopropenylnorbornene, methylvinylnorbornene, bicyclononadiene, methylbicyclononadiene, propadiene, 4-vinylcyclohexene, 1,3-heptadiene, cycloheptadiene, 1,3-butadiene, cyclooctadiene and isomers thereof. Generally, any hydrocarbon that contains two (or more) unsaturated, C=C, bonds that can react with a Si—H, Si—OH, or other Si bond in a precursor, can be used as a cross-linking agent. Some organic materials containing oxygen, nitrogen, and sulphur may also function as cross-linking moieties.

The precursor may be a reactive monomer. These would include molecules, such as tetramethyltetravinylcyclotetrasiloxane ("TV"), which formula is shown below.

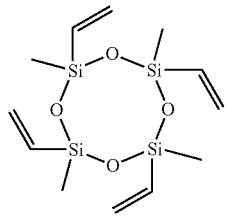 [SMILES: C=C[Si]1(C)O[Si](C)(C=C)O[Si](C)(C=C)O[Si](C)(C=C)O1]

This precursor may be used to provide a branching agent, a three-dimensional cross-linking agent, as well as, other features and characteristics to the cured preform and ceramic material. (It is also noted that in certain formulations, e.g., above 2%, and certain temperatures, e.g., about from about room temperature to about 60° C., this precursor may act as an inhibitor to cross-linking, e.g., in may inhibit the cross-linking of hydride and vinyl groups.)

The precursor may be a reactive monomer, for example, such as trivinyl cyclotetrasiloxane,

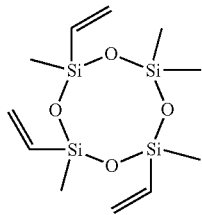 [SMILES: C=C[Si]1(C)O[Si](C)(C)O[Si](C)(C=C)O[Si](C)(C=C)O1]

divinyl cyclotetrasiloxane,

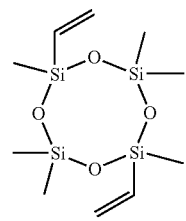

trivinyl monohydride cyclotetrasiloxane,

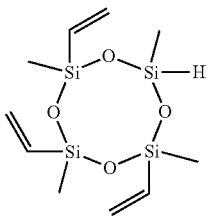 [SMILES: C=C[Si]1(C)O[SiH](C)O[Si](C)(C=C)O[Si](C)(C=C)O1]

divinyl dihydride cyclotetrasiloxane,

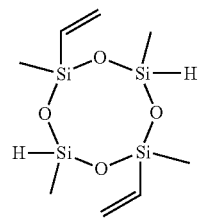 [SMILES: C=C[Si]1(C)O[SiH](C)O[Si](C)(C=C)O[SiH](C)O1]

and a hexamethyl cyclotetrasiloxane, such as,

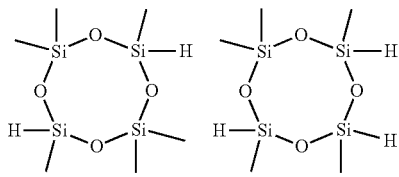

The precursor may be a silane modifier, such as vinyl phenyl methyl silane, diphenyl silane, diphenyl methyl silane, and phenyl methyl silane (some of which may be used as an end capper or end termination group). These silane modifiers can provide chain extenders and branching agents. They also improve toughness, alter refractive index, and improve high temperature cure stability of the cured material, as well as improving the strength of the cured material, among other things. A precursor, such as diphenyl methyl silane, may function as an end capping agent, that may also improve toughness, alter refractive index, and improve high temperature cure stability of the cured material, as well as, improving the strength of the cured material, among other things.

The precursor may be a reaction product of a silane modifier with a vinyl terminated siloxane backbone additive. The precursor may be a reaction product of a silane modifier with a hydroxy terminated siloxane backbone additive. The precursor may be a reaction product of a silane modifier with a hydride terminated siloxane backbone additive. The precursor may be a reaction product of a silane modifier with TV. The precursor may be a reaction product of a silane. The precursor may be a reaction product of a silane modifier with a cyclosiloxane, taking into consideration steric hindrances.

The precursor may be a partially hydrolyzed tetraethyl orthosilicate, such as TES 40 or Silbond 40. The precursor may also be a methylsesquisiloxane such as SR-350 available from General Electric Company, Wilton, Conn. The precursor may also be a phenyl methyl siloxane such as 604 from Wacker Chemie AG. The precursor may also be a methylphenylvinylsiloxane, such as H62 C from Wacker Chemie AG.

The precursors may also be selected from the following: SiSiB® HF2020, TRIMETHYLSILYL TERMINATED METHYL HYDROGEN SILICONE FLUID 63148-57-2; SiSiB® HF2050 TRIMETHYLSILYL TERMINATED METHYLHYDROSILOXANE DIMETHYLSILOXANE COPOLYMER 68037-59-2; SiSiB® HF2060 HYDRIDE TERMINATED METHYLHYDROSILOXANE DIMETHYLSILOXANE COPOLYMER 69013-23-6; SiSiB® HF2038 HYDROGEN TERMINATED POLYDIPHENYL SILOXANE; SiSiB® HF2068 HYDRIDE TERMINATED METHYLHYDROSILOXANE DIMETHYLSILOXANE COPOLYMER 115487-49-5; SiSiB® HF2078 HYDRIDE TERMINATED POLY(PHENYLDIMETHYLSILOXY) SILOXANE PHENYL SILSESQUIOXANE, HYDROGEN-TERMINATED 68952-30-7; SiSiB® VF6060 VINYLDIMETHYL TERMINATED VINYLMETHYL DIMETHYL POLYSILOXANE COPOLYMERS 68083-18-1; SiSiB® VF6862 VINYLDIMETHYL TERMINATED DIMETHYL DIPHENYL POLYSILOXANE COPOLYMER 68951-96-2; SiSiB® VF6872 VINYLDIMETHYL TERMINATED DIMETHYL-METHYLVINYL-DIPHENYL POLYSILOXANE COPOLYMER; SiSiB® PC9401 1,1,3,3-TETRAMETHYL-1,3-DIVINYLDISILOXANE 2627-95-4; SiSiB® PF1070 SILANOL TERMINATED POLYDIMETHYLSILOXANE (OF1070) 70131-67-8; SiSiB® OF1070 SILANOL TERMINATED POLYDIMETHYSILOXANE 70131-67-8; OH-ENDCAPPED POLYDIMETHYLSILOXANE HYDROXY TERMINATED OLYDIMETHYLSILOXANE 73138-87-1; SiSiB® VF6030 VINYL TERMINATED POLYDIMETHYL SILOXANE 68083-19-2; and, SiSiB® HF2030 HYDROGEN TERMINATED POLYDIMETHYLSILOXANE FLUID 70900-21-9.

Thus, in additional to the forgoing type of precursors, it is contemplated that a precursor may be a compound of the following general formula.

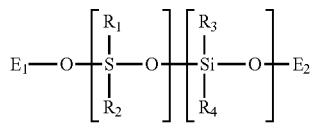

Wherein end cappers $E_1$ and $E_2$ are chosen from groups such as trimethyl silicon (—Si(CH$_3$)$_3$), dimethyl silicon hydroxy (—Si(CH$_3$)$_2$OH), dimethyl silicon hydride (—Si(CH$_3$)$_2$H), dimethyl vinyl silicon (—Si(CH$_3$)$_2$(CH=CH$_2$)), (—Si(CH$_3$)$_2$(C$_6$H$_5$)) and di ethyl alkoxy silicon (—Si(CH$_3$)$_2$(OR). The R groups $R_1$, $R_2$, $R_3$, and $R_4$ may all be different, or one or more may be the same. Thus, for example, $R_2$ is the same as $R_3$, $R_3$ is the same as $R_4$, $R_1$ and $R_2$ are different with $R_3$ and $R_4$ being the same, etc. The R groups are chosen from groups such as hydride (—H), methyl (Me)(—C), ethyl (—C—C), vinyl (—C=C), alkyl (—R)(C$_n$H$_{2n+1}$), allyl (—C—C=C), aryl ('R), phenyl (Ph) (—C$_6$H$_5$), methoxy (—O—C), ethoxy (—O—C—C), siloxy (—O—Si—R$_3$), alkoxy (—O—R), hydroxy (—O—H), phenylethyl (—C—C—C$_6$H$_5$) and methyl,phenyl-ethyl (—C—C(—C)(—C$_6$H$_5$)).

In general, embodiments of formulations for polysilocarb formulations may for example have from about 0% to 50% MH, about 20% to about 99% MH, about 0% to about 30% siloxane backbone additives, about 1% to about 60% reactive monomers, about 30% to about 100% TV, and, about 0% to about 90% reaction products of a siloxane backbone additives with a silane modifier or an organic modifier reaction products.

In mixing the formulations sufficient time should be used to permit the precursors to become effectively mixed and dispersed. Generally, mixing of about 15 minutes to an hour is sufficient. Typically, the precursor formulations are relatively, and essentially, shear insensitive, and thus the type of pumps or mixing are not critical. It is further noted that in higher viscosity formulations additional mixing time may be required. The temperature of the formulations, during mixing should preferably be kept below about 45° C., and preferably about 10° C. (It is noted that these mixing conditions are for the pre-catalyzed formulations.)

The Reaction Type Process

In the reaction type process, in general, a chemical reaction is used to combine one, two or more precursors, typically in the presence of a solvent, to form a precursor formulation that is essentially made up of a single polymer that can then be, catalyzed, cured and pyrolized. This process provides the ability to build custom precursor formulations that when cured can provide plastics having unique and desirable features such as high temperature, flame resistance and retardation, strength and other features. The cured materials can also be pyrolized to form ceramics having unique features. The reaction type process allows for the predetermined balancing of different types of functionality in the end product by selecting functional groups for incorporation into the polymer that makes up the precursor formulation, e.g., phenyls which typically are not used for ceramics but have benefits for providing high temperature capabilities for plastics, and styrene which typically does not provide high temperature features for plastics but provides benefits for ceramics.

In general a custom polymer for use as a precursor formulation is made by reacting precursors in a condensation reaction to form the polymer precursor formulation. This precursor formulation is then cured into a preform through a hydrolysis reaction. The condensation reaction forms a polymer of the type shown below.

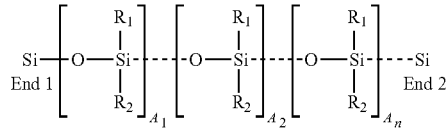

Where $R_1$ and $R_2$ in the polymeric units can be a hydride (—H), a methyl (Me)(—C), an ethyl (—C—C), a vinyl (—C=C), an alkyl (—R)(C$_n$H$_{2n+1}$), an unsaturated alkyl (—C$_n$H$_{2n-1}$), a cyclic alkyl (—C$_n$H$_{2n-1}$), an allyl (—C—C=C), a butenyl (—C$_4$H$_7$), a pentenyl (—C$_5$H$_9$), a cyclopentenyl (—C$_5$H$_7$), a methyl cyclopentenyl (—C$_5$H$_6$(CH$_3$)), a norbornenyl (—C$_X$H$_Y$, where X=7-15 and Y=9-18), an aryl ('R), a phenyl (Ph)(—C$_6$H$_5$), a cycloheptenyl (—C$_7$H$_{11}$), a cyclooctenyl (—C$_8$H$_{13}$), an ethoxy (—O—C—C), a siloxy (—O—Si—R$_3$), a methoxy (—O—C), an alkoxy, (—O—R), a hydroxy, (—O—H), a phenylethyl (—C—C—C$_6$H$_5$) a methyl,phenyl-ethyl (—C—C(—C)(—C$_6$H$_5$)) and a vinylphenyl-ethyl (—C—C(C$_6$H$_4$(—C=C))). $R_1$ and $R_2$ may be the same or different. The custom precursor polymers can have several different polymeric units, e.g., $A_1$, $A_2$, $A_n$, and may include as many as 10, 20 or more units, or it may contain only a single unit, for example, MHF made by the reaction process may have only a single unit.

Embodiments may include precursors, which include among others, a triethoxy methyl silane, a diethoxy methyl phenyl silane, a diethoxy methyl hydride silane, a diethoxy methyl vinyl silane, a dimethyl ethoxy vinyl silane, a diethoxy dimethyl silane. an ethoxy dimethyl phenyl silane, a diethoxy dihydride silane, a triethoxy phenyl silane, a diethoxy hydride trimethyl siloxane, a diethoxy methyl trimethyl siloxane, a trimethyl ethoxy silane, a diphenyl diethoxy silane, a dimethyl ethoxy hydride siloxane, and combinations and variations of these and other precursors, including other precursors set forth in this specification.

The end units, Si End 1 and Si End 2, can come from the precursors of dimethyl ethoxy vinyl silane, ethoxy dimethyl phenyl silane, and trimethyl ethoxy silane. Additionally, if the polymerization process is properly controlled a hydroxy end cap can be obtained from the precursors used to provide the repeating units of the polymer.

In general, the precursors are added to a vessel with ethanol (or other material to absorb heat, e.g., to provide thermal mass), an excess of water, and hydrochloric acid (or other proton source). This mixture is heated until it reaches its activation energy, after which the reaction typically is exothermic. Generally, in this reaction the water reacts with an ethoxy group of the silicon of the precursor monomer, forming a hydroxy (with ethanol as the byproduct). Once formed this hydroxy becomes subject to reaction with an ethoxy group on the silicon of another precursor monomer, resulting in a polymerization reaction. This polymerization reaction is continued until the desired chain length(s) is built.

Control factors for determining chain length, among others, are: the monomers chosen (generally, the smaller the monomers the more that can be added before they begin to coil around and bond to themselves); the amount and point in the reaction where end cappers are introduced; and the amount of water and the rate of addition, among others. Thus, the chain lengths can be from about 180 mw (viscosity about 5 cps) to about 65,000 mw (viscosity of about 10,000 cps), greater than about 1000 mw, greater than about 10,000 mw, greater than about 50,000 mw and greater. Further, the polymerized precursor formulation may, and typically does, have polymers of different molecular weights, which can be predetermined to provide formulation, cured, and ceramic product performance features.

Upon completion of the polymerization reaction the material is transferred into a separation apparatus, e.g., a separation funnel, which has an amount of deionized water that, for example, is from about 1.2× to about 1.5× the mass of the material. This mixture is vigorously stirred for about less than 1 minute and preferably from about 5 to 30 seconds. Once stirred the material is allowed to settle and separate, which may take from about 1 to 2 hours. The polymer is the higher density material and is removed from the vessel. This removed polymer is then dried by either warming in a shallow tray at 90° C. for about two hours; or, preferably, is passed through a wiped film distillation apparatus, to remove any residual water and ethanol. Alternatively, sodium bicarbonate sufficient to buffer the aqueous layer to a pH of about 4 to about 7 is added. It is further understood that other, and commercial, manners of mixing, reacting and separating the polymer from the material may be employed.

Preferably a catalyst is used in the curing process of the polymer precursor formulations from the reaction type process. The same polymers, as used for curing the precursor formulations from the mixing type process can be used. It is noted that, generally unlike the mixing type formulations, a catalyst is not necessarily required to cure a reaction type polymer. Inhibitors may also be used. However, if a catalyst is not used, reaction time and rates will be slower. The curing and the pyrolysis of the cured material from the reaction process is essentially the same as the curing and pyrolysis of the cured material from the mixing process and the reaction blending process.

The reaction type process can be conducted under numerous types of atmospheres and conditions, e.g., air, inert, $N_2$, Argon, flowing gas, static gas, reduced pressure, ambient pressure, elevated pressure, and combinations and variations of these.

The Reaction Blending Type Process

In the reaction blending type process precursor are reacted to from a precursor formulation, in the absence of a solvent. For example, an embodiment of a reaction blending type process has a precursor formulation that is prepared from MHF and Dicyclopentadiene ("DCPD"). Using the reactive blending process a MHF/DCPD polymer is created and this polymer is used as a precursor formulation. (It can be used alone to form a cured or pyrolized product, or as a precursor in the mixing or reaction processes.) MHF of known molecular weight and hydride equivalent mass; "P01" (P01 is a 2% Pt(0) tetravinylcyclotetrasiloxane complex (e.g., tetramethyltetravinylcyclotetrasiloxane) in tetravinylcyclotetrasiloxane, diluted 20× with tetravinylcyclotetrasiloxane to 0.1% of Pt(0) complex. In this manner 10 ppm Pt is provided for every 1% loading of bulk cat.) catalyst 0.20 wt % of MHF starting material (with known active equivalent weight), from 40 to 90%; and Dicyclopentadiene with ≥83% purity, from 10 to 60% are utilized. In an embodiment of the process, a sealable reaction vessel, with a mixer, can be used for the reaction. The reaction is conducted in the sealed vessel, in air; although other types of atmosphere can be utilized. Preferably, the reaction is conducted at atmospheric pressure, but higher and lower pressures can be utilized. Additionally, the reaction blending type process can be conducted under numerous types of atmospheres and conditions, e.g., air, inert, $N_2$, Argon, flowing gas, static gas, reduced pressure, ambient pressure, elevated pressure, and combinations and variations of these.

In an embodiment, 850 grams of MHF (85% of total polymer mixture) is added to reaction vessel and heated to about 50° C. Once this temperature is reached the heater is turned off, and 0.20% by weight P01 Platinum catalyst is added to the MHF in the reaction vessel. Typically, upon addition of the catalyst bubbles will form and temp will initially rise approximately 2-20° C.

When the temperature begins to fall, about 150 g of DCPD (15 wt % of total polymer mixture) is added to the reaction vessel. The temperature may drop an additional amount, e.g., around 5-7° C.

At this point in the reaction process the temperature of the reaction vessel is controlled to, maintain a predetermined temperature profile over time, and to manage the temperature increase that may be accompanied by an exotherm. Preferably, the temperature of the reaction vessel is regulated, monitored and controlled throughout the process.

In an embodiment of the MHF/DCPD embodiment of the reaction process, the temperature profile can be as follows: let temperature reach about 80° C. (may take ~15-40 min, depending upon the amount of materials present); temperature will then increase and peak at ~104° C., as soon as temperature begins to drop, the heater set temperature is increased to 100° C. and the temperature of the reaction mixture is monitored to ensure the polymer temp stays above 80° C. for a minimum total of about 2 hours and a maximum total of about 4 hours. After 2-4 hours above 80°

C., the heater is turned off, and the polymer is cooled to ambient. It being understood that in larger and smaller batches, continuous, semi-continuous, and other type processes the temperature and time profile may be different.

In larger scale, and commercial operations, batch, continuous, and combinations of these, may be used. Industrial factory automation and control systems can be utilized to control the reaction, temperature profiles and other processes during the reaction.

Table C sets forth various embodiments of reaction blending processes.

In making the precursor formulation into a structure, or preform, the precursor formulation, e.g., polysilocarb formulation, can be, for example, formed using the following techniques: spraying, spray drying, atomization, nebulization, phase change separation, flowing, thermal spraying, drawing, dripping, forming droplets in liquid and liquid-surfactant systems, painting, molding, forming, extruding, spinning, ultrasound, vibrating, solution polymerization, emulsion polymerization, micro-emulsion polymerization, injecting, injection molding, or otherwise manipulated into essentially any volumetric shape. These volumetric shapes

TABLE C

| Material Name | degree of polymerization | Equivalents Si/mole | Equivalents O/mole | Equivalents H/mol | Equivalents Vi/mol | Equivalents methyl/mole | Equivalents C/mole | MW | grams/mole of vinyl |
|---|---|---|---|---|---|---|---|---|---|
| tetramethylcyclo-tetrasiloxane ($D_4$) | 4 | 4 | 4 | 4 | 0 | 4 | 4 | 240.51 | |
| MHF | 33 | 35 | 34 | 33 | 0 | 39 | 39 | 2145.345 | |
| VMF | 5 | 7 | 6 | 0 | 5 | 11 | 21 | 592.959 | 118.59 |
| TV | 4 | 4 | 4 | 0 | 4 | 4 | 12 | 344.52 | 86.13 |
| VT 0200 | 125 | 127 | 126 | 0 | 2 | 254 | 258 | 9451.206 | 4725.60 |
| VT 0020 | 24 | 26 | 25 | 0 | 2 | 52 | 56 | 1965.187 | 982.59 |
| VT 0080 | 79 | 81 | 80 | 0 | 2 | 162 | 166 | 6041.732 | 3020.87 |
| Styrene | | | | | 2 | | | 104.15 | 52.08 |
| Dicyclopentadiene | | | | | 2 | | | 132.2 | 66.10 |
| 1,4-divinylbenzene | | | | | 2 | | | 130.19 | 65.10 |
| isoprene | | | | | 2 | | | 62.12 | 31.06 |
| 1,3 Butadiene | | | | | 2 | | | 54.09 | 27.05 |
| Catalyst 10 ppm Pt | | | | | | | | | |
| Catalyst LP 231 | | | | | | | | | |

In the above table, the "degree of polymerization" is the number of monomer units, or repeat units, that are attached together to form the polymer. "Equivalents_/mol" refers to the molar equivalents. "Grams/mole of vinyl" refers to the amount of a given polymer needed to provide 1 molar equivalent of vinyl functionality. "VMH" refers to methyl vinyl fluid, a linear vinyl material from the ethoxy process, which can be a substitute for TV. The numbers "0200" etc. for VT are the viscosity in centipoise for that particular VT.

Curing and Pyrolysis

Precursor formulations, including the polysilocarb precursor formulations from the above types of processes, as well as others, can be cured to form a solid, semi-sold, or plastic like material. Typically, the precursor formulations are spread, shaped, or otherwise formed into a preform, which would include any volumetric structure, or shape, including thin and thick films. In curing, the polysilocarb precursor formulation may be processed through an initial cure, to provide a partially cured material, which may also be referred to, for example, as a preform, green material, or green cure (not implying anything about the material's color). The green material may then be further cured. Thus, one or more curing steps may be used. The material may be "end cured," i.e., being cured to that point at which the material has the necessary physical strength and other properties for its intended purpose. The amount of curing may be to a final cure (or "hard cure"), i.e., that point at which all, or essentially all, of the chemical reaction has stopped (as measured, for example, by the absence of reactive groups in the material, or the leveling off of the decrease in reactive groups over time). Thus, the material may be cured to varying degrees, depending upon its intended use and purpose. For example, in some situations the end cure and the hard cure may be the same. Curing conditions such as atmosphere and temperature may affect the composition of the cured material.

may include for example, the following: spheres, pellets, rings, lenses, disks, panels, cones, frustoconical shapes, squares, rectangles, trusses, angles, channels, hollow sealed chambers, hollow spheres, blocks, sheets, coatings, films, skins, particulates, beams, rods, angles, slabs, columns, fibers, staple fibers, tubes, cups, pipes, and combinations and various of these and other more complex shapes, both engineering and architectural.

The forming step, the curing steps, and the pyrolysis steps may be conducted in batch processes, serially, continuously, with time delays (e.g., material is stored or held between steps), and combinations and variations of these and other types of processing sequences. Further, the precursors can be partially cured, or the cure process can be initiated and on going, prior to the precursor being formed into a volumetric shape. These steps, and their various combinations may be, and in some embodiments preferably are, conducted under controlled and predetermined conditions (e.g., the material is exposed to a predetermined atmosphere, and temperature profile during the entirely of its processing, e.g., reduced oxygen, temperature of cured preform held at about 140° C. prior to pyrolysis). It should be further understood that the system, equipment, or processing steps, for forming, curing and pyrolyzing may be the same equipment, continuous equipment, batch and linked equipment, and combinations and variations of these and other types of industrial processes. Thus, for example, a spray drying technique could form cured particles that are feed directly into a fluidized bed reactor for pyrolysis.

The polysilocarb precursor formulations can be made into neat, non-reinforced, non-filled, composite, reinforced, and filled structures, intermediates, end products, and combinations and variations of these and other compositional types of materials. Further, these structures, intermediates and end products can be cured (e.g., green cured, end cured, or hard cured), uncured, pyrolyzed to a ceramic, and combinations and variations of these (e.g., a cured material may be filled with pyrolized material derived from the same polysilocarb as the cured material).

The precursor formulations may be used to form a "neat" material, (by "neat" material it is meant that all, and essentially all of the structure is made from the precursor material or unfilled formulation; and thus, there are no fillers or reinforcements).

The polysilocarb precursor formulations may be used to coat or impregnate a woven or non-woven fabric, made from for example carbon fiber, glass fibers or fibers made from a polysilocarb precursor formulation (the same or different formulation), to from a prepreg material. Thus, the polysilocarb precursor formulations may be used to form composite materials, e.g., reinforced products. For example, the formulation may be flowed into, impregnated into, absorbed by or otherwise combined with a reinforcing material, such as carbon fibers, glass fiber, woven fabric, grapheme, carbon nanotubes, thin films, precipitates, sand, non-woven fabric, copped fibers, fibers, rope, braided structures, ceramic powders, glass powders, carbon powders, graphite powders, ceramic fibers, metal powders, carbide pellets or components, staple fibers, tow, nanostructures of the above, polymer derived ceramics, any other material that meets the temperature requirements of the process and end product, and combinations and variations of these. The reinforcing material may also be made from, or derived from the same material as the formulation that has been formed into a fiber and pyrolized into a ceramic, or it may be made from a different precursor formulation material, which has been formed into a fiber and pyrolized into a ceramic.

The polysilocarb precursor formulation may be used to form a filled material. A filled material would be any material having other solid, or semi-solid, materials added to the polysilocarb precursor formulation. The filler material may be selected to provide certain features to the cured product, the ceramic product and both. These features may relate to, or be, for example, aesthetic, tactile, thermal, density, radiation, chemical, cost, magnetic, electric, and combinations and variations of these and other features. These features may be in addition to strength. Thus, the filler material may not affect the strength of the cured or ceramic material, it may add strength, or could even reduce strength in some situations. The filler material could impart color, magnetic capabilities, fire resistances, flame retardance, heat resistance, electrical conductivity, anti-static, optical properties (e.g., reflectivity, refractivity and iridescence), aesthetic properties (such as stone like appearance in building products), chemical resistivity, corrosion resistance, wear resistance, reduced cost, abrasions resistance, thermal insulation, UV stability, UV protective, and other features that may be desirable, necessary, and both, in the end product or material. Thus, filler materials could include carbon black, copper lead wires, thermal conductive fillers, electrically conductive fillers, lead, optical fibers, ceramic colorants, pigments, oxides, sand, dyes, powders, ceramic fines, polymer derived ceramic particles, pore-formers, carbosilanes, silanes, silazanes, silicon carbide, carbosilazanes, siloxane, powders, ceramic powders, metals, metal complexes, carbon, tow, fibers, staple fibers, boron containing materials, milled fibers, glass, glass fiber, fiber glass, and nanostructures (including nanostructures of the forgoing) to name a few.

The polysilocarb formulation and products derived or made from that formulation may have metals and metal complexes. Filled materials would include reinforced materials. In many cases, cured, as well as pyrolized polysilocarb filled materials can be viewed as composite materials. Generally, under this view, the polysilocarb would constitute the bulk or matrix phase, (e.g., a continuous, or substantially continuous phase), and the filler would constitute the dispersed (e.g., non-continuous), phase. Depending upon the particular application, product or end use, the filler can be evenly distributed in the precursor formulation, unevenly distributed, distributed over a predetermined and controlled distribution gradient (such as from a predetermined rate of settling), and can have different amounts in different formulations, which can then be formed into a product having a predetermined amounts of filler in predetermined areas (e.g., striated layers having different filler concentration). It should be noted, however, that by referring to a material as "filled" or "reinforced" it does not imply that the majority (either by weight, volume, or both) of that material is the polysilocarb. Thus, generally, the ratio (either weight or volume) of polysilocarb to filler material could be from about 0.1:99.9 to 99.9:0.1.

The polysilocarb precursor formulations may be used to form non-reinforced materials, which are materials that are made of primarily, essentially, and preferably only from the precursor materials; but may also include formulations having fillers or additives that do not impart strength.

The curing may be done at standard ambient temperature and pressure ("SATP", 1 atmosphere, 25° C.), at temperatures above or below that temperature, at pressures above or below that pressure, and over varying time periods. The curing can be conducted over various heatings, rate of heating, and temperature profiles (e.g., hold times and temperatures, continuous temperature change, cycled temperature change, e.g., heating followed by maintaining, cooling, reheating, etc.). The time for the curing can be from a few seconds (e.g., less than about 1 second, less than 5 seconds), to less than a minute, to minutes, to hours, to days (or potentially longer). The curing may also be conducted in any type of surrounding environment, including for example, gas, liquid, air, water, surfactant containing liquid, inert atmospheres, $N_2$, Argon, flowing gas (e.g., sweep gas), static gas, reduced $O_2$, reduced pressure, elevated pressure, ambient pressure, controlled partial pressure and combinations and variations of these and other processing conditions. For high purity materials, the furnace, containers, handling equipment, atmosphere, and other components of the curing apparatus and process are clean, essentially free from, and do not contribute any elements or materials, that would be considered impurities or contaminants, to the cured material. In an embodiment, the curing environment, e.g., the furnace, the atmosphere, the container and combinations and variations of these can have materials that contribute to or effect, for example, the composition, catalysis, stoichiometry, features, performance and combinations and variations of these in the preform, the ceramic and the final applications or products.

Preferably, in embodiments of the curing process, the curing takes place at temperatures in the range of from about 5° C. or more, from about 20° C. to about 250° C., from about 20° C. to about 150° C., from about 75° C. to about 125° C., and from about 80° C. to 90° C. Although higher and lower temperatures and various heating profiles, (e.g., rate of temperature change over time ("ramp rate", e.g., Δ degrees/time), hold times, and temperatures) can be utilized.

The cure conditions, e.g., temperature, time, ramp rate, may be dependent upon, and in some embodiments can be predetermined, in whole or in part, by the formulation to match, for example the size of the preform, the shape of the preform, or the mold holding the preform to prevent stress cracking, off gassing, or other phenomena associated with the curing process. Further, the curing conditions may be such as to take advantage of, preferably in a controlled manner, what may have previously been perceived as problems associated with the curing process. Thus, for example, off gassing may be used to create a foam material having either open or closed structure. Similarly, curing conditions can be used to create or control the microstructure and the nanostructure of the material. In general, the curing conditions can be used to affect, control or modify the kinetics and thermodynamics of the process, which can affect morphology, performance, features and functions, among other things.

Upon curing the polysilocarb precursor formulation a cross linking reaction takes place that provides in some embodiments a cross-linked structure having, among other things, an —$R_1$—Si—C—C—Si—O—Si—C—C—Si—$R_2$— where $R_1$ and $R_2$ vary depending upon, and are based upon, the precursors used in the formulation. In an embodiment of the cured materials they may have a cross-linked structure having 3-coordinated silicon centers to another silicon atom, being separated by fewer than 5 atoms between silicons.

During the curing process some formulations may exhibit an exotherm, i.e., a self heating reaction, that can produce a small amount of heat to assist or drive the curing reaction, or that may produce a large amount of heat that may need to be managed and removed in order to avoid problems, such as stress fractures. During the cure off gassing typically occurs and results in a loss of material, which loss is defined generally by the amount of material remaining, e.g., cure yield. Embodiments of the formulations, cure conditions, and polysilocarb precursor formulations of embodiments of the present inventions can have cure yields of at least about 90%, about 92%, about 100%. In fact, with air cures the materials may have cure yields above 100%, e.g., about 101-105%, as a result of oxygen being absorbed from the air. Additionally, during curing the material typically shrinks, this shrinkage may be, depending upon the formulation, cure conditions, and the nature of the preform shape, and whether the preform is reinforced, filled, neat or unreinforced, from about 20%, less than 20%, less than about 15%, less than about 5%, less than about 1%, less than about 0.5%, less than about 0.25% and smaller.

Curing of the preform may be accomplished by any type of heating apparatus, or mechanisms, techniques, or morphologies that has the requisite level of temperature and environmental control, for example, heated water baths, electric furnaces, microwaves, gas furnaces, furnaces, forced heated air, towers, spray drying, falling film reactors, fluidized bed reactors, lasers, indirect heating elements, direct heating, infrared heating, UV irradiation, RF furnace, in-situ during emulsification via high shear mixing, in-situ during emulsification via ultrasonication.

The cured preforms, either unreinforced, neat, filled or reinforced, may be used as a stand alone product, an end product, a final product, or a preliminary product for which later machining or processing may be performed on. The preforms may also be subject to pyrolysis, which converts the preform material into a ceramic.

In pyrolizing the preform, or cured structure, or cured material, it is heated to about 600° C. to about 2,300° C.; from about 650° C. to about 1,200° C., from about 800° C. to about 1300° C., from about 900° C. to about 1200° C. and from about 950° C. to 1150° C. At these temperatures typically all organic structures are either removed or combined with the inorganic constituents to form a ceramic. Typically at temperatures in the about 650° C. to 1,200° C. range the resulting material is an amorphous glassy ceramic. When heated above about 1,200° C. the material typically may from nano crystalline structures, or micro crystalline structures, such as SiC, $Si_3N_4$, SiCN, β SiC, and above 1,900° C. an α SiC structure may form, and at and above 2,200° C. α SiC is typically formed. The pyrolized, e.g., ceramic materials can be single crystal, polycrystalline, amorphous, and combinations, variations and subgroups of these and other types of morphologies.

The pyrolysis may be conducted under many different heating and environmental conditions, which preferably include thermo control, kinetic control and combinations and variations of these, among other things. For example, the pyrolysis may have various heating ramp rates, heating cycles and environmental conditions. In some embodiments, the temperature may be raised, and held a predetermined temperature, to assist with known transitions (e.g., gassing, volatilization, molecular rearrangements, etc.) and then elevated to the next hold temperature corresponding to the next known transition. The pyrolysis may take place in reducing atmospheres, oxidative atmospheres, low $O_2$, gas rich (e.g., within or directly adjacent to a flame), inert, $N_2$, Argon, air, reduced pressure, ambient pressure, elevated pressure, flowing gas (e.g., sweep gas, having a flow rate for example of from about from about 15.0 GHSV to about 0.1 GHSV, from about 6.3 GHSV to about 3.1 GHSV, and at about 3.9 GHSV), static gas, and combinations and variations of these.

The pyrolysis is conducted over a time period that preferably results in the complete pyrolysis of the preform. For high purity materials, the furnace, containers, handling equipment, and other components of the pyrolysis apparatus are clean, essentially free from, free from and do not contribute any elements or materials, that would be considered impurities or contaminants, to the pyrolized material. A constant flow rate of "sweeping" gas can help purge the furnace during volatile generation. In an embodiment, the pyrolysis environment, e.g., the furnace, the atmosphere, the container and combinations and variations of these, can have materials that contribute to or effect, for example, the composition, stoichiometry, features, performance and combinations and variations of these in the ceramic and the final applications or products.

During pyrolysis material may be lost through off gassing. The amount of material remaining at the end of a pyrolysis step, or cycle, is referred to as char yield (or pyrolysis yield). The formulations and polysilocarb precursor formulations of embodiments of the present formulations can have char yields for SiOC formation of at least about 60%, about 70%, about 80%, and at least about 90%, at least about 91% and greater. In fact, with air pyrolysis the materials may have char yields well above 91%, which can approach 100%. In order to avoid the degradation of the material in an air pyrolysis (noting that typically pyrolysis is conducted in inert atmospheres, reduced oxygen atmosphere, essentially inert atmosphere, minimal oxygen atmospheres, and combinations and variations of these) specifically tailored formulations can be used. For example, formulations high in phenyl content (at least about 11%, and preferably at least about 20% by weight phenyls), formulations high in allyl content (at least about 15% to about 60%) can be used for air pyrolysis to mitigate the degradation of the material.

The initial or first pyrolysis step for SiOC formation, in some embodiments and for some uses, generally yields a structure that is not very dense, and for example, may not reached the density required for its intended use. However, in some examples, such as the use of lightweight spheres, proppants, pigments, and others, the first pyrolysis may be, and is typically sufficient. Thus, generally a reinfiltration process may be performed on the pyrolized material, to add in additional polysilocarb precursor formulation material, to fill in, or fill, the voids and spaces in the structure. This reinfiltrated material may then be cured and repyrolized. (In some embodiments, the reinfiltrated materials is cured, but not pyrolyzed.) This process of pyrolization, reinfiltration may be repeated, through one, two, three, and up to 10 or more times to obtain the desired density of the final product.

Starting materials, precursor formulations, polysilocarb precursor formulations, as well as, methods of formulating, making, forming, curing and pyrolizing, precursor materials to form polymer derived materials, structures and ceramics, are set forth in Published US Patent Applications, Publication Nos. 2014/0343220, 2014/0274658, and 2014/0326453, and US Patent Application Ser. Nos. 61/946,598, 62/055,397 and 62/106,094, the entire disclosures of each of which are incorporated herein by reference.

In preferred embodiments of the polysilocarb derived ceramics the amounts of Si, O, C for the total amount of ceramic are set forth in the Table 1.

TABLE 1

|  | Si | | O | | C | |
|---|---|---|---|---|---|---|
|  | Lo | Hi | Lo | Hi | Lo | Hi |
| Wt % | 35.00% | 50.00% | 10.00% | 35.00% | 5.00% | 30.00% |
| Mole Ratio | 1.000 | 1.429 | 0.502 | 1.755 | 0.334 | 2.004 |
| Mole % | 15.358% | 63.095% | 8.821% | 56.819% | 6.339% | 57.170% |

In some embodiments, upon pyrolization, graphenic, graphitic, amorphous carbon structures and combinations and variations of these are present in the Si—O—C ceramic. A distribution of silicon species, consisting of SiOxCy structures, which result in SiO4, SiO3C, SiO2C2, SiOC3, and SiC4 are formed in varying ratios, arising from the precursor choice and their processing history. Carbon is generally bound between neighboring carbons and/or to a Silicon atom. In general, in the ceramic state, carbon is largely not coordinated to an oxygen atom, thus oxygen is largely coordinated to silicon.

The pyrolysis may be conducted in any heating apparatus that maintains the request temperature and environmental controls. Thus, for example pyrolysis may be done with gas fired furnaces, electric furnaces, direct heating, indirect heating, fluidized beds, kilns, tunnel kilns, box kilns, shuttle kilns, coking type apparatus, lasers, microwaves, and combinations and variations of these and other heating apparatus and systems that can obtain the request temperatures for pyrolysis.

Custom and predetermined control of when chemical reactions, arrangements and rearrangements, occur in the various stages of the process from raw material to final end product can provide for reduced costs, increased process control, increased reliability, increased efficiency, enhanced product features, increased purity, and combinations and variation of these and other benefits. The sequencing of when these transformations take place can be based upon the processing or making of precursors, and the processing or making of precursor formulations; and may also be based upon cure and pyrolysis conditions. Further, the custom and predetermined selection of these steps, formulations and conditions, can provide enhanced product and processing features through the various transformations, e.g., chemical reactions; molecular arrangements and rearrangements; and microstructure arrangements and rearrangements.

At various points during the manufacturing process, the polymer derived ceramic structures, e.g., polysilocarb structures, intermediates and end products, and combinations and variations of these, may be machined, milled, molded, shaped, drilled, etched, or otherwise mechanically processed and shaped.

In general, embodiments of the pyrolized polysilocarb ceramics can have about 30% to about 60% Si, can have about 5% to about 40% O, and can have about 3% to about 35% carbon. Greater and lesser amounts are also contemplated.

The type of carbon present in preferred embodiments of the polysilocarb derived ceramics can be free carbon, (e.g., turbostratic, amorphous, graphenic, graphitic forms of carbon) and Carbon that is bound to Silicon. Embodiments having preferred amounts of free carbon and Silicon-bound-Carbon (Si—C) are set forth in Table 2.

TABLE 2

| Embodiment | % Free Carbon | % Si—C type |
|---|---|---|
| 1 | 64.86 | 35.14 |
| 2 | 63.16 | 36.85 |
| 3 | 67.02 | 32.98 |
| 4 | 58.59 | 41.41 |
| 5 | 65.70 | 31.66 |
| 6 | 62.72 | 30.82 |
| 7 | 61.68 | 34.44 |
| 8 | 69.25 | 27.26 |
| 9 | 60.00 | 27.54 |

Generally, embodiments of polysilocarb derived ceramics can have from about 20% free carbon to about 80% free carbon, and from about 20% Si—C bonded carbon to about 80% Si—C bonded carbon. Greater and lesser amounts are also contemplated.

Typically, embodiments of the pyrolized polysilocarb ceramics can have other elements present, such as Nitrogen and Hydrogen. Embodiments can have the amounts of these other materials as set out in Table 3. (Note that these are typical for embodiments of net materials. If fillers, additives, or other materials are combined with or into the precursor formulation; then such materials can generally be present to a greater or lesser extent in the pyrolized ceramic material)

TABLE 3

| | H | | N | |
|---|---|---|---|---|
| | Lo | Hi | Lo | Hi |
| Wt % | 0.00% | 2.20% | 0% | 2% |
| Mole Ratio | 0.000 | 1.751 | 0 | 0.1 |
| Mole % | 0.000% | 48.827% | 0% | 3% |

Figure 1D:
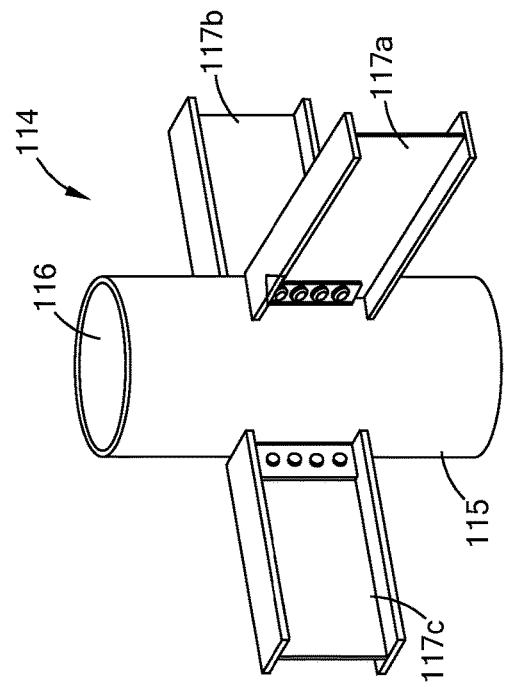
FIG. 1D is a perspective view of an embodiment of polysilocarb structural members in accordance with the present inventions.
Figure 1A:
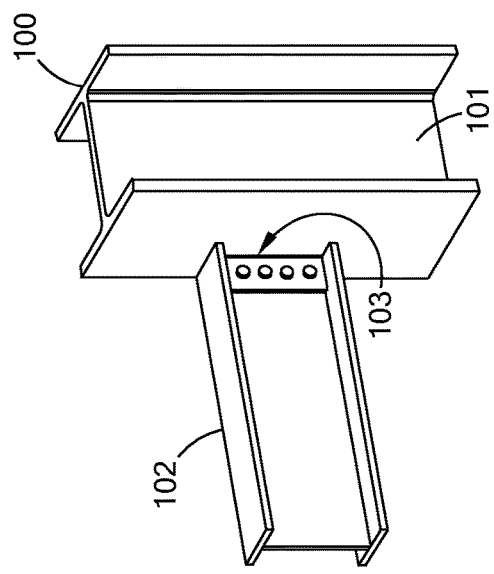
FIG. 1A is a perspective view of an embodiment of polysilocarb structural members in accordance with the present inventions.
Figure 1C:
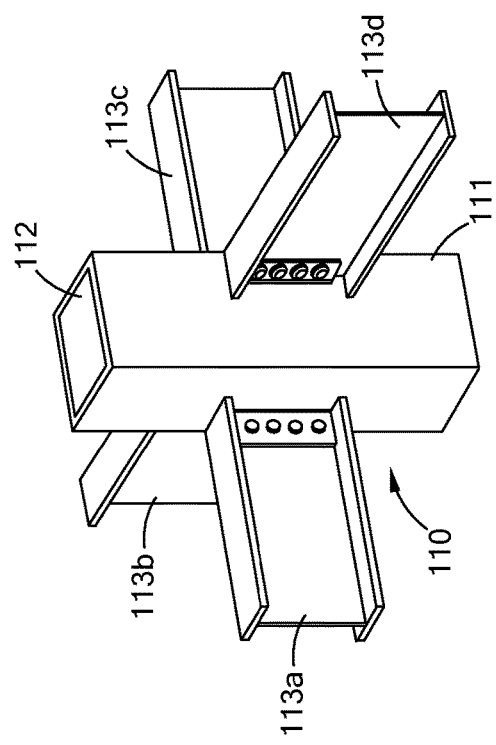
FIG. 1C is a perspective view of an embodiment of polysilocarb structural members in accordance with the present inventions.

Turning to FIGS. 1A to 1D there are provided various embodiment of configurations of structural components that are made from polysilocarb materials. Depending upon the performance requirements, e.g., load, stress, strain, impact, environmental, etc., for these members, they can be hard cured polysilocarb materials, pyrolized polysilocarb materials, pyrolized materials that are reinfiltrated to a very high density, filled and unfilled polysilocarb materials, ready to press sintered SiC (which is derived from polysilocarb materials as disclosed and taught in U.S. Patent Application Ser. No. 62/055,397, 62/055,461 and 62/112,025, the entire disclosures of each of which are incorporated herein by reference) and combinations, variations, and composites of these and other materials, e.g., metal, steel, aluminum, metal matrix complexes, plastic, carbon fiber, and wood, among others materials. In FIG. 1A there is shown an embodiment of a column 100 having a web 101 and an I-beam 102 that is affixed to the column 100 by connection 103. In FIG. 1B there is shown an embodiment of an I-beam joint 104, in which two I-beams 105, 106 are affixed by connection or joint 107. I-beam 105 has web 108 and top flange 120 and bottom flange 121. I-beam 106 has web 109 and top and bottom flanges (not numbered). In FIG. 1C there is provided an embodiment of a column and I-beam configuration 110, having a central square column or post 111 that has an open central space 112. I-beams 113a, 113b, 113c, 113d are affixed to the post 111. In FIG. 1D there is provided an embodiment of a column and beam configuration 114 having a circular central column or post 115, having a central circular opening 116. I-beams 116a, 116b, 116c are attached to the column 115. The configurations can be attached or affixed by know means such as metal, composite, or polysilocarb flanges and bolts and other known techniques for connecting structural members.

Figure 2:
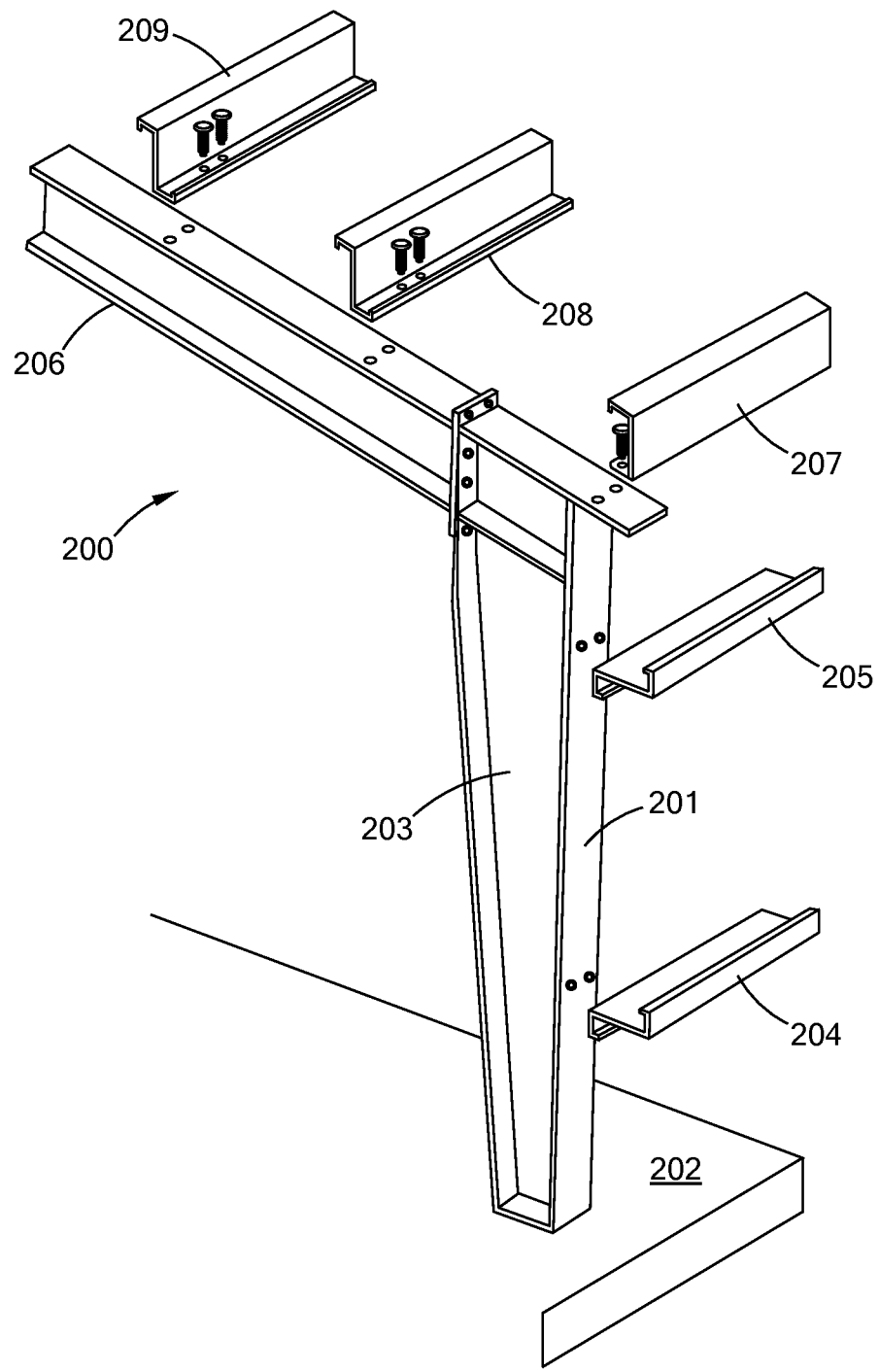
FIG. 2 is an exploded perspective view of an embodiment of polysilocarb building support members in accordance with the present inventions.

Turning to FIG. 2 there is shown an embodiment of building structural members 200. Depending upon the performance requirements, e.g., load, stress, strain, impact, environmental, etc., for these members, they can be hard cured polysilocarb materials, pyrolized polysilocarb materials, pyrolized materials that are reinfiltrated to a very high density, filled and unfilled polysilocarb materials, ready to press sintered SiC (which is derived from polysilocarb materials as disclosed and taught in U.S. Patent Application Ser. No. 62/055,397, 62/055,461 and 62/112,025, the entire disclosures of each of which are incorporated herein by reference) and combinations, variations, and composites of these and other materials, e.g., metal, steel, aluminum, metal matrix complexes, plastic, carbon fiber, and wood, among others materials. The configurations can be attached or affixed by know means such as metal, composite, or polysilocarb flanges and bolts and other known techniques for connecting structural members. The building support members 200 have a column 201, having a web 203 that is on and affixed to a base or pad 202. Girls 204, 205 (for holding side walls not shown, which can also be made from polysilocarb materials) are attached to column 201. Roof cross I-beam 206 is attached to and supported by column 201. Roof purlins 207, 208, 209 are attached to cross I-beam 206, and support roof panels or members not shown, which can also be made from polysilocarb materials).

Figure 3A:
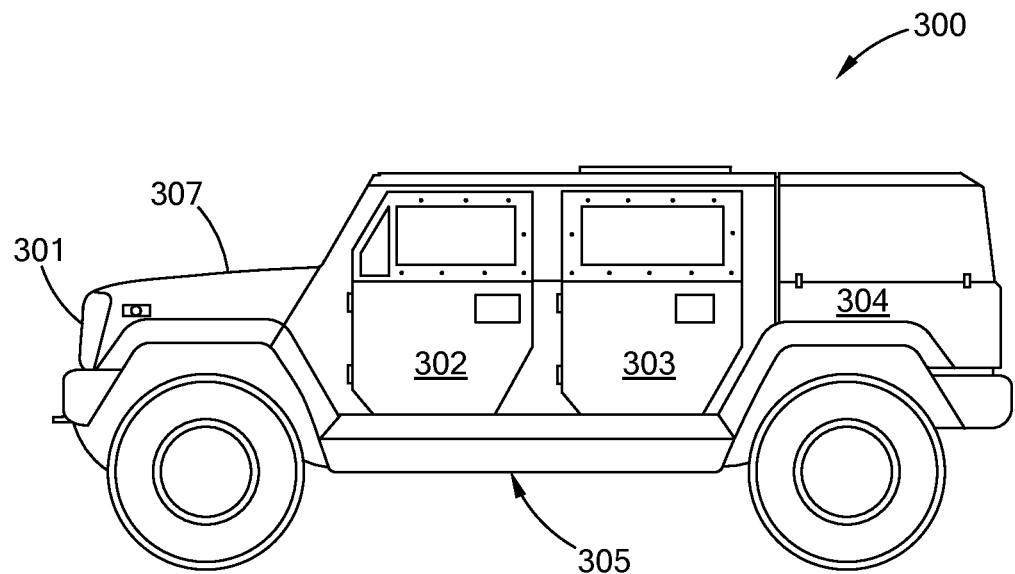
FIG. 3A is a side view of an embodiment of armored vehicle having polysilocarb based armor panels in accordance with the present inventions.
Figure 3B:
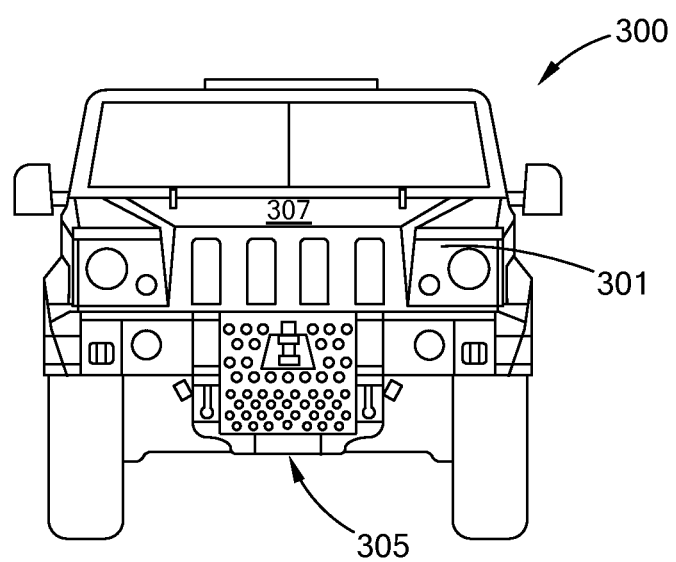
FIG. 3B is a front view of the vehicle of FIG. 3A.

Turning to FIGS. 3A and 3B there is provided an embodiment of an armored vehicle 300 having a front 301. The vehicle can have body panels or armor plates incorporated into or on body panels that prevent or mitigate ballistic objects, e.g., bullets, projectiles, and shrapnel, and an explosion's energy and force. Depending upon the performance requirements, e.g., load, stress, strain, impact, environmental, etc., for these members, they can be hard cured polysilocarb materials, pyrolized polysilocarb materials, pyrolized materials that are reinfiltrated to a very high density, filled and unfilled polysilocarb materials, ready to press sintered SiC (which is derived from polysilocarb materials as disclosed and taught in U.S. Patent Application Ser. No. 62/055,397, 62/055,461 and 62/112,025, the entire disclosures of each of which are incorporated herein by reference) and combinations, variations, and composites of these and other materials, e.g., metal, steel, aluminum, metal matrix complexes, plastic, carbon fiber, and wood, among others materials. In the embodiment of armored vehicle 300 there is a lower polysilocarb based ballistic plate 305, which protects the bottom of the vehicle, there are polysilocarb based door panels 302, 303, polysilocarb quarter panel 304 and polysilocarb hood assembly 307.

Figure 4:
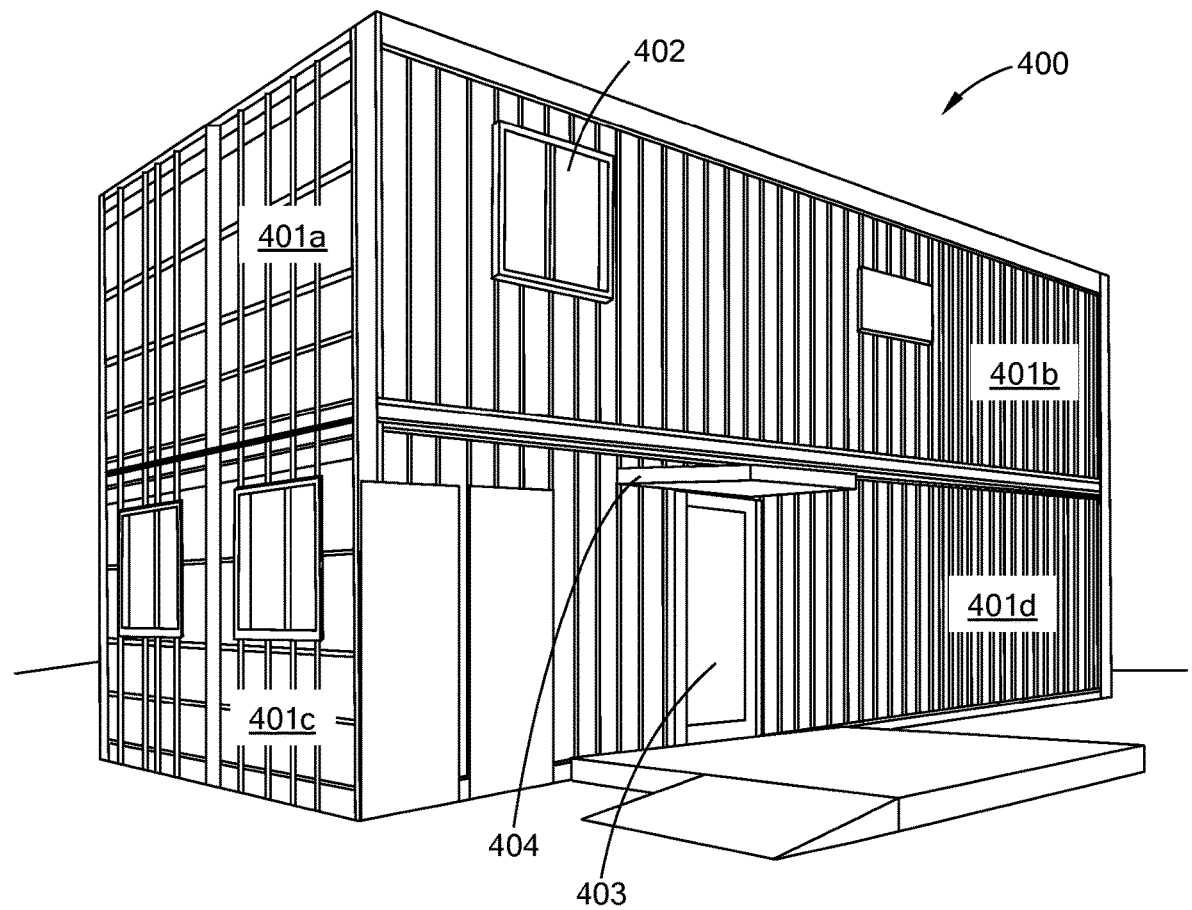
FIG. 4 is a perspective view of an embodiment of a polysilocarb modular housing unit in accordance with the present inventions.

Turning to FIG. 4, there is provided an embodiment of a polysilocarb mobile building 400 that can serve as for example a house, dwelling, office, business or other purpose. Depending upon the performance requirements, e.g., load, stress, strain, impact, environmental, etc., for the building, its panels and structural members, they can be hard cured polysilocarb materials, pyrolized polysilocarb materials, pyrolized materials that are reinfiltrated to a very high density, filled and unfilled polysilocarb materials, ready to press sintered SiC (which is derived from polysilocarb materials as disclosed and taught in U.S. Patent Application Ser. No. 62/055,397, 62/055,461 and 62/112,025, the entire disclosures of each of which are incorporated herein by reference) and combinations, variations, and composites of these and other materials, e.g., metal, steel, aluminum, metal matrix complexes, plastic, carbon fiber, and wood, among others materials. The mobile building 400 has an upper side walls 401a, 401b (for an upper story, or second floor) having a window 402, and lower side walls 401c, 401d (for a lower story or first floor). The building 400 has a door 403 and awning 404.

These building can be manufacture or readily assembled at a site or location, e.g., a disaster site. The polysilocarb building can be, among other benefits over convention buildings, lighter, and preferably substantially lighter than a comparable building made from steel.

Figure 5:
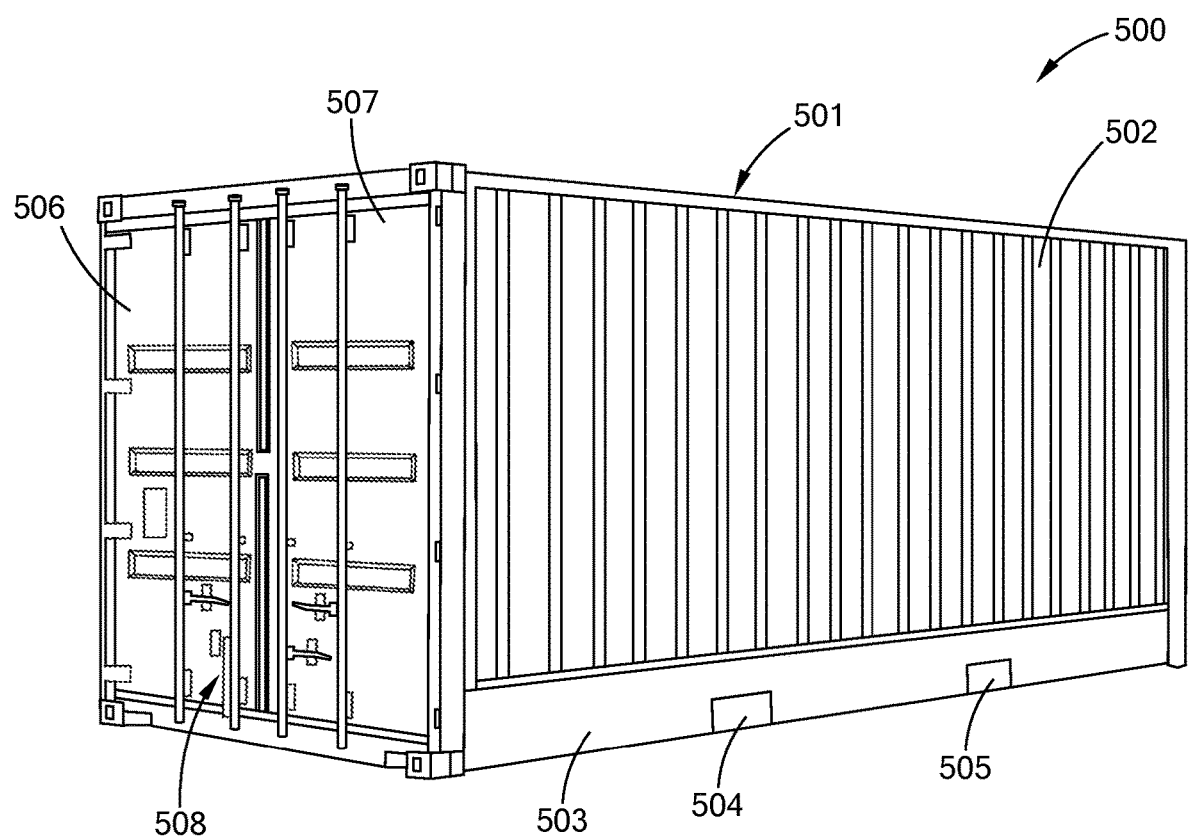
FIG. 5 is a perspective view of an embodiment of a polysilocarb shipping container in accordance with the present inventions.

Turning to FIG. 5 there is provided an embodiment of a polysilocarb shipping container 500. Depending upon the performance requirements, e.g., load, stress, strain, impact, environmental, etc., for the shipping container, its panels, lifting lugs, locking devices, and structural members, they can be hard cured polysilocarb materials, pyrolized polysilocarb materials, pyrolized materials that are reinfiltrated to a very high density, filled and unfilled polysilocarb materials, ready to press sintered SiC (which is derived from polysilocarb materials as disclosed and taught in U.S. Patent Application Ser. No. 62/055,397, 62/055,461 and 62/112,025, the entire disclosures of each of which are incorporated herein by reference) and combinations, variations, and composites of these and other materials, e.g., metal, steel, aluminum, metal matrix complexes, plastic, carbon fiber, and wood, among others materials. The shipping container 500 has a roof plate 501, a sidewall 502, a base 503, and lifting openings or lugs 504, 505 that are formed in the base 503. The container 500 has doors 506, 507 that have locking mechanism 508. The polysilocarb container can be, among other benefits over conventional container, lighter, and preferably is substantially lighter than a comparable container made from steel.

Figure 6:
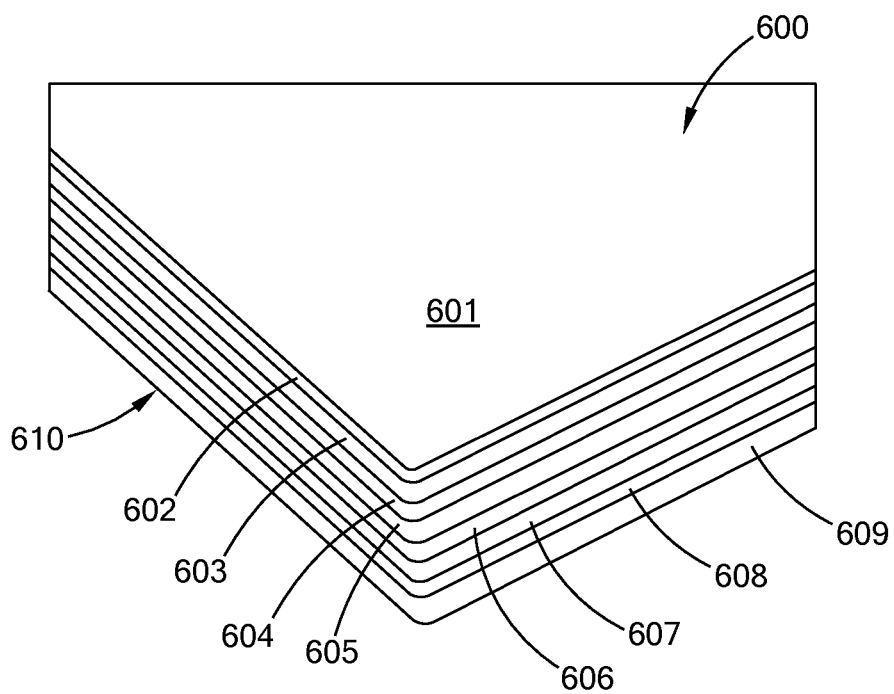
FIG. 6 is perspective view of an embodiment of a polysilocarb based panel in accordance with the present inventions.

Turning to FIG. 6 there is provided an embodiment of a multilayer building panel 600. One, two, three or all of the layers, 602, 603, 604, 605, 606, 607, 608, 609, depending upon the performance requirements, e.g., load, stress, strain, fire resistance, impact, environmental, etc., for the panel, the layers can be hard cured polysilocarb materials, pyrolized polysilocarb materials, pyrolized materials that are reinfiltrated to a very high density, filled and unfilled polysilocarb materials, ready to press sintered SiC (which is derived from polysilocarb materials as disclosed and taught in U.S. Patent Application Ser. No. 62/055,397, 62/055,461 and 62/112, 025, the entire disclosures of each of which are incorporated herein by reference) and combinations, variations, and composites of these and other materials, e.g., metal, steel, aluminum, metal matrix complexes, plastic, carbon fiber, paper, and wood, among others materials. Further, the surfaces 601 and 610 can be coated with a polysilocarb material.

Figure 7:
FIG. 7 is a perspective view of an embodiment of a polysilocarb body arm in accordance with the present inventions.

Turning to FIG. 7 there is provided an embodiment of body armor 700, e.g., a bullet proof vest, which is made from ballistic polysilocarb based materials. The body armor 700 has members that prevent or mitigate ballistic objects, e.g., bullets, projectiles, and shrapnel, and an explosion's energy and force. Depending upon the performance requirements, e.g., load, stress, strain, impact, environmental, etc., for these members, they can be hard cured polysilocarb materials, pyrolized polysilocarb materials, pyrolized materials that are reinfiltrated to a very high density, filled and unfilled polysilocarb materials, ready to press sintered SiC (which is derived from polysilocarb materials as disclosed and taught in U.S. Patent Application Ser. No. 62/055,397, 62/055,461 and 62/112,025, the entire disclosures of each of which are incorporated herein by reference) and combinations, variations, and composites of these and other materials, e.g., metal, steel, aluminum, metal matrix complexes, plastic, carbon fiber, and wood, among others materials.

Figure 8:
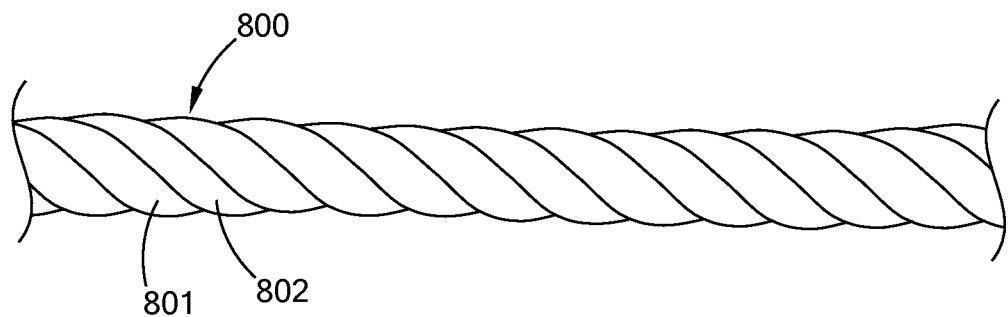
FIG. 8 is a perspective view of an embodiment of a polysilocarb rope in accordance with the present inventions.

Turning to FIG. 8 there is provided an embodiment of a polysilocarb rope 800 made from polysilocarb based fibers 801, 802. Depending upon the performance requirements, e.g., load, stress, strain, impact, environmental, etc., for the rope, the fibers can be hard cured polysilocarb materials, pyrolized polysilocarb materials, pyrolized materials that are reinfiltrated to a very high density, filled and unfilled polysilocarb materials, ready to press sintered SiC (which is derived from polysilocarb materials as disclosed and taught in U.S. Patent Application Ser. No. 62/055,397, 62/055,461 and 62/112,025, the entire disclosures of each of which are incorporated herein by reference) and combinations, variations, and composites of these and other materials, e.g., metal, steel, metal matrix complexes, plastic, nylon, carbon fiber, and natural fibers, among others materials.

Figure 9:
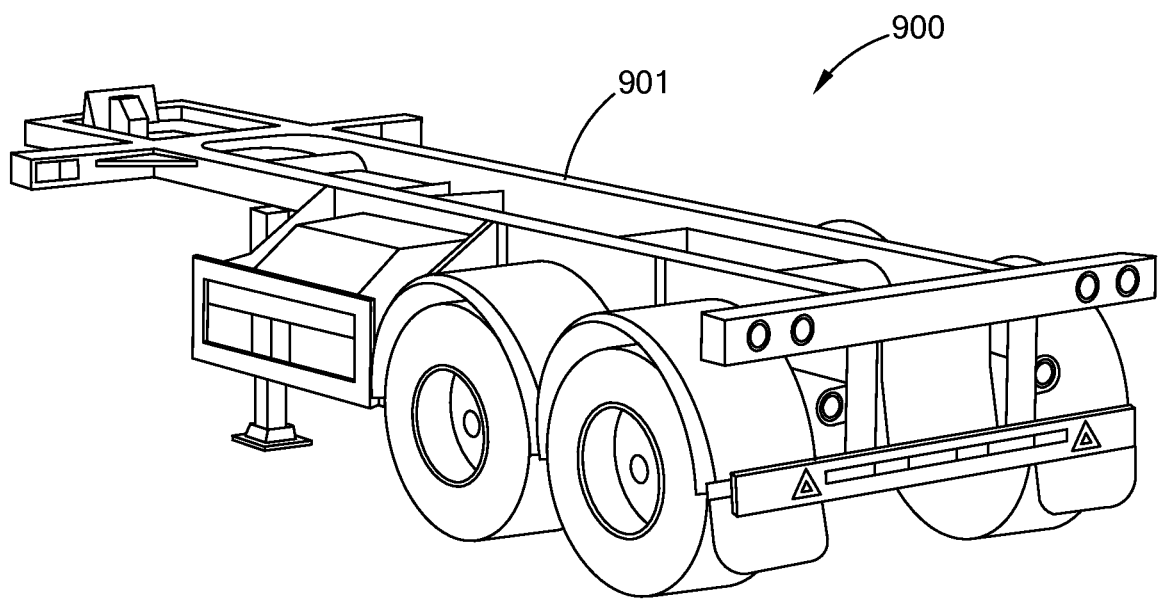
FIG. 9 is a perspective view of an embodiment of a polysilocarb trailer in accordance with the present inventions.

Turning to FIG. 9 there is provided an embodiment of a trailer 900 having a polysilocarb based frame 901. Depending upon the performance requirements, e.g., load, stress, strain, impact, environmental, etc., for the trailer, the frame can be hard cured polysilocarb materials, pyrolized polysilocarb materials, pyrolized materials that are reinfiltrated to a very high density, filled and unfilled polysilocarb materials, ready to press sintered SiC (which is derived from polysilocarb materials as disclosed and taught in U.S. Patent Application Ser. No. 62/055,397, 62/055,461 and 62/112, 025, the entire disclosures of each of which are incorporated herein by reference) and combinations, variations, and composites of these and other materials, e.g., metal, steel, aluminum, metal matrix complexes, plastic, carbon fiber, and wood, among others materials.

Figure 10:
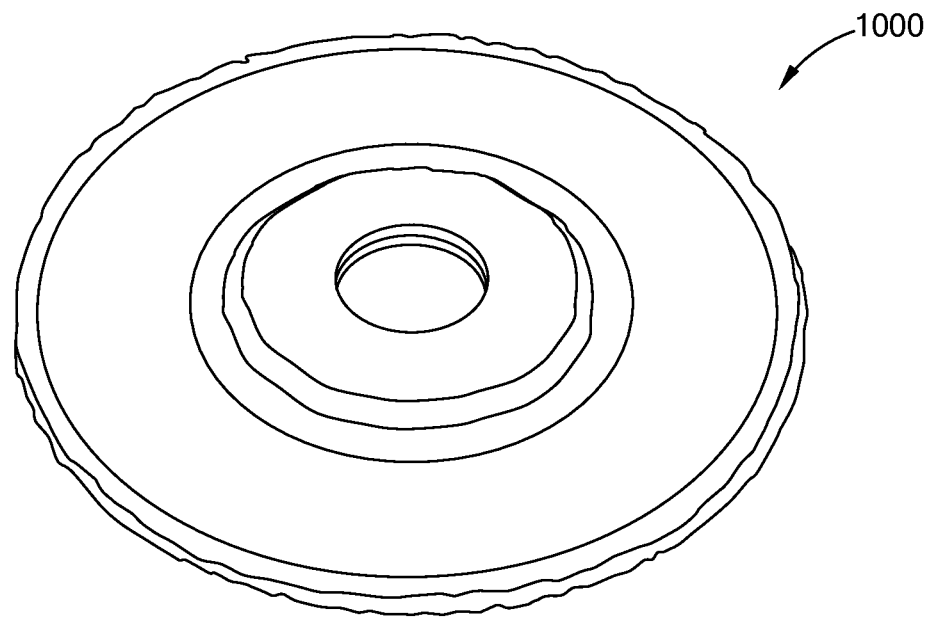
FIG. 10 is perspective view of an embodiment of a polysilocarb grinding wheel in accordance with the present inventions.

Turning to FIG. 10 there is provided an embodiment of a abrasion device 1000, e.g., a grinding wheel. The abrasive medium as well as the support or structural component of the device can be made from, or based upon polysilocarbs. Depending upon the performance requirements, e.g., load, stress, strain, impact, environmental, etc., for the abrasive members and the supporting material can be hard cured polysilocarb materials, pyrolized polysilocarb materials, pyrolized materials that are reinfiltrated to a very high density, filled and unfilled polysilocarb materials, ready to press sintered SiC (which is derived from polysilocarb materials as disclosed and taught in U.S. Patent Application Ser. No. 62/055,397, 62/055,461 and 62/112,025, the entire disclosures of each of which are incorporated herein by reference) and combinations, variations, and composites of these and other materials, e.g., metal, steel, aluminum, metal matrix complexes, plastic, carbon fiber, natural fibers, and wood, among others materials.

Figure 11:
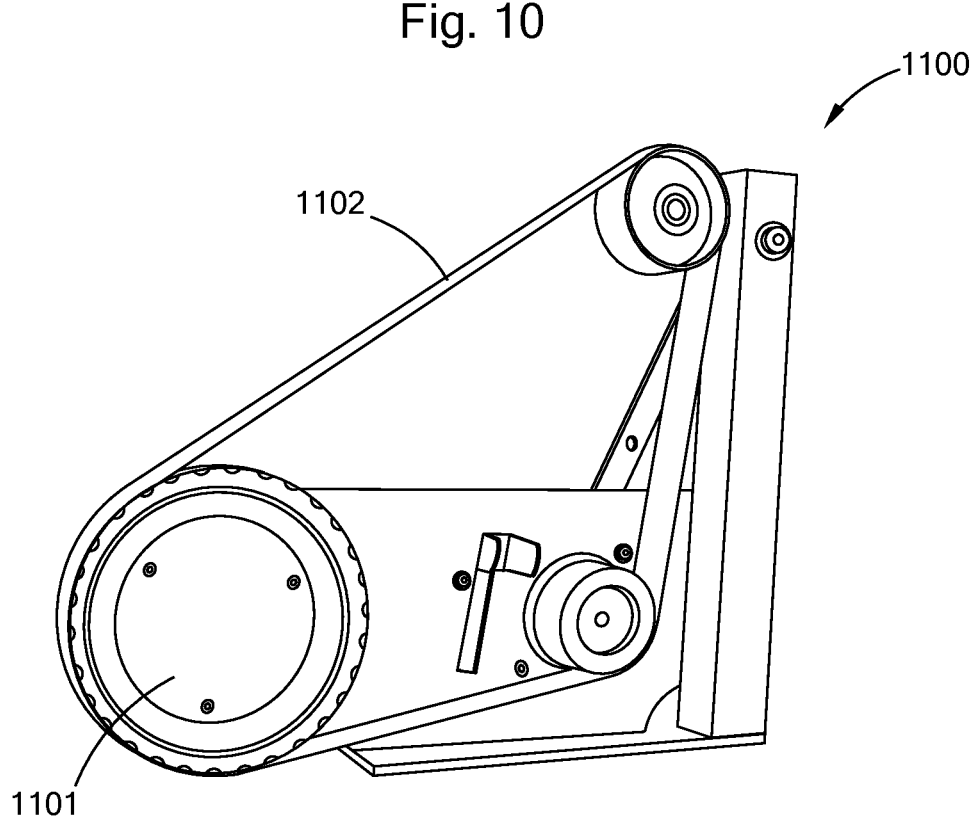
FIG. 11 is a perspective view of a belt grinding machine, with embodiment of a polysilocarb abrasive belt in accordance with the present inventions.
Figure 12:
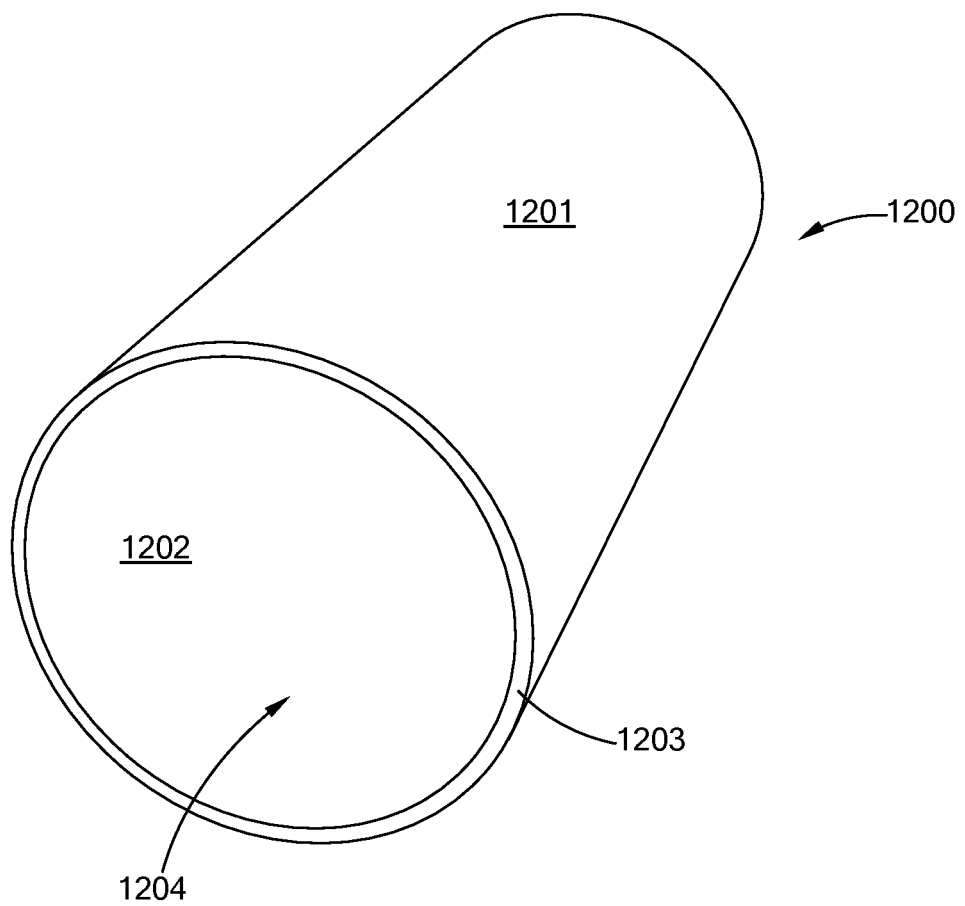
FIG. 12 is a perspective view of a polysilocarb tubular in accordance with the present inventions.

Turning to FIG. 11 there is provided an embodiment of a abrasion device 1100, e.g., a belt grinder, which has a drive wheel 1101 that drives a grinding belt 1102 having polysilocarb based abrasives. Depending upon the performance requirements for the abrasives, e.g., load, temperature, material to be ground, etc., the abrasive materials can be pyrolized polysilocarb materials, pyrolized materials that are reinfiltrated to a very high density, filled and unfilled polysilocarb materials, ready to press sintered SiC (which is derived from polysilocarb materials as disclosed and taught in U.S. Patent Application Ser. No. 62/055,397, 62/055,461 and 62/112,025, the entire disclosures of each of which are incorporated herein by reference) and combinations, variations, and composites of these and other materials, e.g., metal, grit, diamond, and grinding and abrasive materials.

Turning to FIG. 11 there is provided an embodiment of a polysilocarb tubular 1200. The tubular 1200 has an outer surface 1201, inner surface 1202, a circular wall 1203, and an opening or passage 1204. Depending upon the performance requirements, e.g., load, stress, strain, impact, environmental, etc., for the tubular it can be hard cured polysilocarb materials, pyrolized polysilocarb materials, pyrolized materials that are reinfiltrated to a very high density, filled and unfilled polysilocarb materials, ready to press sintered SiC (which is derived from polysilocarb materials as disclosed and taught in U.S. Patent Application Ser. No. 62/055,397, 62/055,461 and 62/112,025, the entire disclosures of each of which are incorporated herein by reference) and combinations, variations, and composites of these and other materials, e.g., metal, steel, aluminum, metal matrix complexes, plastic, and carbon fiber, among others materials.

Figure 13:
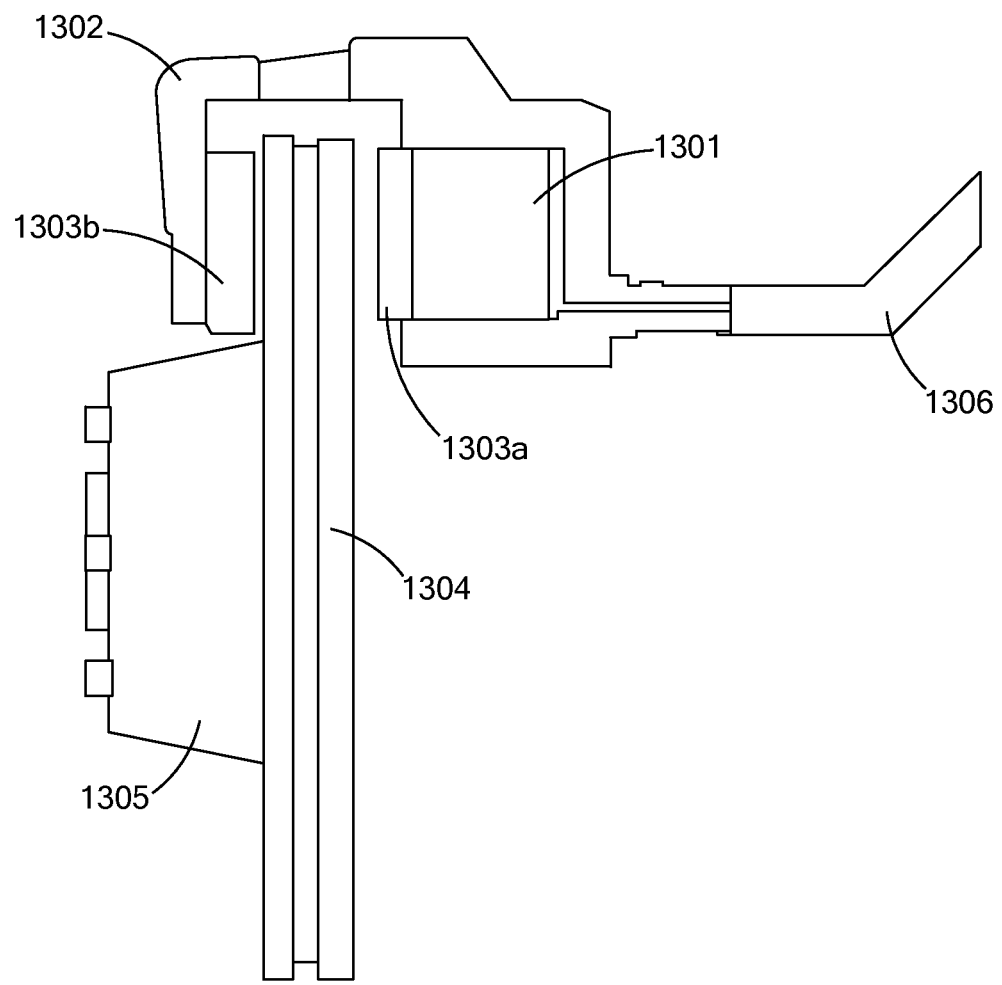
FIG. 13 is a cross sectional view of a polysilocarb break assembly in accordance with the present inventions.

Turning to FIG. 13 there is provided an embodiment of an automotive break assembly. The break assembly has a piston 1301, a caliper 1302, a first break pad 1303a, a second break pad 1303b, a rotor 1304, a hub 1305 and a break line 1306. In addition to the pads 1303a, 1303b and the rotor 1304 the other components of the break assembly can also be made from polysilocarb based materials. Depending upon the performance requirements, e.g., load, stress, strain, impact, environmental, etc., for the components can be hard cured polysilocarb materials, pyrolized polysilocarb materials, pyrolized materials that are reinfiltrated to a very high density, filled and unfilled polysilocarb materials, ready to press sintered SiC (which is derived from polysilocarb materials as disclosed and taught in U.S. Patent Application Ser. No. 62/055,397, 62/055,461 and 62/112,025, the entire disclosures of each of which are incorporated herein by reference) and combinations, variations, and composites of these and other materials, e.g., metal, steel, aluminum, metal matrix complexes, plastic, and carbon fiber, among others materials.

EXAMPLES

The following examples are provided to illustrate various embodiments of processes, precursors, polysilocarb formulations, prepregs, cured preforms, applications, apparatus, equipment, devices and ceramics of the present inventions. These examples are for illustrative purposes, and should not be viewed as, and do not otherwise limit the scope of the present inventions. The percentages used, unless specified otherwise, are weight percents of the total formulation, preform or structure.

Example 1

A polysilocarb formulation using the mixing type method is formulated. The formulation is made by mixing together at room temperature 70% of the MHF precursor and a molecular weight of about 800 and 30% of the allyl terminated precursor having a molecular weight of about 500 in a vessel and placing in storage for later use. The polysilocarb formulation has good shelf life and room temperature and the precursors have not, and do not react with each other. The polysilocarb formulation has a viscosity of about 12 cps.

Example 2

A polysilocarb formulation using the mixing type method is formulated. The formulation is made by mixing together at room temperature 60% of the MHF precursor and a molecular weight of about 800 and 40% of the vinyl terminated precursor having a molecular weight of about 9,400 in a vessel and placing in storage for later use. The polysilocarb formulation has good shelf life and room temperature and the precursors have not, and do not react with each other. The polysilocarb formulation has a viscosity of about 200 cps.

Example 3

A polysilocarb formulation using the mixing type method is formulated. The formulation is made by mixing together 50% of the MH precursor having a molecular weight of about 800 and 50% of the vinyl terminated precursor having a molecular weight of about 800 in a vessel and placing in storage for later use. The polysilocarb formulation has good shelf life and room temperature and the precursors have not, and do not react with each other. The polysilocarb formulation has a viscosity of about 55 cps.

Example 4

A polysilocarb formulation using the mixing type method is formulated. The formulation is made by mixing together 40% of the MH precursor having a molecular weight of about 1,000 and 60% of the vinyl terminated precursor having a molecular weight of about 500 in a vessel and placing in storage for later use. The polysilocarb formulation has good shelf life and room temperature and the precursors have not, and do not react with each other. The polysilocarb formulation has a viscosity of about 25 cps.

Example 5

A polysilocarb formulation using the mixing type method is formulated. The formulation is made by mixing together 30% of the MHF precursor having a molecular weight of about 800 and 70% of the vinyl terminated precursor having a molecular weight of about 500 in a vessel and placing in storage for later use. The polysilocarb formulation has good shelf life and room temperature and the precursors have not, and do not react with each other. The polysilocarb formulation has a viscosity of about 10 cps.

Example 6

The polysilocarb formulation of Example 1 has 40% of an about 80 micron to about 325 mesh SiC filler added to the formulation to make a filled polysilocarb formulation, which can be kept for later use.

Example 7

The polysilocarb formulation of Example 2 has 30% of an about 80 micron to about 325 mesh SiC filler added to the formulation to make a filled polysilocarb formulation, which can be kept for later use.

Example 8

A polysilocarb formulation using the mixing type method is formulated. The formulation is made by mixing together 10% of the MHF precursor having a molecular weight of about 800 and 73% of the styrene (phenylethyl) precursor (having 10% X) and a molecular weight of about 1,000, and 16% of the TV precursor, and 1% of the OH terminated precursor, having a molecular weight of about 1,000 in a vessel and placing in storage for later use. The polysilocarb formulation has good shelf life and room temperature and the precursors have not, and do not react with each other. The polysilocarb formulation has a viscosity of about 72 cps.

Example 9

A polysilocarb formulation using the mixing type method is formulated. The formulation is made by mixing together 0-90% of the MH precursor having a molecular weight of about 800, and 0-90% of the styrene precursor (having 10% X) and a molecular weight of about 1000, and 0-30% of the TV precursor, and 0-30% of the vinyl terminated precursor having a molecular weight of about 9400 and 0-20% of the OH terminated precursor, having a molecular weight of about 800 in a vessel and placing in storage for later use. The polysilocarb formulation has good shelf life and room temperature and the precursors have not, and do not react with each other. The polysilocarb formulation has a viscosity of about 100 cps.

Example 10

A polysilocarb formulation using the mixing type method is formulated. The formulation is made by mixing together 70% of the MHF precursor and 30% of the vinyl terminated precursor having a molecular weight of about 500 and about 42% of a submicron and a 325 mesh silica in a vessel and placing in storage for later use. The polysilocarb formulation has good shelf life and room temperature and the precursors have not, and do not react with each other. The polysilocarb formulation has a viscosity of about 300 cps.

Example 11

A polysilocarb formulation using the mixing type method is formulated. The formulation is made by mixing together 20-80% of the MH precursor having a molecular weight of about 800, and 0-10% of the TV precursor, and 5-80% of the vinyl terminated precursor having a molecular weight of about and about 500 of submicron, 325 mesh, and 8 micron SiC in a vessel and placing in storage for later use. The polysilocarb formulation has good shelf life and room temperature and the precursors have not, and do not react with each other. The polysilocarb formulation has a viscosity of about 300 cps.

Example 12

40 ppm of a platinum catalyst is added to the polysilocarb formulation of Example 6 and these catalyzed formulations are added drop wise (e.g., drops of the formulation are dropped into) to a 50-120° C. hot water bath to cure the formulation. The time in the hot water bath was about 1-2 minutes. The cured drop structures were then pyrolyzed at 950° C. for about 60 minutes. The pyrolyzed structures were hollow spheres with densities of less than about 1 g/cc, diameters of about 60 microns to about 2 mm, and crush strengths of about 0.5-2 ksi.

Example 13

A precursor formulation of having 75% MHF, 15% TV, and 10% VT is formed using the mixing type process and stored.

Example 14a

1% catalyst (10 ppm platinum and 0.5% LUPEROX 231 peroxide) is added to the precursor formulation of Example 13. The catalyzed precursor is then impregnated into a reinforcing material and cured to form a composite.

Example 14b

The cured material of Example 14a is pyrolyzed to form a polysilocarb derived ceramic composite material.

Example 14c

1% catalyst (10 ppm platinum and 0.5% LUPEROX 231 peroxide) is added to the precursor formulation of Example 13. Using a tower forming and cure system, the catalyzed polysilocarb formulation is formed from a sonic nozzle having an internal diameter of 0.180 inches into droplets that fall from the nozzle into and through an 8 foot curing tower. The temperature at the top of the tower is from 495-505° C. the temperature at the bottom of the tower is 650° C. There are no discrete temperature zones in the tower. Airflow up the tower is by convection. The collection pan is maintained at 110° C. The forming and curing are done in air. The preform beads are removed from the pan and post (hard) cured at 200° C. in air for 2 hours. The hard cured preform proppants are pyrolyzed at 1000° C. in an argon atmosphere for 2 hours. The cure yield is from 99% to 101%. The char yield is 86%.

Example 14d

1% catalyst (10 ppm platinum and 0.5% LUPEROX 231 peroxide) is added to the formulation of Example 13, and the polysilocarb formulation is formed into a prepreg having carbon fiber reinforcement. The prepreg curing is done in Argon and at 200° C. for 2 hours. The hard cured preform are pyrolyzed at 1000° C. under vacuum for 5 hours.

Example 15

A polysilocarb precursor formulation having 70% MHF, 20% TV, and 10% VT is formed using the mixing type process and placed in a container.

Example 16a

1% catalyst (10 ppm platinum and 0.5% LUPEROX 231 peroxide) is added to the precursor formulation of Example 15. The catalyzed precursor is then impregnated into a reinforcing material and cured to form a composite.

Example 16b

The cured material of Example 16a is pyrolyzed to form a polysilocarb derived ceramic composite material.

Example 16c

1% catalyst (10 ppm platinum and 0.5% LUPEROX 231 peroxide) is added to the formulation of Example 15, and the polysilocarb formulation is formed into a prepreg having carbon fiber reinforcement. The prepreg curing is done in Argon and at 200° C. for 2 hours. The hard cured preform are pyrolyzed at 1000° C. under vacuum for 5 hours.

Example 17

Using a tower forming and cure system, a polysilocarb formulation from the mixing type process and having 70% MHF, 20% TV, 10% VT and 1% catalyst (10 ppm platinum and 0.5% LUPEROX 231 peroxide) is formed from a sonic nozzle having an internal diameter of 0.180 inches into droplets that fall from the nozzle into and through an 8 foot curing tower. The temperature at the top of the tower is from 495-505° C. the temperature at the bottom of the tower is 650° C. There are no discrete temperature zones in the tower. Airflow up the tower is by convection. The collection pan is maintained at 110° C. The forming and curing are done in air. The preform proppants are removed from the pan and post (hard) cured at 200° C. in air for 2 hours. The hard cured preform beads are pyrolyzed at 1000° C. under vacuum for 2 hours. The cure yield is from 99% to 101%. The char yield is 86%.

Example 18a

The pyrolyzed preform of Example 16c, is infused with a polysiloxane precursor formulation and pyrolyzed.

Example 18b

The pyrolyzed preform of Example 18a, is infused with a polysiloxane precursor formulation and pyrolyzed.

Example 19

Using the reaction type process a precursor formulation was made using the following formulation. The temperature of the reaction was maintained at 61° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Methyltriethoxysilane (FIG. 37) | 120.00 | 19.5% | 178.30 | 0.67 | 47.43% | 0.67 | 2.02 |
| Phenylmethyldiethoxysilane (FIG. 38) | 0.00 | 0.0% | 210.35 | — | 0.00% | — | — |
| Dimethyldiethoxysilane (FIG. 42) | 70.00 | 11.4% | 148.28 | 0.47 | 33.27% | 0.47 | 0.94 |
| Methyldiethoxysilane (FIG. 39) | 20.00 | 3.3% | 134.25 | 0.15 | 10.50% | 0.15 | 0.30 |
| Vinylmethyldiethoxysilane (FIG. 40) | 20.00 | 3.3% | 160.29 | 0.12 | 8.79% | 0.12 | 0.25 |
| Trimethyethoxysilane (FIG. 48) | 0.00 | 0.0% | 118.25 | — | 0.00% | — | — |
| Hexane in hydrolyzer | 0.00 | 0.0% | 86.18 | — | | | |
| Acetone in hydrolyzer | 320.00 | 52.0% | 58.08 | 5.51 | | | |
| Ethanol in hydrolyzer | 0.00 | 0.0% | 46.07 | — | | | |
| Water in hydrolyzer | 64.00 | 10.4% | 18.00 | 3.56 | | | |
| HCl | 0.36 | 0.1% | 36.00 | 0.01 | | | |
| Sodium bicarbonate | 0.84 | 0.1% | 84.00 | 0.01 | | | |

Example 20

Using the reaction type process a precursor formulation was made using the following formulation. The temperature of the reaction was maintained at 72° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 234.00 | 32.0% | 240.37 | 0.97 | 54.34% | 0.97 | 2.92 |
| Phenylmethyldiethoxysilane (FIG. 38) | 90.00 | 12.3% | 210.35 | 0.43 | 23.88% | 0.43 | 0.86 |
| Dimethyldiethoxysilane (FIG. 42) | 0.00 | 0.0% | 148.28 | — | 0.00% | — | — |
| Methyldiethoxysilane (FIG. 39) | 28.50 | 3.9% | 134.25 | 0.21 | 11.85% | 0.21 | 0.42 |
| Vinylmethyldiethoxysilane (FIG. 40) | 28.50 | 3.9% | 160.29 | 0.18 | 9.93% | 0.18 | 0.36 |
| Trimethyethoxysilane (FIG. 48) | 0.00 | 0.0% | 118.25 | — | 0.00% | — | — |
| Acetone in hydrolyzer | 0.00 | 0.0% | 58.08 | — | | | |
| Ethanol in hydrolyzer | 265.00 | 36.3% | 46.07 | 5.75 | | | |
| Water in hydrolyzer | 83.00 | 11.4% | 18.00 | 4.61 | | | |
| HCl | 0.36 | 0.0% | 36.00 | 0.01 | | | |
| Sodium bicarbonate | 0.84 | 0.1% | 84.00 | 0.01 | | | |

Example 21

Using the reaction type process a precursor formulation was made using the following formulation. The temperature of the reaction was maintained at 610° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 142.00 | 21.1% | 240.37 | 0.59 | 37.84% | 0.59 | 1.77 |
| Phenylmethyldiethoxysilane (FIG. 38) | 135.00 | 20.1% | 210.35 | 0.64 | 41.11% | 0.64 | 1.28 |
| Dimethyldiethoxysilane (FIG. 42) | 0.00 | 0.0% | 148.28 | — | 0.00% | — | — |
| Methyldiethoxysilane (FIG. 39) | 24.00 | 3.6% | 134.25 | 0.18 | 11.45% | 0.18 | 0.36 |
| Vinylmethyldiethoxysilane (FIG. 40) | 24.00 | 3.6% | 160.29 | 0.15 | 9.59% | 0.15 | 0.30 |
| Trimethyethoxysilane (FIG. 48) | 0.00 | 0.0% | 118.25 | — | 0.00% | — | — |
| Acetone in hydrolyzer | 278.00 | 41.3% | 58.08 | 4.79 | | | |
| Ethanol in hydrolyzer | 0.00 | 0.0% | 46.07 | — | | | |
| Water in hydrolyzer | 69.00 | 10.2% | 18.00 | 3.83 | | | |

| Reactant or Solvent | Mass | % of Total | MW | Moles of Reactant/solvent | % of Total Moles of Silane | Moles of Si | Moles of EtOH |
|---|---|---|---|---|---|---|---|
| HCl | 0.36 | 0.1% | 36.00 | 0.01 | | | |
| Sodium bicarbonate | 0.84 | 0.1% | 84.00 | 0.01 | | | |

Example 22

Using the reaction type process a precursor formulation was made using the following formulation. The temperature of the reaction was maintained at 72° C. for 21 hours.

| Reactant or Solvent | Mass | % of Total | MW | Moles of Reactant/solvent | % of Total Moles of Silane | Moles of Si | Moles of EtOH |
|---|---|---|---|---|---|---|---|
| Methyltriethoxysilane (FIG. 37) | 0.00 | 0.0% | 178.30 | — | 0.00% | — | — |
| Phenylmethyldiethoxysilane (FIG. 38) | 0.00 | 0.0% | 210.35 | — | 0.00% | — | — |
| Dimethyldiethoxysilane (FIG. 42) | 56 | 7.2% | 148.28 | 0.38 | 17.71% | 0.38 | 0.76 |
| Methyldiethoxysilane (FIG. 39) | 182 | 23.2% | 134.25 | 1.36 | 63.57% | 1.36 | 2.71 |
| Vinylmethyldiethoxysilane (FIG. 40) | 64 | 8.2% | 160.29 | 0.40 | 18.72% | 0.40 | 0.80 |
| Triethoxysilane (FIG. 44) | 0.00 | 0.0% | 164.27 | — | 0.00% | — | — |
| Hexane in hydrolyzer | 0.00 | 0.0% | 86.18 | — | | | |
| Acetone in hydrolyzer | 0.00 | 0.0% | 58.08 | — | | | |
| Ethanol in hydrolyzer | 400.00 | 51.1% | 46.07 | 8.68 | | | |
| Water in hydrolyzer | 80.00 | 10.2% | 18.00 | 4.44 | | | |
| HCl | 0.36 | 0.0% | 36.00 | 0.01 | | | |
| Sodium bicarbonate | 0.84 | 0.1% | 84.00 | 0.01 | | | |

Example 23

Using the reaction type process a precursor formulation was made using the following formulation. The temperature of the reaction was maintained at 6100 for 21 hours.

| Reactant or Solvent | Mass | % of Total | MW | Moles of Reactant/solvent | % of Total Moles of Silane | Moles of Si | Moles of EtOH |
|---|---|---|---|---|---|---|---|
| Phenyltriethoxysilane (FIG. 45) | 198.00 | 26.6% | 240.37 | 0.82 | 52.84% | 0.82 | 2.47 |
| Phenylmethyldiethoxysilane (FIG. 38) | 0.00 | 0.0% | 210.35 | — | 0.00% | — | — |
| Dimethyldiethoxysilane (FIG. 42) | 109.00 | 14.6% | 148.28 | 0.74 | 47.16% | 0.74 | 1.47 |
| Methyldiethoxysilane (FIG. 39) | 0.00 | 0.0% | 134.25 | — | 0.00% | — | — |
| Vinylmethyldiethoxysilane (FIG. 40) | 0.00 | 0.0% | 160.29 | — | 0.00% | — | — |
| Trimethyethoxysilane (FIG. 48) | 0.00 | 0.0% | 118.25 | — | 0.00% | — | — |
| Acetone in hydrolyzer | 365.00 | 49.0% | 58.08 | 6.28 | | | |
| Ethanol in hydrolyzer | 0.00 | 0.0% | 46.07 | — | | | |
| Water in hydrolyzer | 72.00 | 9.7% | 18.00 | 4.00 | | | |
| HCl | 0.36 | 0.0% | 36.00 | 0.01 | | | |
| Sodium bicarbonate | 0.84 | 0.1% | 84.00 | 0.01 | | | |

Example 24

Using the reaction type process a precursor formulation was made using the following formulation. The temperature of the reaction was maintained at 72° C. for 21 hours.

| Reactant or Solvent | Mass | % of Total | MW | Moles of Reactant/solvent | % of Total Moles of Silane | Moles of Si | Moles of EtOH |
|---|---|---|---|---|---|---|---|
| Phenyltriethoxysilane (FIG. 45) | 180.00 | 22.7% | 240.37 | 0.75 | 44.10% | 0.75 | 2.25 |
| Phenylmethyldiethoxysilane (FIG. 38) | 50.00 | 6.3% | 210.35 | 0.24 | 14.00% | 0.24 | 0.48 |

-continued

| Reactant or Solvent | Mass | % of Total | MW | Moles of Reactant/ solvent | % of Total Moles of Silane | Moles of Si | Moles of EtOH |
|---|---|---|---|---|---|---|---|
| Dimethyldiethoxysilane (FIG. 42) | 40.00 | 5.0% | 148.28 | 0.27 | 15.89% | 0.27 | 0.54 |
| Methyldiethoxysilane (FIG. 39) | 30.00 | 3.8% | 134.25 | 0.22 | 13.16% | 0.22 | 0.45 |
| Vinylmethyldiethoxysilane (FIG. 40) | 35.00 | 4.4% | 160.29 | 0.22 | 12.86% | 0.22 | 0.44 |
| Trimethyethoxysilane (FIG. 48) | 0.00 | 0.0% | 118.25 | — | 0.00% | — | — |
| Hexane in hydrolyzer | 0.00 | 0.0% | 86.18 | — | | | |
| Acetone in hydrolyzer | 0.00 | 0.0% | 58.08 | — | | | |
| Ethanol in hydrolyzer | 380.00 | 48.0% | 46.07 | 8.25 | | | |
| Water in hydrolyzer | 76.00 | 9.6% | 18.00 | 4.22 | | | |
| HCl | 0.36 | 0.0% | 36.00 | 0.01 | | | |
| Sodium bicarbonate | 0.84 | 0.1% | 84.00 | 0.01 | | | |

Example 25

Using the reaction type process a precursor formulation was made using the following formulation. The temperature of the reaction was maintained at 72° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 190.00 | 23.8% | 240.37 | 0.79 | 47.22% | 0.79 | 2.37 |
| Phenylmethyldiethoxysilane (FIG. 38) | 75.00 | 9.4% | 210.35 | 0.36 | 21.30% | 0.36 | 0.71 |
| Dimethyldiethoxysilane (FIG. 42) | 45.00 | 5.6% | 148.28 | 0.30 | 18.13% | 0.30 | 0.61 |
| Methyldiethoxysilane (FIG. 39) | 30.00 | 3.8% | 134.25 | 0.22 | 13.35% | 0.22 | 0.45 |
| Vinylmethyldiethoxysilane (FIG. 40) | 0.00 | 0.0% | 160.29 | — | 0.00% | — | — |
| Trimethyethoxysilane (FIG. 48) | 0.00 | 0.0% | 118.25 | — | 0.00% | — | — |
| Hexane in hydrolyzer | 0.00 | 0.0% | 86.18 | — | | | |
| Acetone in hydrolyzer | 0.00 | 0.0% | 58.08 | — | | | |
| Ethanol in hydrolyzer | 380.00 | 47.7% | 46.07 | 8.25 | | | |
| Water in hydrolyzer | 76.00 | 9.5% | 18.00 | 4.22 | | | |
| HCl | 0.36 | 0.0% | 36.00 | 0.01 | | | |
| Sodium bicarbonate | 0.84 | 0.1% | 84.00 | 0.01 | | | |

Example 26

Using the reaction type process a precursor formulation was made using the following formulation. The temperature of the reaction was maintained at 610° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 0.00 | 0.0% | 240.37 | — | 0.00% | — | — |
| Phenylmethyldiethoxysilane (FIG. 38) | 0.00 | 0.0% | 210.35 | — | 0.00% | — | — |
| Dimethyldiethoxysilane (FIG. 42) | 235.00 | 31.5% | 148.28 | 1.58 | 83.32% | 1.58 | 3.17 |
| Methyldiethoxysilane (FIG. 39) | 0.00 | 0.0% | 134.25 | — | 0.00% | — | — |
| Vinylmethyldiethoxysilane (FIG. 40) | 0.00 | 0.0% | 160.29 | — | 0.00% | — | — |
| TES 40 (FIG. 35) | 66.00 | 8.8% | 208.00 | 0.32 | 16.68% | 0.32 | 1.27 |
| Hexane in hydrolyzer | 0.00 | 0.0% | 86.18 | — | | | |
| Acetone in hydrolyzer | 370.00 | 49.6% | 58.08 | 6.37 | | | |
| Ethanol in hydrolyzer | 0.00 | 0.0% | 46.07 | — | | | |
| Water in hydrolyzer | 74.00 | 9.9% | 18.00 | 4.11 | | | |
| HCl | 0.36 | 0.0% | 36.00 | 0.01 | | | |
| Sodium bicarbonate | 0.84 | 0.1% | 84.00 | 0.01 | | | |

Example 27

Using the reaction type process a precursor formulation was made using the following formulation. The temperature of the reaction was maintained at 61° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 0.00 | 0.0% | 240.37 | — | 0.00% | — | — |
| Phenylmethyldiethoxysilane (FIG. 38) | 0.00 | 0.0% | 210.35 | — | 0.00% | — | — |
| Dimethyldiethoxysilane (FIG. 42) | 95.00 | 11.8% | 148.28 | 0.64 | 34.95% | 0.64 | 1.28 |
| Methyldiethoxysilane (FIG. 39) | 60.80 | 7.6% | 134.25 | 0.45 | 24.71% | 0.45 | 0.91 |
| Vinylmethyldiethoxysilane (FIG. 40) | 73.15 | 9.1% | 160.29 | 0.46 | 24.90% | 0.46 | 0.91 |
| TES 40 (FIG. 35) | 58.90 | 7.3% | 208.00 | 0.28 | 15.45% | 0.28 | 1.13 |
| Hexane in hydrolyzer | 0.00 | 0.0% | 86.18 | — | | | |
| Acetone in hydrolyzer | 430.00 | 53.4% | 58.08 | 7.40 | | | |
| Ethanol in hydrolyzer | 0.00 | 0.0% | 46.07 | — | | | |
| Water in hydrolyzer | 86.00 | 10.7% | 18.00 | 4.78 | | | |
| HCl | 0.36 | 0.0% | 36.00 | 0.01 | | | |
| Sodium bicarbonate | 0.84 | 0.1% | 84.00 | 0.01 | | | |

Example 28

Using the reaction type process a precursor formulation was made using the following formulation. The temperature of the reaction was maintained at 61° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 0.00 | 0.0% | 240.37 | — | 0.00% | — | — |
| Phenylmethyldiethoxysilane (FIG. 38) | 0.00 | 0.0% | 210.35 | — | 0.00% | — | — |
| Dimethyldiethoxysilane (FIG. 42) | 140.00 | 17.9% | 148.28 | 0.94 | 58.38% | 0.94 | 1.89 |
| Methyldiethoxysilane (FIG. 39) | 0.00 | 0.0% | 134.25 | — | 0.00% | — | — |
| Vinylmethyldiethoxysilane (FIG. 40) | 0.00 | 0.0% | 160.29 | — | 0.00% | — | — |
| TES 40 (F(G. 35) | 140.00 | 17.9% | 208.00 | 0.67 | 41.62% | 0.67 | 2.69 |
| Hexane in hydrolyzer | 0.00 | 0.0% | 86.18 | — | | | |
| Acetone in hydrolyzer | 420.00 | 53.6% | 58.08 | 7.23 | | | |
| Ethanol in hydrolyzer | 0.00 | 0.0% | 46.07 | — | | | |
| Water in hydrolyzer | 84.00 | 10.7% | 18.00 | 4.67 | | | |

Example 29

Using the reaction type process a precursor formulation was made using the following formulation. The temperature of the reaction was maintained at 61° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 0.00 | 0.0% | 240.37 | — | 0.00% | — | — |
| Phenylmethyldiethoxysilane (FIG. 38) | 0.00 | 0.0% | 210.35 | — | 0.00% | — | — |
| Dimethyldiethoxysilane (FIG. 42) | 20.00 | 2.6% | 148.28 | 0.13 | 10.67% | 0.13 | 0.27 |
| Methyldiethoxysilane (FIG. 39) | 0.00 | 0.0% | 134.25 | — | 0.00% | — | — |
| Vinylmethyldiethoxysilane (FIG. 40) | 0.00 | 0.0% | 160.29 | — | 0.00% | — | — |
| TES 40 (FIG. 35) | 235.00 | 30.0% | 208.00 | 1.13 | 89.33% | 1.13 | 4.52 |
| Hexane in hydrolyzer | 0.00 | 0.0% | 86.18 | — | | | |
| Acetone in hydrolyzer | 440.00 | 56.2% | 58.08 | 7.58 | | | |
| Ethanol in hydrolyzer | 0.00 | 0.0% | 46.07 | — | | | |
| Water in hydrolyzer | 88.00 | 11.2% | 18.00 | 4.89 | | | |

Example 30

A polysilocarb formulation is combined with a reinforcing material to form a preform, which is partially or completely cured to form a reinforced composite material in the shape of a component part. The component part is cured, and preferably hard cured. The hard cured component part is pyrolized to form a polysicocarb derived reinforced composite component part, which is taken through from two to five reinfiltration, cure and pyrolysis cycles. The end reinforced component part is ready for further processing, e.g., machining to tolerances, assembly steps, integration steps, or use. The polysicocarb derived ceramic component part may find applications, or be designed for use in, or as, among other things: friction members such as breaks, break pads, break discs, and clutches; building materials, such as beams, girders, columns, I-beams, channels, studs (e.g., a 2×4 replacement), wall panels, roofing, decking, and flooring; aerospace members, such as, high temperature engine components, air frame members, skin or outer coverings, cockpit components, seating frames, passenger compartment components, carpet, and fabric; equipment (including automotive) components, such as, tubes, rods, custom frame members, hollow rectangular tubes, hollow octagonal tubes, multisided rods, panels, firewalls, liners, seating components, dash components, multisided hollow tubes, circular tubes, channels, I-beams, bands, and joints; and consumer goods, including consumer electronics, appliances, furniture and home goods. The use of the polysilocarb derived ceramic composite component parts can provide several features, including among other things, high temperature resistance, corrosion resistance, UV resistance, lightweight, low cost (significantly lower, by as much as several orders of magnitude over silicon carbide and conventional polymer derived ceramics), increased strength to weight rations (e.g., stronger and lighter, same strength and lighter, stronger and same weight), and fire resistance.

Example 31

The polysilocarb derived ceramic composite component parts of Example 30 where the polysilocarb formulation includes a vinyl terminated siloxane.

Example 32

The polysilocarb derived ceramic composition component parts of Example 30 where the polysilocarb formulation is 60% MHF, 20% TV, 5% Vt and 10% MVF (a reacted formulation of all vinylmethyldiethoxysilane, e.g., the formulations of Examples 66-68)

Example 33

The polysilocarb derived ceramic composite component parts of Example 30 where the polysilocarb formulation includes about 10% of the vinyl terminated siloxane.

Example 34

A polysilocarb formulation is combined with a reinforcing material to form a precursor, which is partially or completely cured to form a reinforced composite material in the shape of a component part. The component part is cured, and preferably end cured. The end component part is ready for further processing, e.g., machining to tolerances, assembly steps or use. The polysicocarb derived plastic component part may find applications, or be designed for use in, or as, among other things: building materials, such as beams, girders, columns, I-beams, channels, a 2×4 replacement, wall panels, decking, and flooring; aerospace members, such as, cockpit components, seating components, passenger compartment components; equipment components, such as, tubes, rods, custom frame members, hollow rectangular tubes, hollow octagonal tubes, multisided rods, multisided hollow tubes, circular tubes, channels, I-beams, bands, joints. The use of the polysilocarb derived reinforced composite component parts can provide several features, including among other things, higher temperature resistance (including the ability to retain, or substantially maintain structural integrity during exposure to higher temperatures), include increased strength to weight rations (e.g., stronger and lighter, same strength and lighter, stronger and same weight), light weight, low cost, UV resistance, corrosion resistance, fire resistance, and fire retardation.

Example 35

The polysilocarb derived ceramic composite component parts of Example 30 where the polysilocarb formulation includes a vinyl terminated siloxane.

Example 36

The polysilocarb derived ceramic composition component parts of Example 30 where the polysilocarb formulation is 60% MHF, 20% TV, 5% Vt and 10% MVF (a reacted formulation of all vinylmethyldiethoxysilane, e.g., the formulations of Examples 66-68).

Example 37

The polysilocarb derived ceramic composite component parts of Example 30 where the polysilocarb formulation includes about 10% of the vinyl terminated siloxane.

Example 38

A polysilocarb formulation is combined with a reinforcing material to form a precursor to a reinforced composite, which is cured to form a reinforced composite material in the shape of a component part. The component part is cured, and preferably hard cured. The hard cured component part is pyrolized to form a polysicocarb derived composite component part, which is then infiltrated with a polysilocarb formulation, which is then cured. This material can be referred to as a polysilocarb plastic-ceramic, or plastic-ceramic, reinforced structure is ready for further processing, assembly steps or use.

Example 39

The polysilocarb derived ceramic composition component part, of Examples 30-38 is a grinding or cutting member having cutting material distributed throughout its structure. Preferable the cutting member is a cutting wheel having a cutting or abrasive material, e.g., polycrystalline diamond compact (PDC), Aluminum oxide, or diamond, that is evenly distributed through out the cutting wheel. In this manner as the wheel is worn, the cutting material will continue to be exposed on the surface of the well, and preferably be in an amount that changes very little, if at all, as the wheel is used and worn.

Example 40

A polysilocarb formulation is cured to into the volumetric shape of a bead. The end cured polysilocarb derived beads are, for example, added to paints, glues, plastics, and building materials, such as dry wall, sheet rock, gypsum board, MDF board, plywood, plastics and particleboard. The end cured polysilocarb derived beads, as additives, can provide, among other things, binding (e.g., serve as a binder), water resistivity, fire resistance, fire retardation, fire protection and strength; as well as, abrasion resistance, wear resistance, corrosion resistance and UV resistance, if located at or near the surface of the shape.

In addition to a bead the polysilocarb additives can be in the form of a fine powder, fines, a power or other dispersible forms. The dispersible form can be obtained by grinding or crushing larger cured structures. They also may be obtained through the curing process if done under conditions that cause the structure to fracture, crack or break during curing. These dispersible forms may also be obtained by other processing techniques, for example, spray curing or drying.

Example 41

A polysilocarb formulation is cured to into the volumetric shape of a bead. The beads are then pyrolized to for a polysilocarb derived ceramic bead. The polysilocarb derived ceramic beads are added, for example, to paints, glues, plastics, and building materials, such as dry wall, sheet rock, gypsum board, MDF board, plywood, plastics and particleboard. The ceramic polysilocarb beads, as additives, can provide, among other things, fire resistance, fire retardation, fire protection and strength.

In addition to a bead the polysilocarb additives can be in the form of a fine power, fines, a power or other dispersible forms. The dispersible form can be obtained by grinding or crushing larger cured or pyrolized structures. They also may be obtained through the curing or pyrolysis process if done under conditions that cause the structure to fracture, crack or break during curing or pyrolysis.

Example 42

A polysilocarb formulation is applied to structural components (e.g., beams, girders, columns) of a high rise building. The viscosity of the formulation is such that the liquid formulation stays adhered (e.g., does not significantly drip or run) to the structural building components until the curing process is complete. The formulation is further designed to cure, preferably to a hard cure, under ambient conditions in less than a two-day period. (If quicker curing times are required, or if higher temperatures are desired to assure a hard cure than a heat source can be used, the formulation can be adjusted and both.)

The coating provides protection from fire to the structural building components, such that the polysilocarb coated structural component meets or exceeds the requirements of ASTM E-119, the entire disclosure of which is incorporated herein by reference. These coatings are also UV stable, corrosion resistance and are water repellent.

Thus these coatings can be applied to, or utilized with, for example, assemblies of masonry units and composite assemblies of structural materials for buildings, including bearing and other walls and partitions, columns, girders, beams, slabs, and composite slab and beam assemblies for floors and roofs, as well as other assemblies and structural units that constitute permanent integral parts of a finished building. Thus, these coatings can impart or provide Standard Fire Test performance exposures of at least about ½-h, about 2-h, about 4-h and about 6-h or more.

This polysilocarb protective coating is non-halogenated, e.g., it does not contain any halogens. Thus, the protective coating can be substantially free from halogens, i.e., the amount of halogens in any off gassing is so low as to render the level acceptable or permissible for human exposure; can be essentially free from halogens, i.e., the amount of halogens is so low as to render their presence in any off gassing undetectable by normal gas sensing devices used by those of skill in the art to test for the presence of halogens; and, can be free from halogens, i.e., the off gases contain no detectable or measurable presence of halogens. This polysilocarb protective coating is also non-toxic and will not produce toxic or dangerous gasses during exposure to fire or high temperatures. Thus, it is a non-toxic off gassing coating. Additionally, it will not produce any harmful or toxic degradation products. Essentially, upon exposure to flame, the polysilocarb coating goes through a pyrolysis reaction turning the coating into a ceramic. The polysilocarb protective coating is further an active fire retardant or active fire suppressant. By active fire retardant it is meant that when exposed to flame the coating undergoes reactions that remove oxygen, heat, and both, from the environment.

In this manner the polysilocarb coating preferably is capable of providing flame protection to the substrate through, for example, one, two or all of the following flame retardation mechanisms: an endothermic reaction; thermal shielding; and quenching (e.g., removal of oxygen as a combustion source).

Additionally, it is preferred that the coating be hard cured to optimize the active fire retardation mechanisms; and also reduce the creation of any hydrogen off gassing. (These general mechanisms, and benefits are applicable to the embodiments of other Examples in this specification, as well as, to other embodiments and other formulations and components in addition to the embodiments of the present Examples)

The polysilocarb coating, or additive, can also impart, or enhance, the thermal barrier properties of a material.

Such coated steel or concrete structures, for example, may have the fire resistance properties set out in Table I, or they more preferably may exceed those properties

TABLE I

| Time = t | Furnace-Flame Temperature (° F.) on exposed surface at time t | Temperature (° F.) on unexposed surface at time t |
| --- | --- | --- |
| 0.5 hr | 1,550 | <1,000 |
| 1 hr | 1,700 | <1,000 |
| 2 hr | 1,850 | <1,000 |
| 4 hr | 2,000 | <1,000 |
| 8 hr | 2,300 | <1,000 |

Example 43

The building structural component fire resistant coating of Example 42 is made from a polysilocarb formulation having 41% MHF and 59% TV.

Example 44

The building structural component fire resistant coating of Example 42 is made from a polysilocarb formulation having 41% MHF and 59% MVF.

Example 45

The building structural component fire resistant coating of Example 40 is made from a polysilocarb formulation having from about 40% MHF to about 55% MHF and from about 60% MVF to about 55% MVF.

Example 46

The building structural component fire resistant coating of Examples 42-45 is applied by flame or thermal spraying the polysilocarb formulation on the building structural component. In this process, preferably the polysilocarb formulation is cured and in the form of a fine powered, which is then thermal sprayed onto the building structural member.

Example 47

The polysilocarb formulations of Examples 42-45 to which ceramic beads or fines, and preferably polysilocarb ceramic beads or fines, are added.

Example 48

In this example a conventional flame retardant or flame resistant wrap or outer cover is impregnated with a polysilocarb formulation. The impregnated material is then cured, and preferably hard cured, and affixed to the building structural members, as it would generally be done. Additionally, to add additional fire resistivity to an existing structure, existing (e.g., presently installed in a building) fire protective wraps or covers can be impregnated with a polysilocarb formulation and cured.

Example 49

A cured polysilocarb formulation is used as a fire retardant additive for a plastic article. The polysilocarb formulation may be hard cured, which is preferable, provided that the hard cure material performs adequately in the plastic molding, extruding or forming process to make the plastic article.

The plastic may be, for example, thermal setting, thermoplastic, polyolefins, polyamide, engineering plastics, textile adhesives coatings (TAC), plastic foams, styrenic alloys, acrylonitrile butadiene styrene (ABS), polyurethanes, polystyrenes, acrylics, polycarbonates (PC), epoxies, polyesters, nylon, polyethylene, high density polyethylene (HDPE), very low density polyethylene (VLDPE), low density polyethylene (LDPE), polypropylene (PP), polyvinyl chloride (PVC), polyethylene terephthalate (PET), polybutylene terephthalate (PBT), poly ether ethyl ketone (PEEK), polyether sulfone (PES), bis maleimide, and viscose (cellulose acetate).

The polysilocarb additive is preferable in the form of a powder, beads or pellets that are selected to readily match with the plastic starting material (e.g., resin), so that the polysilocarb additive can be processed with the plastic, preferably with the existing manufacturing equipment, and formed into the desired plastic article (e.g., part or component), which could include, for example, automotive components, aircraft components, marine components, components of consumer goods, e.g., lawn mowers, electronics, appliances, furniture, home goods (e.g., window treatments, and carpeting).

The plastic articles with the polysilocarb fire retardant additive most preferably will have the ability to pass V0 testing by UL-94 (burning stops within 10 seconds on a vertical specimen; drips of particles allowed as long as they are not inflamed.) The entirety of UL-94 testing procedures and standards is incorporated herein by reference.

These articles, depending upon their application and use requirements may have the ability to pass HB slow burning on a horizontal specimen; burning rate <76 mm/min for thickness <3 mm and burning stops before 100 mm), V2 (burning stops within 30 seconds on a vertical specimen; drips of flaming particles are allowed), V1 (burning stops within 30 seconds on a vertical specimen; drips of particles allowed as long as they are not inflamed), 5VB (burning stops within 60 seconds on a vertical specimen; no drips allowed; plaque specimens may develop a hole), 5VA (burning stops within 60 seconds on a vertical specimen; no drips allowed; plaque specimens may not develop a hole), testing by UL-94, among other testing regimes.

For foams these polysilocarb added plastic articles may have the ability to pass HF-1 (burning stops within 2 seconds; afterglow less than 30 s; no burning drips allowed), burning stops within 3 seconds; afterglow less than 30 s; burning drips allowed, testing by UL-94, among other testing regimes.

The polysilocarb fire retardant additive may be used to replace existing fire retardants such as ATH (aluminum trihydrate) based, Bromine based, Phosphorous based, Chlorine based, Antimony based Melamine and others know to those of skill in the art. These existing fire retardants have many disadvantages, include the presence of halogens, the creation of harmful or hazardous degradation products, hazardous starting materials, creation of hazardous wastes during manufacturing, high cost, among others. The polysilocarb fire retardants avoid, e.g., they do not have, any of these disadvantages.

In particular, and preferably, the polysilocarb fire retardant additive is non-halogenated, e.g., it does not contain any halogens. Thus, it can be substantially free from halogens, i.e., the amount of halogens in any off gassing is so low as to render the level acceptable or permissible for human exposure; can be essentially free from halogens, i.e., the amount of halogens is so low as to render their presence in any off gassing undetectable by normal gas sensing devices used by those of skill in the art to test for the presence of halogens; and, can be free from halogens, i.e., the off gases contain no detectable or measurable presence of halogens. This polysilocarb fire retardant additive is also non-toxic and will not produce toxic or dangerous gasses during exposure to fire or high temperatures. Thus, it is a non-toxic off gassing additive. Additionally, and still more preferably, to the extent any degradation products are produced by the polysilocarb additive, they are non-toxic.

Example 50

The polysilocarb formulation of Example 49 having 70% MHF, 20% TV, and 10% VT. The polysilocarb is hard cured, ground, and sieved to a particle size of less than 10 μm and a specific gravity of less than about 1.4. The plastic is loaded with less than about 20% of the hard cured polysilocarb fire retardant. The plastic may be PP, PET-PBT alloys, and PC-ABS alloys.

Example 51

The polysilocarb formulation of Example 49 having 95% MHF and 5% TV.

Example 52

The polysilocarb formulation of Example 49 having 41% MHF and 59% TV.

Example 53

The polysilocarb hard cured additive of Example 49 has a particle size, less than about 75 microns, greater than about 0.05 microns, from about 0.1 to about 50 microns, preferably from about 3 to about 10 microns, and a specific gravity of from about 0.5 to about 2.0, preferably about 1 to about 1.5. The plastic article has from about 0.05%% polysilocarb fire retardant to about 100% fire retardant, preferably about 30% to about 50

Example 54

The polysilocarb fire retardant additive of Examples 49-53 also contain a ceramic, and preferably a ceramic polysilocarb fire retardant additive. The ceramic additive may be from about 1% to about 100% of the total additive.

Example 55

The polysilocarb fire retardant additive of Examples 49-54 is combined with a conventional fire retardant and used in a plastic article. The polysilocarb fire retardant additive can be from about 1% to about 99% of the total fire retardant additives used.

Example 56

A polysilocarb formulation is applied in liquid form to a substrate to form a coating. The coating is then cured increasing the ability of the substrate to resisting burning when subject to a fire. The formulation may be catalyzed or uncatalyzed. The coating may be one, two, three or more coats (e.g., layers) of the polysilocarb formulation. Preferably the coating cures, to a hard cure, in less than 2 days under ambient conditions. However, external heat source can be used to cure the coating. The substrates may be existing articles such as for example, the interior walls of a house or building, the wood frame of a building prior to installation of the walls, floors, roofs, decks, the exterior of a structure (e.g., house, office or barn), the ground or brush (e.g., to form a fire break), and they may be building supply materials such as dry wall, plywood and 2×4 s that are coated before being used in a building.

Preferably the coating provides the ability for the wood substrate to meet or exceed Class A materials under ASTM E84.

Example 57

The fire resistant coating of Example 56 is made from a polysilocarb formulation having 41% MHF and 59% TV.

Example 57

The fire resistant coating of Example 56 is made from a polysilocarb formulation having 41% MHF and 59% MVF Example 58

The building structural component fire resistant coating of Example 56 is made from a polysilocarb formulation having from about 40% MHF to about 55% MHF and from about 60% MVF to about 55% MVF.

Example 59

Plastic components are made from cured polysilocarb formulations. These structure components have the ability to maintain their structural integrity while burning. As the components burn they will to a greater or lessor extent pyrolyze into a ceramic, and thus maintain their strength and structural integrity, and more preferably potentially increase those features. These components may, for example, be used as overhead luggage binds, or interior components of an aircraft. They may be other structural plastic members.

Additionally, the plastic component does not have to be made up completely of the polysilocarb formulation. Rather, the polysilocarb formulation can be distributed within in a preselected pattern, on, or around the component, so that the increase in strength can be obtained as the polysilocarb is turned to a ceramic upon exposure to a fire.

Example 60

A polysilocarb formulation is formed into a fiber that is cured and then pyrolyzed. If needed or desirable, the ceramic polysilocarb fiber may be subject to additional reinfiltration, curing and pyrolysis steps (one to five or more) to provide a ceramic, or they may be subjected to additional reinfiltration and curing steps (one to three or more) to provide a plastic-ceramic. Preferably, the polysilocarb formulations are made using phenyltriethoxysilane (FIG. 45), phenylmethyldiethoxysilane (FIG. 38), methyldiethoxysilane (FIG. 39) and Vinylmethyldiethoxysilane (FIG. 40), as well as, dimethyldiethoxysilane and methytriethoxysilane. The mass percentages of the phenyltriethoxysilane and phenylmethyldiethoxysilane (or dimethyldiethoxysilane and methytriethoxysilane) would likely range from 10% to 80% with the preferred range around 40-60% (of either, or total of both).

Fibers may be made from the polysilocarb formulations of Examples 61 and 62.

For the formation of flame retardant fabrics the polysilocarb fiber may be cured, preferably hard cured, but not necessarily pyrolyzed.

Example 61

Using the reaction type process a precursor formulation was made using the following formulation. The temperature of the reaction was maintained at 61° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 145.00 | 18.5% | 240.37 | 0.60 | 34.58% | 0.60 | 1.81 |
| Phenylmethyldiethoxysilane (FIG. 38) | 0.00 | 0.0% | 210.35 | — | 0.00% | — | — |
| Dimethyldiethoxysilane (FIG. 42) | 0.00 | 0.0% | 148.28 | 0.57 | 32.88% | 0.57 | 1.55 |
| Methyldiethoxysilane (FIG. 39) | 77.00 | 9.8% | 134.25 | — | 0.00% | — | — |
| Vinylmethyldiethoxysilane (FIG. 40) | 91.00 | 11.6% | 160.29 | 0.57 | 32.54% | 0.57 | 1.14 |
| Trimethyethoxysilane (FIG. 48) | 0.00 | 0.0% | 118.25 | — | 0.00% | — | — |
| Acetone in hydrolyzer | 395.00 | 50.3% | 58.08 | 6.80 | | | |
| Ethanol in hydrolyzer | 0.00 | 0.0% | 46.07 | — | | | |
| Water in hydrolyzer | 76.00 | 9.7% | 18.00 | 4.22 | | | |
| HCl | 0.36 | 0.0% | 36.00 | 0.01 | | | |
| Sodium bicarbonate | 0.84 | 0.1% | 84.00 | 0.01 | | | |

Example 62

Using the reaction type process a precursor formulation was made using the following formulation. The temperature of the reaction was maintained at 61° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 0.00 | 0.00% | 240.37 | — | 0.0% | — | — |
| Phenylmethyldiethoxysilane (FIG. 38) | 145.00 | 18.4% | 210.35 | 0.69 | 34.47% | 0.69 | 1.38 |
| Dimethyldiethoxysilane (FIG. 42) | 0.00 | 0.00% | 148.28 | — | 0.00% | — | — |
| Methyldiethoxysilane (FIG. 39) | 88.00 | 11.2% | 134.25 | 0.66 | 32.78% | 0.66 | 1.31 |
| Vinylmethyldiethoxysilane (FIG. 40) | 105.00 | 13.3% | 160.29 | 0.66 | 32.76% | 0.66 | 1.31 |
| Trimethyethoxysilane (FIG. 48) | 0.00 | 0.0% | 118.25 | — | 0.00% | — | — |
| Acetone in hydrolyzer | 375.00 | 47.5% | 58.08 | 6.46 | | | |
| Ethanol in hydrolyzer | 0.00 | 0.0% | 46.07 | — | | | |
| Water in hydrolyzer | 75.00 | 9.5% | 18.00 | 4.17 | | | |
| HCl | 0.36 | 0.0% | 36.00 | 0.01 | | | |
| Sodium bicarbonate | 0.84 | 0.1% | 84.00 | 0.01 | | | |

Example 63

The polysilocarb fiber of Examples 60-62 has a colorant added to the polysilocarb formulation. In this manner a color polysilocarb ceramic fiber is obtained. The coloration preferably extends throughout the fiber and is more preferably evenly distributed throughout the entirety of the volume of the fiber, e.g., the whole fiber, not just the surface is colored. The colors may be essentially any color, e.g., red, blue, green, orange, yellow, purple, etc. The colorant may also be of a non-visible wavelength, but which can be seen by machines, and thus could have application for example in machine vision control systems or processing.

Example 64

The colored polysilocarb fiber of Examples 60-63 has a predetermined and matched color to a composite material. In this manner the colored ceramic polysilocarb fiber is the reinforcement for a composite material. The fiber's color is matched to the composite's color, and in, particular to the final color of the matrix material in the composite. Thus, as the composite wears or ages its color will not change, and the exposure of the reinforcing fibers will go essentially undetected, because they are the same color as the matrix material.

Example 65

Several different colored polysilocarb fibers of Examples 60-63 each have a predetermined and different color. The first and typically the outer most has a color identical to or matched to a composite material. The inner fibers may have different colors to provide a visual indication of wear or aging, e.g., transition to yellow and then red fibers to indicate the end of useful or recommended life of a composite part. Alternatively, different color fibers could be in the outer area of the composite to indicate a new composite and then matched color fibers can be below this outer area, to indicate that use has occurred, e.g., loss of white fibers on outer surface means that the part has been used, or that an initial period, e.g., a break in period for the part, has been completed. In this manner the colored ceramic polysilocarb fiber can be used to both enhance the ascetics of a part, as well as, provide an indication about use of the part. Additionally, in some applications it may be desirable or ascetically pleasing to have the colored fibers as a different color from the matrix material.

Example 66

Using the reaction type process an MVF precursor formulation was made using the following formulation. The temperature of the reaction was maintained at 72° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 0.00 | 0.0% | 240.37 | — | 0.00% | — | — |
| Phenylmethyldiethoxysilane (FIG. 38) | 0.00 | 0.0% | 210.35 | — | 0.00% | — | — |
| Dimethyldiethoxysilane (FIG. 42) | 0.00 | 0.0% | 148.28 | — | 0.00% | — | — |
| Methyldiethoxysilane (FIG. 39) | 0.00 | 0.0% | 134.25 | — | 0.00% | — | — |
| Vinylmethyldiethoxysilane (FIG. 40) | 1584.00 | 41.1% | 160.29 | 9.88 | 100.00% | 9.88 | 19.76 |
| Hexane in hydrolyzer | 0.00 | 0.0% | 86.18 | — | | | |
| Acetone in hydrolyzer | 0.00 | 0.0% | 58.08 | — | | | |
| Ethanol in hydrolyzer | 1875.00 | 49.0% | 46.07 | 40.70 | | | |
| Water in hydrolyzer | 370.00 | 9.7% | 18.00 | 20.56 | | | |
| HCl (pH 2, 36 g/100 g water) | 0.36 | | 36.00 | 0.01 | | | |
| Sodium bicarbonate | 0.84 | | 84.00 | 0.01 | | | |

Example 67

Using the reaction type process an MVF precursor formulation was made using the following formulation. The temperature of the reaction was maintained at 610° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 0.00 | 0.0% | 240.37 | — | 0.00% | — | — |
| Phenylmethyldiethoxysilane (FIG. 38) | 0.00 | 0.0% | 210.35 | — | 0.00% | — | — |
| Dimethyldiethoxysilane (FIG. 42) | 0.00 | 0.0% | 148.28 | — | 0.00% | — | — |
| Methyldiethoxysilane (FIG. 39) | 0.00 | 0.0% | 134.25 | — | 0.00% | — | — |
| Vinylmethyldiethoxysilane (FIG. 40) | 1584.00 | 42.0% | 160.29 | 9.88 | 100.00% | 9.88 | 19.76 |
| Hexane in hydrolyzer | 0.00 | 0.0% | 86.18 | — | | | |
| Acetone in hydrolyzer | 1825.00 | 48.3% | 58.08 | 31.42 | | | |
| Ethanol in hydrolyzer | 0.00 | 0.0% | 46.07 | — | | | |
| Water in hydrolyzer | 365.00 | 9.7% | 18.00 | 20.28 | | | |
| HCl (pH 2, 36 g/100 g water) | 0.36 | | 36.00 | 0.01 | | | |
| Sodium bicarbonate | 0.84 | | 84.00 | 0.01 | | | |

Example 68

Using the reaction type process an MVF precursor formulation was made using the following formulation. The temperature of the reaction was maintained at 610° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 0.00 | 0.0% | 240.37 | — | 0.00% | — | — |
| Phenylmethyldiethoxysilane (FIG. 38) | 0.00 | 0.0% | 210.35 | — | 0.00% | — | — |
| Dimethyldiethoxysilane (FIG. 42) | 0.00 | 0.0% | 148.28 | — | 0.00% | — | — |
| Methyldiethoxysilane (FIG. 39) | 0.00 | 0.0% | 134.25 | — | 0.00% | — | — |
| Vinylmethyldiethoxysilane (FIG. 40) | 33.00 | 41.9% | 160.29 | 2.06 | 100.00% | 2.06 | 4.12 |
| Hexane in hydrolyzer | 0.00 | 0.0% | 86.18 | — | | | |
| Acetone in hydrolyzer | 380.00 | 48.3% | 58.08 | 6.54 | | | |
| Ethanol in hydrolyzer | 0.00 | 0.0% | 46.07 | — | | | |
| Water in hydrolyzer | 76.00 | 9.7% | 18.00 | 4.22 | | | |
| HCl (pH 2, 36 g/100 g water) | 0.36 | | 36.00 | 0.01 | | | |
| Sodium bicarbonate | 0.84 | | 84.00 | 0.01 | | | |

Example 69

Using the reaction type process a precursor formulation was made using the following formulation. The temperature of the reaction was maintained at 72° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Methyltriethoxysilane (FIG. 37) | 0.00 | 0.0% | 178.30 | — | 0.00% | — | — |
| Phenylmethyldiethoxysilane (FIG. 38) | 0.00 | 0.0% | 210.35 | — | 0.00% | — | — |
| Dimethyldiethoxysilane (FIG. 42) | 56 | 7.2% | 148.28 | 0.38 | 17.71% | 0.38 | 0.76 |
| Methyldiethoxysilane (FIG. 39) | 182 | 23.2% | 134.25 | 1.36 | 63.57% | 1.36 | 2.71 |
| Vinylmethyldiethoxysilane (FIG. 40) | 64 | 8.2% | 160.29 | 0.40 | 18.72% | 0.40 | 0.80 |
| Triethoxysilane | 0.00 | 0.0% | 164.27 | — | 0.00% | — | — |
| Hexane in hydrolyzer | 0.00 | 0.0% | 86.18 | — | | | |
| Acetone in hydrolyzer | 0.00 | 0.0% | 58.08 | — | | | |
| Ethanol in hydrolyzer | 400.00 | 51.1% | 46.07 | 8.68 | | | |
| Water in hydrolyzer | 80.00 | 10.2% | 18.00 | 4.44 | | | |
| HCl | 0.36 | 0.0% | 36.00 | 0.01 | | | |
| Sodium bicarbonate | 0.84 | 0.1% | 84.00 | 0.01 | | | |

Example 70

Using the reaction type process a precursor formulation was made using the following formulation. The temperature of the reaction was maintained at 61° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Methyltriethoxysilane (FIG. 37) | 0.00 | 0.0% | 178.30 | — | 0.00% | — | — |
| Phenylmethyldiethoxysilane (FIG. 38) | 0.00 | 0.0% | 210.35 | — | 0.00% | — | — |
| Dimethyldiethoxysilane (FIG. 42) | 56 | 7.2% | 148.28 | 0.38 | 17.71% | 0.38 | 0.76 |
| Methyldiethoxysilane (FIG. 39) | 182 | 23.2% | 134.25 | 1.36 | 63.57% | 1.36 | 2.71 |
| Vinylmethyldiethoxysilane (FIG. 40) | 64 | 8.2% | 160.29 | 0.40 | 18.72% | 0.40 | 0.80 |
| Triethoxysilane | 0.00 | 0.0% | 164.27 | — | 0.00% | — | — |
| Hexane in hydrolyzer | 0.00 | 0.0% | 86.18 | — | | | |
| Acetone in hydrolyzer | 400.00 | 51.1% | 58.08 | 6.89 | | | |
| Ethanol in hydrolyzer | 0.00 | 0.0% | 46.07 | — | | | |
| Water in hydrolyzer | 80.00 | 10.2% | 18.00 | 4.44 | | | |
| HCl | 0.36 | 0.0% | 36.00 | 0.01 | | | |
| Sodium bicarbonate | 0.84 | 0.1% | 84.00 | 0.01 | | | |

Example 71

Proppants for use in hydraulic fracturing are made from the formulations of Examples 22, 60 and 61.

Example 72

A polysilocarb formulation having 80% MHF, 15% TV, and 5% VT is made into proppants for use in hydraulic fracturing.

Example 73

A polysilocarb formulation having 95% MHF and 5% TV is made into proppants for use in hydraulic fracturing.

Example 74

A polysilocarb formulation having 90% MHF, 5% TV, and 5% VT is made into proppants for use in hydraulic fracturing.

Example 75

A blast and impact shield is formed using one of more layers of polysilocarb formulations. Layers of polysilocarb formulations are hard cured on top of a substrate. The layers are reinforced and can be done so with varied weave patterns between the layers. The composite layers structure provides protection against blasts, projectiles and explosions. This shield can weigh less than conventional shields and armor, while providing equal or better protection.

Example 76

A ballistic composite structure was made using 12 Layers of 1200 g/sq. meter fiberglass, 20 layers of unidirectional carbon fiber oriented at 0,45-45,90 in 5 sections to make 20 layers, and 1 layer of 0.032 steel as face sheet. The fiberglass was bonded together using, a polysilocarb batch, and a warm press at 150-160 C for 1-2 hours and a minimum of 500 psi pressure to form a fiberglass plate. The 20 layers of carbon fiber cloth were bonded together under same conditions to form a carbon fiber plate. The fiberglass plate, the carbon fiber plate and the steel sheet were then bonded in one step using a polysilocarb batch as the bonder between the steel and the carbon fiber plate and between the carbon fiber plate and the fiberglass plate. The composite had the steel face sheet bonded to the carbon fiber plate backed up with the thicker fiberglass sheet, with the bullets hitting the steel plate. The polysilocarb batch can be the batches of Exhibits 76A, 76B, 76C and 15.

Monolithic ceramic plates, such as SiC, alumina, boron nitride may used in addition to or instead of the steel plate. Can also use ceramic composites made from our polymer and ceramic or carbon fiber.

Example 76A

Using the reaction type process a polysilocarb precursor formulation was made using the following formulation. The temperature of the reaction was maintained at 72° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 180.00 | 22.7% | 240.37 | 0.75 | 44.10% | 0.75 | 2.25 |
| Phenylmethyldiethoxysilane (FIG. 38) | 50.00 | 6.3% | 210.35 | 0.24 | 14.00% | 0.24 | 0.48 |
| Dimethyldiethoxysilane (FIG. 42) | 40.00 | 5.0% | 148.28 | 0.27 | 15.89% | 0.27 | 0.54 |
| Methyldiethoxysilane (FIG. 39) | 30.00 | 3.8% | 134.25 | 0.22 | 13.16% | 0.22 | 0.45 |
| Vinylmethyldiethoxysilane (FIG. 40) | 35.00 | 4.4% | 160.29 | 0.22 | 12.86% | 0.22 | 0.44 |
| Trimethyethoxysilane (FIG. 48) | 0.00 | 0.0% | 118.25 | | 0.00% | — | — |
| Hexane in hydrolyzer | 0.00 | 0.0% | 86.18 | — | | | |
| Acetone in hydrolyzer | 0.00 | 0.0% | 58.08 | | | | |
| Ethanol in hydrolyzer | 380.00 | 48.0% | 46.07 | 8.25 | | | |
| Water in hydrolyzer | 76.00 | 10.9% | 18.00 | 4.22 | | | |
| HCl (pH 2, 36 g/100 g water) | 0.36 | 0% | 36.00 | 0.01 | | | |
| Sodium bicarbonate | 0.84 | 0.1% | 84.00 | 0.01 | | | |

Example 76B

Using the reaction type process a polysilocarb precursor formulation was made using the following formulation. The temperature of the reaction was maintained at 61° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 180.00 | 22.7% | 240.37 | 0.75 | 44.10% | 0.75 | 2.25 |
| Phenylmethyldiethoxysilane (FIG. 38) | 50.00 | 6.3% | 210.35 | 0.24 | 14.00% | 0.24 | 0.48 |
| Dimethyldiethoxysilane (FIG. 42) | 10.00 | 1.3% | 148.28 | 0.07 | 3.95% | 0.07 | 0.13 |
| Methyldiethoxysilane (FIG. 39) | 45.00 | 5.7% | 134.25 | 0.34 | 19.63% | 0.34 | 0.67 |
| Vinylmethyldiethoxysilane (FIG. 40) | 51.00 | 6.4% | 160.29 | 0.32 | 18.64% | 0.32 | 0.64 |
| Trimethyethoxysilane (FIG. 48) | 0.00 | 0.0% | 118.25 | | 0.00% | — | — |
| Hexane in hydrolyzer | 0.00 | 0.0% | 86.18 | — | | | |
| Acetone in hydrolyzer | 380.00 | 47.9% | 58.08 | 6.54 | | | |
| Ethanol in hydrolyzer | 0.00 | 0.0% | 46.07 | 0.00 | | | |
| Water in hydrolyzer | 76.00 | 9.6% | 18.00 | 4.22 | | | |
| HCl (pH 2, 36 g/100 g water) | 0.36 | 0% | 36.00 | 0.01 | | | |
| Sodium bicarbonate | 0.84 | 0.1% | 84.00 | 0.01 | | | |

Example 76C

Using the reaction type process a polysilocarb precursor formulation was made using the following formulation. The temperature of the reaction was maintained at 61° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 170.00 | 21.4% | 240.37 | 0.71 | 40.76% | 0.71 | 2.12 |
| Phenylmethyldiethoxysilane (FIG. 38) | 3200 | 4.0% | 210.35 | 0.15 | 8.77% | 0.15 | 0.30 |

-continued

| Reactant or Solvent | Mass | % of Total | MW | Moles of Reactant/ solvent | % of Total Moles of Silane | Moles of Si | Moles of EtOH |
|---|---|---|---|---|---|---|---|
| Dimethyldiethoxysilane (FIG. 42) | 9.00 | 1.1% | 148.28 | 0.06 | 3.50% | 0.06 | 0.12 |
| Methyldiethoxysilane (FIG. 39) | 55.00 | 6.9% | 134.25 | 0.41 | 23.61% | 0.41 | 0.82 |
| Vinylmethyldiethoxysilane (FIG. 40) | 65.00 | 8.2% | 160.29 | 0.41 | 23.37% | 0.41 | 0.81 |
| Trimethyethoxysilane (FIG. 48) | 0.00 | 0.0% | 118.25 | | 0.00% | — | — |
| Hexane in hydrolyzer | 0.00 | 0.0% | 86.18 | — | | | |
| Acetone in hydrolyzer | 385.00 | 48.5% | 58.08 | 6.63 | | | |
| Ethanol in hydrolyzer | 0.00 | 0.0% | 46.07 | 0.00 | | | |
| Water in hydrolyzer | 77.00 | 9.7% | 18.00 | 4.28 | | | |
| HCl (pH 2, 36 g/100 g water) | 0.36 | 0% | 36.00 | 0.01 | | | |
| Sodium bicarbonate | 0.84 | 0.1% | 84.00 | 0.01 | | | |

Example 76D

The ballistic composite of Example 76 was withstood shots from a 22 Mag, a 45, a 22 rifle, a 280, a 9 mm, a 22 piston, and 223.

Example 77

A polysilocarb formulation is pyrolized in the form of a volumetric structure. The ceramic polysilocarb derived volumetric structure exhibits reflective and refractive optical properties, such as opalescence, shine, twinkle, and sparkle. These optical properties are present when the structure is black in color, (e.g., no colorant has been added to the formulation); or if the structure is colored (e.g., any color other than black, e.g., white, yellow, red, etc.).

Example 78

The volumetric structure of Example 77 is a work surface, such as a table top, a bench top, an insert, or a kitchen counter top, to name a few.

Example 79

The volumetric structure of Example 78 has other colorings or additive to provide simulated granite like appearance.

Example 80

The volumetric structures of Example 77 are small beads that are black and exhibit a twinkle, opalescence or shin. These beads are incorporated into a paint formulation. The patent formulation is for example applied to automobiles or appliances. It provides a flat or mat finish, which is for example popular on newer BMWs and Mercedes, but adds to that mat finish an inner sparkle or luster. Thus, the polysiloxane based paint formulation provides a sparkle mat finish to an automobile, appliance or other article.

Example 81

Pyrolized polysilocarb beads having a size of from about 100 to about 1,000 microns are added to a paint formulation at a loading of from about 1% to about 40%.

Example 82

The paint of Example 81 in which the paint formulation, is an automotive paint, and is colored blue and the beads are the same blue color as the paint, and have size of 350 microns (+/−5%) and a loading of about 25%.

Example 83

The paint of Example 81 in which the beads are not colored, i.e., they are black, and have a size ranging from about 300-500 microns, and the paint is a black, although not necessarily the same black as the beads.

Example 84

A latex paint formulation having pyrolized polysilocarb power added into the formulation, the power has a size range of about 0.5-100 microns, and the powder has a loading of about 15%.

Example 85

The paint formulation of Example 83 is an enamel.

Example 86

The polysilocarb ceramic pigments can be made from the pyrolysis of any polysilocarb batches that are capable of being pyrolized. The polysilocarb pigment material can be provided, for example, as beads, powder, flakes, fines, or other forms that are capable of being dispersed or suspended in the paint formulation (e.g., platelets, spheres, crescents, angular, blocky, irregular or amorphous shapes). Beads can have a size of from about 100 to about 1,000 microns in diameter. Powders can have a particle size range of from about 0.5 to about 100 microns in diameter. Any subset range within these ranges can create the desired effect or color. Larger and smaller sizes may also provide the desired effects in other formulations. For example: 300-500 micron range beads; 350 (+/−5%) micron beads; 5-15 micron range powder. Particle size ranges for a particular polysilocarb ceramic pigment preferably range as tight as +/−10% and more preferably +/−5%. The range may also be broader in certain applications, e.g., 100-1000 for beads, and e.g., 0.5-100 for powders. The density and hardness of the polysilocarb ceramic pigment can be varied, controlled and predetermined by the precursor formulations used, as well as the curing and pyrolizing conditions. The polysilocarb ceramic pigments can provided enhanced corrosion resistance, scratch resistance and color (UV) stability to paint formulations. Optical properties or effects of the polysilocarb ceramic pigment can, among other ways, be controlled by the use of different gases and gas mixtures, as well as other curing and pyrolysis conditions. The polysilocarb ceramic pigment loading can be used anywhere from a 1% to a 40% in order to achieve the desired effect. Further, the use of the polysilocarb ceramic pigments can provide enhanced flame retardant benefits. The polysilocarb ceramic pigments have a further advantage of being low dusting, and easily mixed into any type of paint formulations, e.g., latex, enamel, polyurethanes, automotive OEM and refinish, alkyd, waterborne, acrylic and polyol coatings formulations. The polysilocarb ceramic pigments can also be used as a fine colorant in inks and graphic arts formulations.

Example 87

A polysilocarb formulation is formed into the shape of a larger internal diameter (from about 5 inches to about 36 inches, or larger) tube structure. This tube structure is reinforced with reinforcing material arranged to provide both hoop strength (e.g., burst and crush) and axial strength (e.g., bending, elongation, and compression). The thickness of the wall of the tube is dependent upon the end use requirements, the reinforcement material, and whether the material is a plastic, ceramic or plastic-ceramic. By way of example, the thickness could range from about less than a ¼ inch to 5 inches or more. These polysilocarb tube structures are then cured, to preferable to an end cure. They may also be pyrolized into a ceramic, which may be subject to additional reinfiltration, curing and pyrolysis steps (one to five or more) to provide a ceramic, or they may be subjected to additional reinfiltration and curing steps (one to three or more) to provide a plastic-ceramic. Once so formed, the tube structures can be subject to: further processing, e.g., machining to specification; the incorporation of end assemblies, e.g., flanges, couplings, joints, connectors; the incorporation of secondary lines (external, internal and both), e.g., data lines, choke lines, kill lines, hydraulic lines, electric lines, etc.; they may have a second tube formed around them, or may be inserted into or over a second tube forming a tube-in-tube structure (e.g., a double walled pipeline); and the addition of sensors and monitoring equipment (although it should be noted that break detection devices, in for example the form of wires, or optical fibers, could be incorporated into the wall of the tube structure during formation). These tube structures provide many features include increased strength to weight rations (e.g., stronger and lighter, same strength and lighter, stronger and same weight).

Example 88

The polysilocarb tube structure of EXAMPLE 87 is a marine riser for off shore hydrocarbon exploration and production activities. Each riser section is about 75 feet long and the riser sections are capable of being assembled into a deep sea rise that can extend down from the surface to the sea floor for depth of more than 5,000 ft, 10,000 ft, 15,000 ft, 20,000 ft or more. The riser has is substantially less dense than traditional steel risers. Thus, the riser wall can have a density of less than about 5 g/cm$^3$, and less than about 3 g/cm$^3$, which is substantially less than the density of steel, which is about 7.8 g/cm$^3$. The reduced density of the polysilocarb riser reduces the amount of flotation needed, and thus reduces the over all outer diameter of the as deployed riser. The smaller outer diameter provides the advantage of reducing the amount of surface area that is subject to currents and thus reduces the stresses place upon the riser.

Example 89

A polysilocarb formulation is coated onto the surface of a pipe and soft cured. The polysilocarb formulation can be net or it can be filled, for example, with pyrolized polysilocarb ceramic fines (along the lines of Example. This process is repeated until the desired thickness of the coating is obtained. Once the desired thickness of the coating has been obtained the soft cured layers are end cured. A coating along the exterior of the pipe can provide thermal insulation to the pipe, as well as, corrosion resistance. An internal coating to the pipe may also provide thermal insulation for the materials in the pipe, and provides corrosion resistance. The corrosion resistance provided by the cured polysilocarb internal coating can enable the replacement of more expensive stainless steel and other high priced alloys with lower priced metals.

Example 90

A polysilocarb formulation is added as a layer, component, or the entire out covering, e.g., insulation, for electrical wiring. The polysilocarb formulation is hard cured and provides both mechanical strength, and fire resistance to the wiring covering.

Example 91

High purity alpha, beta and both, SiC is made by curing a polysilocarb formulation, grinding the formulation to about 0.1 μm to about 10 mm. The cured particles are then pyrolized, and controlling the shrinkage during pyrolysis the end size of the pyrolized particles can be predetermined and controlled. Preferably, the SiC particles are less than 1 μm. Shrinkage rates can be controlled by the polysilocarb formulation and by the pyrolizing conditions. The pyrolysis is conducted in excess of 1,400° C., and more preferable at about 1,600° C., under vacuum, in an inert atmosphere or under a reduced pressure inert atmosphere. At about 1,650° C. primarily beta SiC will be produced. At temperatures above 2,200° C. to about 2,400° C. primarily alpha SiC will be produced.

Example 92

A polysilocarb formulation is hard cured to form polysilocarb cured aggregate. The aggregate is be added to concrete.

Example 93

A polysilocarb formulation is formed into a porous ceramic structure to serve as a support for a catalyst. The porous polysilocarb ceramic support can be in the shape of beads, pellets, honeycombs, and any other shape or configuration that is used as a catalyst support or system. The porous polysilocarb ceramic support can be a catalytic converter for a vehicle. In addition to the support for the catalyst, the outer structure, housing, components and assembly of the catalytic device can also be made from a polysilocarb plastic, ceramic or plastic-ceramic.

Example 94

A polysilocarb formulation is formed into a ceramic exhaust for a vehicle, such as an automobile, truck, and motorcycle.

Example 95

A polysilocarb formulation is coated on a wall material and cured. The coating provides a vapor barrier, reducing and preferably preventing, for example, odors in the wall from fire damage, from being smelled in the room.

Example 96

The treatment of pyrolized polysiloxane materials, such as for example, proppants and other volumetric shapes, with silanes, anti-static agents and combinations of these has the ability to increase, and significantly increase the strength of the pyrolized materials.

Thus, treating composition may optionally contain conventional additives such as rheology modifiers, fillers, coalescents such as glycols and glycol ethers to aid in proppant storage stability, antifoaming agents such as Drew L-139 (commercially available from Drew Industries, a division of Ashland Chemical), antistatic agents such as Emerstat 6660A (commercially available from Cognis) or Katex 6760 (from Pulcra Chemicals), dust suppression agents, and/or other conventional additives. Additives may be present in the coatings composition from trace amounts (such as <about 0.1% by weight the total composition) up to about 5.0% by weight of the total composition.

The preferable treating solution contains a silane, Silquest A1100 from Momentive and has the following chemical formula, $H_2NCH_2CH_2CH_2Si(OCH_2CH_3)_3$.

To treat proppant the following procedure may be utilized. Wash the Proppant in water (current procedure) to remove fines, Wash the Proppant in Silane/Antistat aqueous solution for 5 min (at 25 C). Remove Proppant and save all the excess Silane/Antistat solution for multiple use. Dry the Proppant at 105-110 C for 30 mins-1 hr (preferably it should be completely dry).

By way of example, 40 mesh proppant having a crush strength of 13,200 psi was treated using the above procedure and exhibited crush strengths that exceeded 17,600 psi, and more. The fine percentage for these silane treated proppants was less than 1.7%, and lower.

Example 97

A polymer derived ceramic having 41% Si, 31% O, and 27% C (with 27.5% of the carbon being the Si—C bonded type, and the remaining carbon being the free carbon type), is used in structural components, members, abrasives, devices and applications for the ceramics that are set forth in the above Examples and embodiments of the figures.

Example 98

A polymer derived ceramic having 45% Si, 22% O, and 33% C (with 34.4% of the carbon being the Si—C bonded type, and the remaining carbon being the free carbon type), is used in structural components, members, abrasives, devices and applications for the ceramics that are set forth in the above Examples and embodiments of the figures.

Example 99

A polymer derived ceramic black pigment having 44% Si, 31% O, and 25% C (with 27.3% of the carbon being the Si—C bonded type, and the remaining carbon being the free carbon type), is used in structural components, members, abrasives, devices and applications for the ceramics that are set forth in the above Examples and embodiments of the figures.

Example 100

A polymer derived ceramic black pigment having 50% Si, 20% O, and 30% C (with 25% of the carbon being the Si—C bonded type, and the remaining carbon being the free carbon type), is used in structural components, members, abrasives, devices and applications for the ceramics that are set forth in the above Examples and embodiments of the figures.

Example 101

A polysilocarb batch having 75% MH, 15% TV, 10% VT and 1% catalyst (10 ppm platinum and 0.5% Luperox 231 peroxide) is cured and pyrolized to form a ceramic suitable for several applications including as a black ceramic pigment.

Example 102

A polysilocarb batch having 70% MH, 20% TV, 10% VT and 1% catalyst (10 ppm platinum and 0.5% Luperox 231 peroxide) is cured and pyrolized to form a ceramic suitable for several applications including as a black ceramic pigment.

Example 103

A polysilocarb batch having 50% by volume carbon black is added to a polysilocarb batch having 70% MH, 20% TV, 10% VT and 1% catalyst (10 ppm platinum and 0.5% Luperox 231 peroxide) is cured and pyrolized to form a ceramic suitable for several applications including as a black ceramic filled pigment.

Example 104

A ceramic polysilocarb proppant is placed down hole in a deep hydrocarbon production well, the proppant functions as a "cracking" medium for the hydrocarbons in the formation by placing the proppant into the reservoir and using the heat of the formation in combination with to crack to lighter hydrocarbons in situ. The proppant may further have a catalysis incorporated into it to enhance the ability to crack the hydrocarbons.

Example 105

The polysicocarb formulation is formed into a fiberglass like material, blown insulation like material, fiber mats, and similar types of insulating, and insulation structures and configurations.

Example 106

Sand, or any material with porosity, including microporosity has polysilocarb formulations vacuum infiltrated into the material. The vacuum infiltrated material can be cured and pyrolized. This step can be repeated. This vacuum infiltration process with the polysilocarb formulations gives predetermined enhanced materials.

Example 107

The polysilocarb formulations are pyrolized to form a black pigment capable of being use in sintering process.

Example 108

Polysilocarb ceramics are formed into beads. The beads are used to fill voids in vehicle panels, doors, vests, other structures, etc. The beads are lightweight and impart ballistic resistant capabilities to the panels. The beads can further provide fire resistance to the panels, vehicles and structures.

Example 109

Polysilocarb ceramics can be formed into fire place boxes, grills, ovens, fire fighting tools, gun lockers, safes, waste containers and ball bearings.

Example 110

The polysilocarb ceramics can be forming into powers for addition to and use in cosmetics.

Example 111

The polysilocarb formulations as cured, pyrolized and both beads can be added to cement, concrete or other flowable-curing building materials, in conjunction with or as a replace for aggregate. The ceramic has considerably greater strength than glass beads, and is considerably lighter than most aggregate. It can be added to the building material while it is flowable.

It is noted that there is no requirement to provide or address the theory underlying the novel and groundbreaking processes, materials, performance or other beneficial features and properties that are the subject of, or associated with, embodiments of the present inventions. Nevertheless, various theories are provided in this specification to further advance the art in this area. These theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the function-features of embodiments of the methods, articles, materials, devices and system of the present inventions; and such later developed theories shall not limit the scope of protection afforded the present inventions.

The various embodiments of formulations, plastics, articles, components, parts, uses, applications, methods, activities and operations set forth in this specification may be used for various other fields and for various other activities, uses and embodiments. Additionally, these embodiments, for example, may be used with: existing systems, articles, components, operations or activities; may be used with systems, articles, components, operations or activities that may be developed in the future; and with such systems, articles, components, operations or activities that may be modified, in-part, based on the teachings of this specification. Further, the various embodiments and examples set forth in this specification may be used with each other, in whole or in part, and in different and various combinations. Thus, for example, the configurations provided in the various embodiments and examples of this specification may be used with each other; and the scope of protection afforded the present inventions should not be limited to a particular embodiment, example, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

What is claimed is:

1. A grinding or cutting device having a polysilocarb formulation comprising: a bulk phase and a cutting material; wherein the bulk phase is derived from a polysilocarb formulation, wherein at least about 55 weight % of the carbon is free carbon.

2. The grinding or cutting device of claim 1 is obtained from a reaction type process.

3. The grinding or cutting device of claim 1, wherein the formulation comprises at least one precursor selected from the group consisting of Phenyltriethoxysilane, Phenylmethyldiethoxysilane, Methyldiethoxysilane, Vinylmethyldiethoxysilane, Trimethylethoxysilane, Triethoxysilane, and a partially hydrolyzed tetraethyl orthosilicate.

4. The grinding or cutting device of claim 1, wherein the formulation comprises at least two precursors selected from the group consisting of Phenyltriethoxysilane, Phenylmethyldiethoxysilane, Methyldiethoxysilane, Vinylmethyldiethoxysilane, Trimethylethoxysilane, Triethoxysilane, and a partially hydrolyzed tetraethyl orthosilicate.

5. The grinding or cutting device of claim 1, wherein the cutting material is selected from the group consisting of polycrystalline diamond compact, SiC, Aluminum oxide and diamond.

6. The grinding or cutting device of claim 2, wherein the cutting material is selected from the group consisting of polycrystalline diamond compact, SiC, Aluminum oxide and diamond.

7. The grinding or cutting device of claim 1, wherein the cutting material is evenly distributed through the entirety of the member.

8. The grinding or cutting device of claim 2, wherein the cutting material is evenly distributed through the entirety of the member.

9. The composite grinding or cutting member of claim 1, wherein the cutting material is evenly distributed through a majority of a outer volume of the member, wherein the outer volume defines at least about 50% of the total volume of the member.

10. The grinding or cutting member of claim 1, wherein the polysilocarb formulation is a mixing type formulation.

11. The grinding or cutting member of claim 1, wherein the polysilocarb formulation is a mixing type formulation, wherein the formulation comprises at least one precursor selected from the group consisting of methyl terminated vinyl polysiloxane, vinyl terminated vinyl polysiloxane, hydride terminated vinyl polysiloxane, vinyl terminated dimethyl polysiloxane, hydroxy terminated dimethyl polysiloxane, phenyl terminated dimethyl polysiloxane, methyl terminated phenylethyl polysiloxane, and tetravinyl cyclosiloxane.

12. The grinding or cutting member of claim 10, wherein the polysilocarb formulation is substantially solvent free.

13. The composite grinding or cutting member of claim 12, wherein the cutting material is selected from the group consisting of polycrystalline diamond compact, SiC, Aluminum oxide and diamond.

14. The composite grinding or cutting member of claim 13, wherein the cutting material is evenly distributed through a majority of a outer volume of the member, wherein the outer volume defines at least about 50% of the total volume of the member.

15. The grinding or cutting device of claim 1, wherein the polysilocarb formulation comprises an $SiO_xC_y$ moiety, where $x \geq 1$, $y \geq 1$, and $x+y=4$ and wherein the bulk material further comprises about 20 weight % to about 35 weight % carbon; wherein about 55 weight % to about 80 weight % of the carbon is free carbon.

16. The grinding or cutting device of claim 1, wherein the polysilocarb formulation comprises a pyrolized ceramic, the ceramic comprising from about 30 weight % to about 60 weight % silicon, from about 5 weight % to about 40 weight % oxygen.

17. The grinding or cutting device of claim 1, wherein the polysilocarb formulation comprises about 40 weight % to about 50 weight % silicon, and wherein about 25 weight % to about 40 weight % of the carbon is silicon-bound carbon.

18. The grinding or cutting device of claim 17, wherein the polysilocarb formulation comprises about 40 weight % to about 50 weight % silicon.

19. The grinding or cutting device of claim 17, wherein the polysilocarb formulation comprises about 20 weight % to about 30 weight % oxygen, and wherein about 60 weight % to about 75 weight % of the carbon is free carbon.

20. The grinding or cutting device of claim 17, wherein the polysilocarb formulation comprises about 20 weight % to about 30 weight % oxygen, and wherein about 25 weight % to about 40 weight % of the carbon is silicon-bound carbon.

\* \* \* \* \*